US012624126B2

(12) United States Patent
Adelman et al.

(10) Patent No.: US 12,624,126 B2
(45) Date of Patent: May 12, 2026

(54) DEXTRAN-ALPHA-GLUCAN GRAFT COPOLYMERS AND DERIVATIVES THEREOF

(71) Applicant: NUTRITION & BIOSCIENCES USA 4, INC., Rochester, NY (US)

(72) Inventors: Douglas J. Adelman, Wilmington, DE (US); Natnael Behabtu, Oegstgeest (NL); Christian Peter Lenges, Wilmington, DE (US); Kyle Kim, Wilmington, DE (US); Geert Van Der Kraan, Oegstgeest (NL); Rong Guan, Wilmington, DE (US)

(73) Assignee: NUTRITION & BIOSCIENCES USA 4, INC., Wilmington, DE (US)

( * ) Notice: Subject to any disclaimer, the term of this patent is extended or adjusted under 35 U.S.C. 154(b) by 559 days.

(21) Appl. No.: 17/999,082

(22) PCT Filed: Jun. 3, 2021

(86) PCT No.: PCT/US2021/035623

§ 371 (c)(1),
(2) Date: Nov. 17, 2022

(87) PCT Pub. No.: WO2021/247810

PCT Pub. Date: Dec. 9, 2021

(65) Prior Publication Data

US 2023/0235097 A1 Jul. 27, 2023

Related U.S. Application Data

(60) Provisional application No. 63/034,437, filed on Jun. 4, 2020.

(51) Int. Cl.
*C08B 37/02* (2006.01)
*B01J 20/26* (2006.01)
*C02F 1/56* (2023.01)

(52) U.S. Cl.
CPC ......... *C08B 37/0021* (2013.01); *B01J 20/267* (2013.01); *C02F 1/56* (2013.01)

(58) Field of Classification Search
CPC .... C08B 37/0021; C08B 37/0009; C08L 5/02
See application file for complete search history.

(56) References Cited

U.S. PATENT DOCUMENTS

| | | | |
|---|---|---|---|
| 4,462,917 | A | 7/1984 | Conway |
| 4,464,270 | A | 8/1984 | Hollenbeak et al. |
| 4,477,360 | A | 10/1984 | Almond |
| 4,799,550 | A | 1/1989 | Harris et al. |
| 7,000,000 | B1 | 2/2006 | O'Brien |
| 8,859,758 | B2 | 10/2014 | Frank et al. |
| 2008/0112907 | A1 | 5/2008 | Chan et al. |
| 2014/0087431 | A1 | 3/2014 | Payne et al. |
| 2014/0179913 | A1 | 6/2014 | Paullin et al. |
| 2014/0187767 | A1 | 7/2014 | Kasat et al. |
| 2015/0232785 | A1 | 8/2015 | Paullin et al. |
| 2015/0232819 | A1 | 8/2015 | Paullin et al. |
| 2015/0239995 | A1 | 8/2015 | Landschutze et al. |
| 2015/0368594 | A1 | 12/2015 | Nagy et al. |
| 2015/0368595 | A1 | 12/2015 | Nagy et al. |
| 2016/0122445 | A1 | 5/2016 | Nambiar et al. |
| 2016/0136199 | A1 | 5/2016 | Remaud-Simeon et al. |
| 2016/0175811 | A1 | 6/2016 | Behabtu et al. |
| 2016/0304629 | A1 | 10/2016 | Kasat et al. |
| 2016/0311935 | A1 | 10/2016 | Dennes et al. |
| 2017/0002335 | A1 | 1/2017 | Payne et al. |
| 2017/0166938 | A1 | 6/2017 | Nagy et al. |
| 2017/0218093 | A1 | 8/2017 | Cheng et al. |
| 2018/0022834 | A1 | 1/2018 | Paullin et al. |
| 2018/0079832 | A1 | 3/2018 | Paullin et al. |
| 2018/0155455 | A1 | 6/2018 | Paullin et al. |
| 2018/0230241 | A1 | 8/2018 | Johnson et al. |
| 2018/0237816 | A1 | 8/2018 | Paullin et al. |
| 2018/0282385 | A1 | 10/2018 | Cheng et al. |
| 2019/0078062 | A1 | 3/2019 | Li et al. |
| 2019/0078063 | A1 | 3/2019 | Li et al. |
| 2019/0185893 | A1* | 6/2019 | Guan ...................... C12P 19/08 |
| 2019/0202942 | A1 | 7/2019 | Lu et al. |
| 2019/0276806 | A1 | 9/2019 | Li et al. |
| 2019/0359734 | A1 | 11/2019 | Qiu et al. |
| 2020/0002646 | A1 | 1/2020 | Huang et al. |
| 2020/0131281 | A1 | 4/2020 | Guan et al. |
| 2020/0165360 | A1 | 5/2020 | Behabtu et al. |
| 2020/0308371 | A1 | 10/2020 | Briegel et al. |
| 2020/0370216 | A1 | 11/2020 | Behabtu et al. |

FOREIGN PATENT DOCUMENTS

| | | | |
|---|---|---|---|
| JP | 2001224959 | A | 8/2001 |
| WO | 2013017330 | A1 | 2/2013 |
| WO | 2014/105484 | A1 | 7/2014 |
| WO | 2018/098065 | A1 | 5/2018 |
| WO | 2018/152074 | A1 | 8/2018 |
| WO | 2019/055397 | A1 | 3/2019 |
| WO | 2019/246228 | A1 | 12/2019 |
| WO | 2020/131711 | A1 | 6/2020 |
| WO | 2021/007264 | A1 | 1/2021 |

OTHER PUBLICATIONS

Salimi-Kenari et al., Carbohydrate Polymers, 2018, 181, p. 141-149. (Year: 2018).*

(Continued)

*Primary Examiner* — Jonathan S Lau

(57) ABSTRACT

Disclosed herein are compositions comprising at least one alpha-glucan graft copolymer derivative compound (e.g., ether or ester) having a degree of substitution (DoS) up to about 3.0. The precursors of these derivative compounds are graft copolymers that comprise a dextran backbone and alpha-glucan side chains. At least about 30% of the glycosidic linkages of the alpha-glucan side chains are alpha-1,3 glycosidic linkages. Further disclosed are methods of producing graft copolymer derivatives, as well as their use in various applications and products.

20 Claims, No Drawings

(56) References Cited

OTHER PUBLICATIONS

Simpson et al., "Four glucosyltransferases, GtfJ, GtfK, GtfL and GtfM, from *Streptococcus salivarius* ATCC 25975", Microbiology 141:1451-1460, 1995.
International Preliminary Report on Patentability for PCT/U52021/035623 issued Dec. 6, 2020.

* cited by examiner

DEXTRAN-ALPHA-GLUCAN GRAFT COPOLYMERS AND DERIVATIVES THEREOF

This application is the National Stage application of International Application No. PCT/US2021/035623 (filed Jun. 3, 2021), which claims the benefit of U.S. Provisional Appl. No. 63/034,437 (filed Jun. 4, 2020), both of which prior applications are incorporated herein by reference in their entirety.

FIELD

The present disclosure is in the field of polysaccharides and polysaccharide derivatives. For example, the disclosure pertains to derivatives of dextran-alpha-glucan graft copolymers, methods of their production, and use of this material in various applications.

BACKGROUND

Driven by a desire to use polysaccharides in various applications, researchers have explored for polysaccharides that are biodegradable and that can be made economically from renewably sourced feedstocks. One such polysaccharide is alpha-1,3-glucan, an insoluble glucan polymer characterized by having alpha-1,3 glycosidic linkages. This polymer has been prepared, for example, using a glucosyltransferase enzyme isolated from *Streptococcus salivarius* (Simpson et al., Microbiology 141:1451-1460, 1995). Also for example, U.S. Pat. No. 7,000,000 disclosed the preparation of a spun fiber from enzymatically produced alpha-1,3-glucan. Various other glucan materials have also been studied for developing new or enhanced applications. For example, U.S. Patent Appl. Publ. No. 2015/0232819 discloses enzymatic synthesis of several insoluble glucans having mixed alpha-1,3 and -1,6 linkages.

Despite this work, new forms of alpha-1,3-glucan are desired to enhance the economic value and performance characteristics of this material in various applications. Compositions comprising alpha-1,3-glucan in the form of a derivatized graft copolymer are presently disclosed to address this need.

SUMMARY

In one embodiment, the present disclosure concerns a composition comprising at least one graft copolymer ether or ester compound having a degree of substitution (DoS) up to about 3.0, wherein the graft copolymer comprises: (i) a backbone comprising dextran, and (ii) alpha-glucan side chains comprising at least about 30% alpha-1,3 glycosidic linkages.

In another embodiment, the present disclosure concerns a method of producing a graft copolymer ether or ester compound herein, the method comprising: (a) contacting a graft copolymer in a reaction with at least one etherification agent or esterification agent comprising an organic group, wherein at least one organic group is etherified or esterified to the graft copolymer thereby producing a graft copolymer ether or ester compound, wherein the graft copolymer ether or ester compound has a degree of substitution (DoS) up to about 3.0, wherein the graft copolymer comprises: (i) a backbone comprising dextran, and (ii) alpha-glucan side chains comprising at least about 30% alpha-1,3 glycosidic linkages; and (b) optionally, isolating the graft copolymer ether or ester compound produced in step (a).

In another embodiment, the present disclosure concerns a flocculation method comprising: (a) mixing a graft copolymer ether or ester compound herein into an aqueous composition that comprises suspended solids, whereby at least a portion of the suspended solids becomes flocculated; and (b) optionally, separating the flocculated solids of (a) from the aqueous composition.

In another embodiment, the present disclosure concerns an absorption method comprising: contacting a graft copolymer ether or ester compound herein with an aqueous liquid-comprising composition, wherein the compound absorbs aqueous liquid from the liquid-comprising composition.

DETAILED DESCRIPTION

The disclosures of all cited patent and non-patent literature are incorporated herein by reference in their entirety.

Unless otherwise disclosed, the terms “a”, “an” and “the” as used herein are intended to encompass one or more (i.e., at least one) of a referenced feature.

Where present, all ranges are inclusive and combinable, except as otherwise noted. For example, when a range of “1 to 5” (i.e., 1-5) is recited, the recited range should be construed as including ranges “1 to 4”, “1 to 3”, “1-2”, “1-2 & 4-5”, “1-3 & 5”, and the like.

The term “copolymer” herein refers to a polymer comprising at least two different types of alpha-glucan, such as dextran and alpha-1,3-glucan.

The terms “graft copolymer”, “branched copolymer” and the like herein generally refer to a copolymer comprising a “backbone” (or “main chain”) and side chains branching from the backbone. The side chains are structurally distinct from the backbone.

Examples of graft copolymers herein are “dextran-alpha-1,3-glucan graft copolymers” (and like terms) that comprise a backbone comprising dextran, and side chains of alpha-1,3-glucan. A backbone in some aspects can itself be a branched dextran as disclosed herein; the addition of alpha-1,3-glucan side chains to such a backbone (thereby forming a graft copolymer herein) can be, for example, via enzymatic extension from non-reducing ends presented by short branches (alpha-1,2, -1,3, or -1,4 branch, each typically comprised of a single glucose monomer; i.e., pendant glucose). Short branches (that can be enzymatically extended into an alpha-1,3-glucan side chain) can be present on an otherwise linear or mostly linear dextran, or can be present on a branching dextran. In some aspects, alpha-1,3-glucan can also be synthesized from non-reducing ends of dextran main chains, such as in embodiments in which the dextran backbone is linear or mostly linear, or embodiments in which the dextran backbone is branching (e.g., dendritic, or not dendritic [branches do not emanate from a core] but has branch-on-branch structure); such alpha-1,3-glucan is not, technically-speaking, a side chain to the dextran, but rather an extension from the dextran main chain(s).

The terms “alpha-glucan”, “alpha-glucan polymer” and the like are used interchangeably herein. An alpha-glucan is a polymer comprising glucose monomeric units linked together by alpha-glycosidic linkages. In typical embodiments, an alpha-glucan herein comprises at least about 80%, 81%, 82%, 83%, 84%, 85%, 86%, 87%, 88%, 89%, 90%, 91%, 92%, 93%, 94%, 95%, 96%, 97%, 98%, 99%, or 100% alpha-glycosidic linkages. Examples of alpha-glucan polymers herein include graft copolymers as presently disclosed, which are used to prepare derivatives (e.g., ether or ester) herein.

The terms "alpha-1,3-glucan", "poly alpha-1,3-glucan", "alpha-1,3-glucan polymer" and the like are used interchangeably herein. Alpha-1,3-glucan is a polymer comprising glucose monomeric units linked together by glycosidic linkages, wherein at least about 30% of the glycosidic linkages are alpha-1,3. Alpha-1,3-glucan in certain embodiments comprises at least about 90% or 95% alpha-1,3 glycosidic linkages. Most or all of the other linkages in alpha-1,3-glucan herein typically are alpha-1,6, though some linkages may also be alpha-1,2 and/or alpha-1,4. Alpha-1,3-glucan as presently disclosed can characterize an alpha-1,3-glucan side chain herein. In some aspects, alpha-1,3-glucan can characterize an alpha-1,3-glucan "homopolymer", which is alpha-1,3-glucan that is not part of a dextran-alpha-1,3-glucan copolymer (or other copolymer).

The terms "dextran", "dextran polymer", "dextran molecule" and the like herein refer to a water-soluble alpha-glucan comprising at least 50%, 60%, 70%, 80%, or 90% alpha-1,6 glycosidic linkages (with the balance of the linkages typically being alpha-1,3). Enzymes capable of synthesizing dextran from sucrose may be described as "dextransucrases" (EC 2.4.1.5). A "substantially linear" ("mostly linear", and like terms) dextran herein has 5% or less branches, before being modified herein to have alpha-1,3-glucan side chains. A "linear" dextran has no branches, before being modified herein to have alpha-1,3-glucan side chains. Branches, if present prior to modification of dextran with alpha-1,3-glucan side chains, can be short, being one (pendant) to three glucose monomers in length. Yet, in some aspects, dextran can be "dendritic", which is a branched structure emanating from a core in which there are chains (containing mostly or all alpha-1,6-linkages) that iteratively branch from each other (e.g., a chain can be a branch from another chain, which in turn is a branch from another chain, and so on). Yet, in still some aspects, dextran is not dendritic, but has a branch-on-branch structure that does not emanate from a core. Dextran as used in a glucosyltransferase reaction herein for alpha-1,3-glucan synthesis (to produce a dextran-alpha-1,3-glucan copolymer) can optionally be characterized as a "primer" or "acceptor".

An "alpha-1,2 branch" (and like terms) as referred to herein comprises a glucose that is alpha-1,2-linked to a dextran backbone; thus, an alpha-1,2 branch herein can also be referred to as an alpha-1,2,6 linkage. An alpha-1,2 branch (before possible extension with an alpha-1,3-glucan-synthesizing glucosyltransferase to prepare a dextran-alpha-1,3-glucan graft copolymer) herein typically has one glucose group (can optionally be referred to as a pendant glucose).

An "alpha-1,3 branch" (and like terms) as referred to herein comprises a glucose that is alpha-1,3-linked to a dextran backbone; thus, an alpha-1,3 branch herein can also be referred to as an alpha-1,3,6 linkage. An alpha-1,3 branch (before possible extension with an alpha-1,3-glucan-synthesizing glucosyltransferase to prepare a dextran-alpha-1,3-glucan graft copolymer) herein typically has one glucose group (can optionally be referred to as a pendant glucose). An alpha-1,3 branch is contemplated in some aspects to possibly result from a glucosyltransferase enzyme first making an alpha-1,3 branch from the dextran backbone followed by extension of this branch by the enzyme.

An "alpha-1,4 branch" (and like terms) as referred to herein comprises a glucose that is alpha-1,4-linked to a dextran backbone; thus, an alpha-1,4 branch herein can also be referred to as an alpha-1,4,6 linkage. An alpha-1,4 branch (before possible extension with an alpha-1,3-glucan-synthesizing glucosyltransferase to prepare a dextran-alpha-1,3-glucan graft copolymer) herein typically has one glucose group (can optionally be referred to as a pendant glucose).

The percent branching in an alpha-glucan herein refers to that percentage of all the linkages in the alpha-glucan that represent branch points. For example, the percent of alpha-1,3 branching in an alpha-glucan herein refers to that percentage of all the linkages in the glucan that represent alpha-1,3 branch points. Except as otherwise noted, linkage percentages disclosed herein are based on the total linkages of a glucan, or the portion of a glucan for which a disclosure specifically regards.

The terms "linkage", "glycosidic linkage", "glycosidic bond" and the like refer to the covalent bonds connecting the sugar monomers within a saccharide compound (oligosaccharides and/or polysaccharides). Examples of glycosidic linkages include 1,6-alpha-D-glycosidic linkages (herein also referred to as "alpha-1,6" linkages), 1,3-alpha-D-glycosidic linkages (herein also referred to as "alpha-1,3" linkages), 1,4-alpha-D-glycosidic linkages (herein also referred to as "alpha-1,4" linkages), and 1,2-alpha-D-glycosidic linkages (herein also referred to as "alpha-1,2" linkages). The glycosidic linkages of a glucan polymer herein can also be referred to as "glucosidic linkages". Herein, "alpha-D-glucose" is referred to as "glucose".

The glycosidic linkage profile of a graft copolymer herein or derivative thereof can be determined using any method known in the art. For example, a linkage profile can be determined using methods using nuclear magnetic resonance (NMR) spectroscopy (e.g., $^{13}C$ NMR or $^{1}H$ NMR). These and other methods that can be used are disclosed in, for example, *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, FL, 2005), which is incorporated herein by reference.

The "molecular weight" of a graft copolymer herein or a derivative thereof can be represented as weight-average molecular weight (Mw) or number-average molecular weight (Mn), the units of which are in Daltons (Da) or grams/mole. In some aspects, molecular weight can be represented as DPw (weight average degree of polymerization) or DPn (number average degree of polymerization). In some aspects, molecular weight can sometimes be provided as "DP" (degree of polymerization), which simply refers to the number of glucoses comprised within the graft copolymer or derivative thereof on an individual molecule basis. Various means are known in the art for calculating these various molecular weight measurements such as with high-pressure liquid chromatography (HPLC), size exclusion chromatography (SEC), or gel permeation chromatography (GPC).

As used herein, Mw can be calculated as: $Mw=\Sigma NiMi^2/\Sigma NiMi$; where Mi is the molecular weight of an individual chain i and Ni is the number of chains of that molecular weight. In addition to using SEC, Mw can be determined by other techniques such as static light scattering, mass spectrometry especially MALDI-TOF (matrix-assisted laser desorption/ionization time-of-flight), small angle X-ray or neutron scattering, and/or ultracentrifugation. As used herein, Mn refers to the statistical average molecular weight of all the polymer chains in a sample. Mn can be calculated as: $Mn=\Sigma NiMi/\Sigma Ni$ where Mi is the molecular weight of a chain i and Ni is the number of chains of that molecular weight. In addition to using SEC, Mn can be determined by various colligative methods such as vapor pressure osmometry or end-group determination by spectroscopic methods such as proton NMR, FTIR, or UV-vis.

As used herein, number average degree of polymerization (DPn) and weight average degree of polymerization (DPw) are calculated from the corresponding average molecular weights Mw or Mn by dividing by the molar mass of one monomer unit $M_1$. In the case of unsubstituted glucan polymer, $M_1$=162.14. In the case of a substituted glucan polymer, $M_1$=162.14+Mf×DoS, where Mf is the molar mass of the substituent group and DoS is the degree of substitution of that substituent group (average number of substituted groups per glucose monomeric unit).

The term "sucrose" herein refers to a non-reducing disaccharide composed of an alpha-D-glucose molecule and a beta-D-fructose molecule linked by an alpha-1,2-glycosidic bond. Sucrose is known commonly as table sugar. Sucrose can alternatively be referred to as "alpha-D-glucopyranosyl-(1→2)-beta-D-fructofuranoside". "Alpha-D-glucopyranosyl" and "glucosyl" are used interchangeably herein.

The terms "glucosyltransferase", "glucosyltransferase enzyme", "GTF", "glucansucrase" and the like are used interchangeably herein. The activity of a glucosyltransferase herein catalyzes the reaction of the substrate sucrose to make the products alpha-glucan and fructose. Other products (by-products) of a GTF reaction can include glucose, various soluble gluco-oligosaccharides, and leucrose. Wild type forms of glucosyltransferase enzymes generally contain (in the N-terminal to C-terminal direction) a signal peptide (which is typically removed by cleavage processes), a variable domain, a catalytic domain, and a glucan-binding domain. A glucosyltransferase herein is classified under the glycoside hydrolase family 70 (GH70) according to the CAZy (Carbohydrate-Active EnZymes) database (Cantarel et al., *Nucleic Acids Res.* 37: D233-238, 2009). The term "dextransucrase" (and like terms) can optionally be used to characterize a glucosyltransferase enzyme that produces dextran. The term "branching enzyme" (and like terms) can optionally be used to characterize a glucosyltransferase enzyme that introduces one or more alpha-1,2, alpha-1,3, or alpha-1,4 branches to a dextran backbone (e.g., an "alpha-1,3-branching enzyme"); such a branch is typically one glucose in length.

The term "glucosyltransferase catalytic domain" herein refers to the domain of a glucosyltransferase enzyme that provides alpha-glucan-synthesizing activity to a glucosyltransferase enzyme. A glucosyltransferase catalytic domain typically does not require the presence of any other domains to have this activity.

The terms "enzymatic reaction", "glucosyltransferase reaction", "glucan synthesis reaction" and the like are used interchangeably herein and generally refer to a reaction that initially comprises water, sucrose, at least one active glucosyltransferase enzyme, and optionally other components. Components that can be further present in a glucosyltransferase reaction typically after it has commenced include fructose, glucose, leucrose, soluble gluco-oligosaccharides (e.g., DP2-DP7) (such may be considered as products or by-products, depending on the glucosyltransferase used), and/or insoluble alpha-glucan product(s) of DP8 or higher (e.g., DP100 and higher). It would be understood that certain glucan products, such as alpha-1,3-glucan with a degree of polymerization (DP) of at least 8 or 9, are water-insoluble and thus not dissolved in a glucan synthesis reaction, but rather may be present out of solution (e.g., by virtue of having precipitated from the reaction). It is in a glucan synthesis reaction where the step of contacting water, sucrose and a glucosyltransferase enzyme is performed. The term "under suitable reaction conditions" and like terms herein refer to reaction conditions that support conversion of sucrose to alpha-glucan product(s) or branches via glucosyltransferase enzyme activity. It is during such a reaction that glucosyl group(s) originally derived from the input sucrose is/are enzymatically transferred and used in alpha-glucan polymer or branch synthesis; glucosyl groups as involved in this process can thus optionally be referred to as the glucosyl component or moiety (or like terms) of a glucosyltransferase reaction.

Unless otherwise specified, the terms "graft copolymer derivative", "derivative" and the like herein refer to ether, ester, or other derivatives of dextran-alpha-glucan graft copolymers as presently disclosed. A "precursor" of a graft copolymer derivative herein refers to the non-derivatized graft copolymer used to make the derivative (can also be referred to as the graft copolymer portion of the derivative compound).

Terms used herein regarding "ethers" (e.g., graft copolymer ether-derivative) can be as defined in U.S. Patent Appl. Publ. Nos. 2014/179913, 2016/0304629, 2016/0311935, 2015/0239995, 2018/0230241 and/or 2018/0237816, which are incorporated herein by reference.

The terms "graft copolymer ether compound", "graft copolymer ether", "graft copolymer ether derivative" and the like are used interchangeably herein. A graft copolymer ether compound herein is graft copolymer that has been etherified with one or more organic groups (uncharged, anionic, and/or cationic) such that the compound has a degree of substitution (DoS) with one or more organic groups of up to about 3.0 (e.g., about 0.001 to about 3.0).

A graft copolymer ether compound is termed an "ether" herein by virtue of comprising the substructure —$C_G$—O—C—, where "—$C_G$—" represents a carbon atom of a glucose monomeric unit of a graft copolymer ether compound (where such carbon atom was bonded to a hydroxyl group [—OH] in the graft copolymer precursor of the ether), and where "—C—" is a carbon atom of an organic group.

An "organic group" group as used herein can refer to a chain of one or more carbons that (i) has the formula —$C_nH_{2n+1}$ (i.e., an alkyl group, which is completely saturated) or (ii) is mostly saturated but has one or more hydrogens substituted with another atom or functional group (i.e., a "substituted alkyl group"). Such substitution may be with one or more hydroxyl groups, oxygen atoms (thereby forming an aldehyde or ketone group), carboxyl groups, or other alkyl groups. Thus, as examples, an organic group herein can be an alkyl group, carboxy alkyl group, or hydroxy alkyl group. An organic group herein may thus be uncharged or anionic (an example of an anionic organic group is a carboxy alkyl group) in some embodiments.

A "carboxy alkyl" group herein refers to a substituted alkyl group in which one or more hydrogen atoms of the alkyl group are substituted with a carboxyl group. A "hydroxy alkyl" group herein refers to a substituted alkyl group in which one or more hydrogen atoms of the alkyl group are substituted with a hydroxyl group.

An organic group can refer to a "positively charged organic group". A positively charged organic group as used herein refers to a chain of one or more carbons ("carbon chain") that has one or more hydrogens substituted with another atom or functional group (i.e., a "substituted alkyl group"), where one or more of the substitutions is with a positively charged group. Where a positively charged organic group has a substitution in addition to a substitution with a positively charged group, such additional substitution may be with one or more hydroxyl groups, oxygen atoms (thereby forming an aldehyde or ketone group), alkyl groups, and/or additional positively charged groups. A positively charged organic group has a net positive charge since it comprises one or more positively charged groups. The terms "positively charged group", "positively charged ionic group", "cationic group" and the like are used interchangeably herein. A positively charged group comprises a cation (a positively charged ion). Examples of positively charged groups include substituted ammonium groups, carbocation groups and acyl cation groups.

The terms "substituted ammonium group", "substituted ammonium ion" and "substituted ammonium cation" are used interchangeably herein. A substituted ammonium group herein comprises Structure I:

(I)

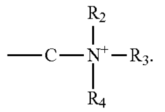

$R_2$, $R_3$ and $R_4$ in Structure I each independently represent a hydrogen atom or an alkyl, aryl, cycloalkyl, aralkyl, or alkaryl group. The carbon atom (C) in Structure I is part of the chain of one or more carbons ("carbon chain") of the positively charged organic group. The carbon atom is either directly ether-linked to a glucose monomeric unit of graft copolymer herein, or is part of a chain of two or more carbon atoms ether-linked to the glucose monomeric unit. The carbon atom in Structure I can be —$CH_2$—, —CH— (where an H is substituted with another group such as a hydroxy group), or —C— (where both H's are substituted).

A substituted ammonium group can be a "primary ammonium group", "secondary ammonium group", "tertiary ammonium group", or "quaternary ammonium" group, depending on the composition of $R_2$, $R_3$ and $R_4$ in Structure I. A primary ammonium group herein refers to Structure I in which each of $R_2$, $R_3$ and $R_4$ is a hydrogen atom (i.e., —C—$NH_3^+$). A secondary ammonium group herein refers to Structure I in which each of $R_2$ and $R_3$ is a hydrogen atom and $R_4$ is an alkyl, aryl, cycloalkyl, aralkyl, or alkaryl group. A tertiary ammonium group herein refers to Structure I in which $R_2$ is a hydrogen atom and each of $R_3$ and $R_4$ is an alkyl, aryl, cycloalkyl, aralkyl, or alkaryl group. A quaternary ammonium group herein refers to Structure I in which each of $R_2$, $R_3$ and $R_4$ is an alkyl, aryl, cycloalkyl, aralkyl, or alkaryl group (i.e., none of $R_2$, $R_3$ and $R_4$ is a hydrogen atom).

A quaternary ammonium graft copolymer ether herein can comprise a trialkyl ammonium group (where each of $R_2$, $R_3$ and $R_4$ is an alkyl group), for example. A trimethylammonium group is an example of a trialkyl ammonium group, where each of $R_2$, $R_3$ and $R_4$ is a methyl group. It would be understood that a fourth member (i.e., $R_1$) implied by "quaternary" in this nomenclature is the chain of one or more carbons of the positively charged organic group that is ether-linked to a glucose monomeric unit of the graft copolymer.

An example of a quaternary ammonium graft copolymer ether compound is trimethylammonium hydroxypropyl dextran-alpha-1,3-glucan graft copolymer. The positively charged organic group of this ether compound can be represented as Structure II:

(II)

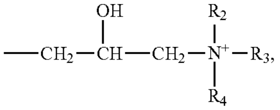

where each of $R_2$, $R_3$ and $R_4$ is a methyl group. Structure II is an example of a quaternary ammonium hydroxypropyl group.

The term "etherification reaction" and similar terms herein refer to a reaction comprising at least a graft copolymer as presently disclosed and an etherification agent. These components are typically dissolved and/or mixed under alkaline conditions (typically, in an aqueous solvent comprising alkali hydroxide). A reaction is placed under suitable conditions (e.g., time, temperature) for the etherification agent to etherify one or more hydroxyl groups of glucose monomeric units of graft copolymer with an organic group herein, thereby yielding a graft copolymer ether compound.

The term "alkaline conditions" herein refers to a solution or mixture pH of at least 11 or 12. Alkaline conditions can be prepared by any means known in the art, such as by dissolving an alkali hydroxide in an aqueous composition.

The terms "etherification agent", "alkylation agent" and the like are used interchangeably herein. An etherification agent herein refers to an agent that can be used to etherify one or more hydroxyl groups of one or more glucose monomeric units of a graft copolymer with an organic group. An etherification agent thus comprises at least one organic group.

The term "molar substitution" (M.S.) as used herein refers to the moles of an organic group per glucose monomeric unit of a graft copolymer. It is noted that the M.S. value for a graft copolymer herein can have a very high upper limit, for example in the hundreds or even thousands. For example, when an organic group containing a hydroxyl group (e.g., hydroxyethyl or hydroxypropyl) has been etherified to a graft copolymer, the hydroxyl group of the etherified organic group may undergo further reaction, thereby coupling more of the organic group to the ether compound.

Terms used herein regarding "esters" (e.g., graft copolymer ester derivative) can be as defined in U.S. Patent Appl. Publ. Nos. 2014/0187767, 2018/0155455, or 2020/0308371, or Int. Patent Appl. Publ. No. WO2018/098065, which are incorporated herein by reference.

A graft copolymer ester derivative compound is termed an "ester" herein by virtue of comprising the substructure —$C_G$—O—CO—C—, where "—$C_G$—" represents a carbon atom of a glucose monomeric unit of a graft copolymer ester compound (where such carbon atom was bonded to a hydroxyl group [—OH] in the graft copolymer precursor of the ester), and where "—CO—C—" is comprised in the acyl group.

The term "esterification reaction" and similar terms in some aspects refer to a reaction comprising at least a graft copolymer as presently disclosed, at least one acid catalyst, at least one acid anhydride and at least one organic acid. Such a reaction is substantially anhydrous. A reaction is placed under suitable conditions (e.g., time, temperature) for esterification of one or more hydroxyl groups of the glucose units of a graft copolymer with an acyl group from at least the acid anhydride, thereby yielding a graft copolymer ester compound. The terms "substantially anhydrous", "anhydrous" and the like herein refer to conditions in which there is less than about 1.5 wt % or 2.0 wt % water. Such conditions may characterize a reaction or component thereof, for example.

Herein, a graft copolymer that is "acid-exchanged" for esterification processing has been treated with acid to remove water from the graft copolymer. An acid-exchange process for producing acid-exchanged graft copolymer can comprise one or more treatments in which the graft copolymer is placed in an acid (e.g., organic acid) and then removed from the acid. The term "acid catalyst" as used herein refers to any acid that accelerates progress of an esterification reaction. Examples of acid catalysts are inorganic acids such as sulfuric acid ($H_2SO_4$) and perchloric acid ($HClO_4$).

The term "acid anhydride" as used herein refers to an organic compound that has two acyl groups bound to the same oxygen atom. Typically, an acid anhydride herein has the formula $(R—CO)_2O$, where R is a saturated linear carbon chain. The terms "organic acid" and "carboxylic acid" are used interchangeably herein. An organic acid has the formula R—COOH, where R is an organic group and COOH is a carboxylic group.

The terms "graft copolymer carbamate derivative", "graft copolymer carbamate", "carbamoyl graft copolymer" and the like are used interchangeably herein. A graft copolymer carbamate derivative contains the linkage moiety —OCONH— or

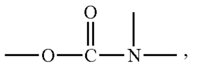

and thus comprises the substructure —$C_G$—OCONH—$C_R$— or —$C_G$—OCON—$C_{R2}$—, where "—$C_G$—" represents a carbon of a monomer unit (e.g., glucose) of the graft copolymer carbamate derivative, and "—$C_R$—" is comprised in the organic group. In some aspects, the nitrogen atom of a carbamate/carbamoyl moiety is linked to a hydrogen atom and an organic group. In some aspects, however, the nitrogen atom of a carbamate/carbamoyl moiety is linked to two organic groups (as indicated by "—$C_{R2}$—" above), which can be the same (e.g., two methyl groups, two ethyl groups) or different (e.g., a methyl group and an ethyl group).

The terms "graft copolymer sulfonyl derivative", "graft copolymer" and the like are used interchangeably herein. A graft copolymer sulfonyl derivative contains the linkage moiety —$OSO_2$—, and thus comprises the substructure —$C_G$—O—$SO_2$—$C_R$—, where "—$C_G$—" represents a carbon of a monomer unit (e.g., glucose) of the graft copolymer sulfonyl derivative, and "—$C_R$—" is comprised in the organic group. A sulfonyl linkage herein is not ionizable. Sulfonyl groups of a graft copolymer sulfonyl derivative herein can be as disclosed, for example, in U.S. Appl. No. 63/037,076, which is incorporated herein by reference.

A "sulfonate" group herein can be as disclosed, for example, in Int. Pat. Appl. Publ. No. WO2019/246228, which is incorporated herein by reference.

The term "degree of substitution" (DoS, or DS) as used herein refers to the average number of hydroxyl groups that are substituted (with organic groups via ether linkage, or with acyl groups via ester linkage, or via other linkage herein) in each monomeric unit (glucose) of a graft copolymer ether- or ester-derivative, or other derivative, herein. The DoS of a graft copolymer derivative herein can be stated with reference to the DoS of a specific substituent, or the overall DoS, which is the sum of the DoS values of different substituent types of a mixed ether or mixed ester derivative (or other type of mixed substituent derivative). Unless otherwise disclosed, when DoS is not stated with reference to a specific substituent type, the overall DoS is meant.

The terms "crosslink", "crosslinked" and the like herein as applying to a graft copolymer derivative compound refer to one or more bonds (typically covalent) that connect polymers. A crosslink having multiple bonds typically comprises one or more atoms that are part of a crosslinking agent that was used to form the crosslink. The terms "crosslinking agent", "crosslinker" and the like herein refer to an atom or compound that can create crosslinks between graft copolymer derivative compounds. The term "crosslinking reaction" and like terms (e.g., "crosslinking composition", "crosslinking preparation") herein typically refer to a reaction comprising at least a solvent, a crosslinking agent, and a graft copolymer derivative. A crosslinking reaction in some aspects comprises an aqueous solvent such as water, whereas in other aspects the solvent is non-aqueous. A crosslinking reaction can be with graft copolymer derivatives after their synthesis (typically isolated from an ether- or ester-derivatization reaction), or during their synthesis in an ether- or ester-derivatization reaction.

A composition herein comprising a graft copolymer or derivative thereof that is "dry" or "dried" typically has less than 6, 5, 4, 3, 2, 1, 0.5, or 0.1 wt % water comprised therein.

A material herein such as a graft copolymer or derivative thereof that is "biodegradable" has a biodegradability as determined, for example, by a Carbon Dioxide Evolution Test Method (e.g., OECD Guideline 301B, incorporated herein by reference) of at least 5% after 60 or 90 days. In this test, the amount of $CO_2$ produced by the material (corrected for that evolved by a blank inoculum) is expressed as a percentage of the theoretical amount of $CO_2$ ($TCO_2$) that could have been produced if complete biodegradation of the material had occurred.

The terms "particle", "particulate" and like terms are interchangeably used herein, and refers to the smallest identifiable unit in a particulate system.

The terms "percent by volume", "volume percent", "vol %", "v/v %" and the like are used interchangeably herein. The percent by volume of a solute in a solution can be determined using the formula: [(volume of solute)/(volume of solution)]×100%.

The terms "percent by weight", "weight percentage (wt %)", "weight-weight percentage (% w/w)" and the like are used interchangeably herein. Percent by weight refers to the percentage of a material on a mass basis as it is comprised in a composition, mixture, or solution.

The terms "weight/volume percent", "w/v %" and the like are used interchangeably herein. Weight/volume percent can be calculated as: ((mass [g] of material)/(total volume [mL] of the material plus the liquid in which the material is placed))×100%. The material can be insoluble in the liquid (i.e., be a solid phase in a liquid phase, such as with a dispersion), or soluble in the liquid (i.e., be a solute dissolved in the liquid).

The terms "aqueous liquid", "aqueous fluid", "aqueous conditions", "aqueous setting", "aqueous system" and the like as used herein can refer to water or an aqueous solution. An "aqueous solution" herein can comprise one or more dissolved salts, where the maximal total salt concentration can be about 3.5 wt % in some embodiments. Although aqueous liquids herein typically comprise water as the only solvent in the liquid, an aqueous liquid can optionally comprise one or more other solvents (e.g., polar organic solvent) that are miscible in water. Thus, an aqueous solution can comprise a solvent having at least about 10 wt % water.

An "aqueous composition" herein has a liquid component that comprises about, or at least about, 10, 20, 30, 40, 50, 60, 70, 80, 90, 95, 99, or 100 wt % water, for example. Examples of aqueous compositions include mixtures, solutions, dispersions (e.g., suspensions, colloidal dispersions) and emulsions, for example. In some embodiments, the pH of an aqueous composition is between ~2 and ~11 (e.g., between ~4 and ~9).

As used herein, the term "colloidal dispersion" refers to a heterogeneous system having a dispersed phase and a dispersion medium, i.e., microscopically dispersed insoluble particles are suspended throughout another substance (e.g., an aqueous composition such as water or aqueous solution). An example of a colloidal dispersion herein is a hydrocolloid. All, or a portion of, the particles of a colloidal dispersion such as a hydrocolloid can comprise insoluble graft copolymer or insoluble derivative thereof as presently disclosed. The terms "dispersant" and "dispersion agent" are used interchangeably herein to refer to a material that promotes the formation and/or stabilization of a dispersion. "Dispersing" herein refers to the act of preparing a dispersion of a material in an aqueous liquid. As used herein, the term "latex" (and like terms) refers to a dispersion of one or more types of polymer particles in water or aqueous solution; particles of insoluble graft copolymer or insoluble derivative thereof in some aspects can be in a latex composition as a dispersed polymer component. In some aspects, a latex is an emulsion that comprises a dispersion of particles of insoluble graft copolymer or insoluble derivative thereof. An "emulsion" herein is a dispersion of minute droplets of one liquid in another liquid in which the droplets are not soluble or miscible (e.g., a non-polar substance such as oil or other organic liquid such as an alkane, in a polar liquid such as water or aqueous solution). An emulsion can further comprise an alpha-glucan graft copolymer herein, for example, which optionally can stabilize the emulsion.

Alpha-glucan graft copolymer derivatives in some aspects of the present disclosure can provide stability to a dispersion or emulsion. The "stability" (or the quality of being "stable") of a dispersion or emulsion herein is, for example, the ability of dispersed particles of a dispersion, or liquid droplets dispersed in another liquid (emulsion), to remain dispersed (e.g., about, or at least about, 70, 75, 80, 85, 90, 95, 96, 97, 98, 99, or 100 wt % of the particles of the dispersion or liquid droplets of the emulsion are in a dispersed state) for a period of about, or at least about, 2, 4, 6, 9, 12, 18, 24, 30, or 36 months following initial preparation of the dispersion or emulsion. A stable dispersion or emulsion can resist total creaming, sedimentation, flocculation, and/or coalescence of dispersed/emulsified material.

A graft copolymer or derivative thereof that is "insoluble", "aqueous-insoluble", "water-insoluble" (and like terms) herein does not dissolve (or does not appreciably dissolve) in water or other aqueous conditions, optionally where the aqueous conditions are at a pH of 4-9 (e.g., pH 6-8) and/or a temperature of about 1 to 130° C. (e.g., 20-25° C.). In some aspects, less than 1.0 gram (e.g., no detectable amount) of an aqueous-insoluble graft copolymer or derivative thereof dissolves in 1000 milliliters of such aqueous conditions (e.g., water at 23° C.). In contrast, a graft copolymer or derivative thereof that is "soluble", "aqueous-soluble", "water-soluble" and the like appreciably dissolves under the above aqueous conditions.

The term "viscosity" as used herein refers to the measure of the extent to which a fluid (aqueous or non-aqueous) resists a force tending to cause it to flow. Various units of viscosity that can be used herein include centipoise (cP, cps) and Pascal-second (Pa·s), for example. A centipoise is one one-hundredth of a poise; one poise is equal to 0.100 $kg \cdot m^{-1} \cdot s^{-1}$. Viscosity can be reported as "intrinsic viscosity" (IV, η, units of dL/g) in some aspects; this term refers to a measure of the contribution of a glucan polymer to the viscosity of a liquid (e.g., solution) comprising the glucan polymer. IV measurements herein can be obtained, for example, using any suitable method such as disclosed in U.S. Pat. Appl. Publ. Nos. 2017/0002335, 2017/0002336, or 2018/0340199, or Weaver et al. (*J. Appl. Polym. Sci.* 35:1631-1637) or Chun and Park (*Macromol. Chem. Phys.* 195:701-711), which are all incorporated herein by reference. IV can be measured, in part, by dissolving glucan polymer (optionally dissolved at about 100° C. for at least 2, 4, or 8 hours) in DMSO with about 0.9 to 2.5 wt % (e.g., 1, 2, 1-2 wt %) LiCl, for example. IV herein can optionally be used as a relative measure of molecular weight.

The term "absorb" and like terms as used herein refers to the action of taking up (soaking up) an aqueous liquid. Absorption by a composition as presently disclosed can be measured in terms of water retention value (WRV) and/or centrifugal retention capacity (CRC) as disclosed herein, for example.

The term "household care product" and like terms typically refer to products, goods and services relating to the treatment, cleaning, caring and/or conditioning of a home and its contents. The foregoing include, for example, chemicals, compositions, products, or combinations thereof having application in such care.

The terms "fabric", "textile", "cloth" and the like are used interchangeably herein to refer to a woven material having a network of natural and/or artificial fibers. Such fibers can be in the form of thread or yarn, for example.

A "fabric care composition" and like terms refer to any composition suitable for treating fabric in some manner. Examples of such a composition include laundry detergents and fabric softeners, which are examples of laundry care compositions.

A "detergent composition" herein typically comprises at least a surfactant (detergent compound) and/or a builder. A "surfactant" herein refers to a substance that tends to reduce the surface tension of a liquid in which the substance is dissolved. A surfactant may act as a detergent, wetting agent, emulsifier, foaming agent, and/or dispersant, for example.

The terms "heavy duty detergent", "all-purpose detergent" and the like are used interchangeably herein to refer to a detergent useful for regular washing of white and colored textiles at any temperature. The terms "low duty detergent", "fine fabric detergent" and the like are used interchangeably herein to refer to a detergent useful for the care of delicate fabrics such as viscose, wool, silk, microfiber or other fabric requiring special care. "Special care" can include conditions of using excess water, low agitation, and/or no bleach, for example.

The terms "builder", "builder agent" and the like herein refer to compositions that, for example, can complex with hard water cations such as calcium and magnesium cations. Such complex formation is believed to prevent the formation of water-insoluble salts and/or other complexes by the cation(s). In the context of a detergent composition for cleaning or maintenance applications, a builder added thereto typically can enhance or maintain the cleaning efficiency of a surfactant present in the detergent composition. The terms "builder capacity", "builder activity" and the like are used interchangeably herein and refer to the ability of an aqueous composition to exhibit features endowed by one or more builders present in the aqueous composition.

The term "personal care product" and like terms typically refer to products, goods and services relating to the treatment, cleaning, cleansing, caring or conditioning of a person. The foregoing include, for example, chemicals, compositions, products, or combinations thereof having application in such care.

An "oral care composition" herein is any composition suitable for treating a soft or hard surface in the oral cavity such as dental (teeth) and/or gum surfaces.

The terms "ingestible product", "ingestible composition" and the like refer to any substance that, either alone or together with another substance, may be taken orally (i.e., by mouth), whether intended for consumption or not. Thus, an ingestible product includes food/beverage products. "Food/beverage products" refer to any edible product intended for consumption (e.g., for nutritional purposes) by humans or animals, including solids, semi-solids, or liquids. A "food" herein can optionally be referred to as a "foodstuff", "food product", or other like term, for example. "Non-edible products" ("non-edible compositions") refer to any composition that can be taken by the mouth for purposes other than food or beverage consumption. Examples of non-edible products herein include supplements, nutraceuticals, functional food products, pharmaceutical products, oral care products (e.g., dentifrices, mouthwashes), and cosmetic products such as sweetened lip balms. A "pharmaceutical product", "medicine", "medication", "drug" or like term herein refers to a composition used to treat disease or injury, and can be administered enterally or parenterally.

The term "medical product" and like terms typically refer to products, goods and services relating to the diagnosis, treatment, and/or care of patients.

The term "industrial product" and like terms typically refer to products, goods and services used in industrial settings, but typically not by individual consumers.

The terms "flocculant", "flocculation agent", "flocculation composition", "agglomeration agent", and the like herein refer to substances that can promote agglomeration/clumping/coalescence of insoluble particles suspended in water or other aqueous liquid, thereby rendering the particles more easy to remove by settling/sedimentation, filtration, pelleting, and/or other suitable means. Flocculation of particles typically can be performed in a process of removing/separating particles from an aqueous suspension. Graft copolymer derivatives in some aspects can be used as flocculants.

The terms "film", "sheet" and like terms herein refer to a generally thin, visually continuous material. A film can be comprised as a layer or coating on a material, or can be alone (e.g., not attached to a material surface; free-standing). A "coating" (and like terms) as used herein refers to a layer covering a surface of a material. The term "uniform thickness" as used to characterize a film or coating herein can refer to a contiguous area that (i) is at least 20% of the total film/coating area, and (ii) has a standard deviation of thickness of less than about 50 nm, for example. The term "continuous layer" means a layer of a composition applied to at least a portion of a substrate, wherein a dried layer of the composition covers ≥99% of the surface to which it has been applied and having less than 1% voids in the layer that expose the substrate surface. The ≥99% of the surface to which the layer has been applied excludes any area of the substrate to which the layer has not been applied. A coating herein can make a continuous layer in some aspects. A coating composition (and like terms) herein refers to all the solid components that form a layer on a substrate, such as graft copolymer derivative material herein and, optionally, pigment, surfactant, dispersing agent, binder, crosslinking agent, and/or other additives.

The term "paint" (and like terms) herein is a type of coating composition that is a dispersion of a pigment in a suitable liquid (e.g., aqueous liquid) that can be used to form an adherent coating when spread on a surface in a thin coat. Paint as applied to a surface can provide coloration/decoration, protection, and/or treatment (e.g., primer) to the surface. A paint herein, by virtue of further comprising dispersed insoluble alpha-1,3-glucan (i.e., a dispersed polymer), can optionally be characterized as a latex or latex paint.

The terms "sequence identity", "identity" and the like as used herein with respect to a polypeptide amino acid sequence (e.g., that of a glucosyltransferase) are as defined and determined in U.S. Patent Appl. Publ. No. 2017/0002336, which is incorporated herein by reference.

Various polypeptide amino acid sequences are disclosed herein as features of certain embodiments. Variants of these sequences that are at least about 70-85%, 85-90%, or 90%-95% identical to the sequences disclosed herein can be used or referenced. Alternatively, a variant amino acid sequence can have at least 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 99.5% identity with a sequence disclosed herein. The variant amino acid sequence has the same function/activity of the disclosed sequence, or at least about 80%, 81%, 82%, 83%, 84%, 85%, 86%, 87%, 88%, 89%, 90%, 91%, 92%, 93%, 94%, 95%, 96%, 97%, 98%, or 99% of the function/activity of the disclosed sequence.

The term "isolated" means a substance (or process) in a form or environment that does not occur in nature. A non-limiting example of an isolated substance includes any non-naturally occurring substance such as a graft copolymer or derivative thereof herein (as well as enzymatic and/or chemical reactions used to prepare these materials). It is believed that the embodiments disclosed herein are synthetic/man-made (could not have been made except for human intervention/involvement), and/or have properties that are not naturally occurring.

The term "increased" as used herein can refer to a quantity or activity that is at least about 1%, 2%, 3%, 4%, 5%, 6%, 7%, 8%, 9%, 10%, 11%, 12%, 13%, 14%, 15%, 16%, 17%, 18%, 19%, 20%, 50%, 100%, or 200% more than the quantity or activity for which the increased quantity or activity is being compared. The terms "increased", "elevated", "enhanced", "greater than", "improved" and the like are used interchangeably herein.

New forms of alpha-1,3-glucan are desired to enhance the economic value and performance characteristics of this material in various applications. Compositions comprising alpha-1,3-glucan in the form of graft copolymers and derivatives thereof are presently disclosed to address this need.

Some embodiments of the present disclosure concern a composition that comprises at least one graft copolymer ether or ester compound (or other deriv. herein) having a degree of substitution (DoS) up to about 3.0, wherein the graft copolymer portion of the compound comprises:

(i) a backbone comprising dextran, and (ii) alpha-glucan side chains comprising at least about 30% alpha-1,3 glycosidic linkages. Dextran-alpha-glucan copolymer derivatives as presently disclosed have several advantageous features, such as, in some aspects, having a high aqueous liquid absorption capacity and/or an enhanced ability to flocculate particles in an aqueous suspension.

A dextran forming the backbone of a graft copolymer precursor of a derivative herein can comprise, for example, about, or at least about, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100% alpha-1,6-glycosidic linkages. Such a percent alpha-1,6 linkage profile takes into account the total of all linkages in the dextran (main chains of alpha-1,6 glucan and, if present, branch portions therefrom). "Dextran branches" and like terms herein are meant to encompass any branches that exist in a dextran polymer prior to its use to prepare a graft copolymer as disclosed.

A dextran herein can comprise, for example, about, at least about, or less than about, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50% alpha-1,4, alpha-1,3 and/or alpha-1,2 glycosidic linkages. Typically, such linkages exist entirely, or almost entirely, as branch points from alpha-1,6-glucan chains in the dextran. In some aspects, dextran branches can be all alpha-1,4, alpha-1,3, or alpha-1,2, or a combination of two or all three of these types of linkages. In some aspects, such as with dextran having main chains (e.g., dendritic dextran, or branched but not dendritic) with about, or at least about, 90%, 91%, 92%, 93%, 94%, 95%, 96%, 97%, 98%, 99%, 100%, 92-98%, 93-97%, or 94-96% alpha-1,6 linkages, such dextran comprises about, at least about, or less than about, 1%, 2%, 3%, 4%, 5%, 6%, 7%, 8%, 9%, 10%, 2-8%, 3-7%, or 4-6% alpha-1,4, alpha-1,3 and/or alpha-1,2 linkages in branches. A branch typically is of one glucose unit (a pendant glucose), but can be two or three glucose units in length, for example. In some aspects, dextran used as a backbone in a graft copolymer herein does not comprise any alpha-1,4, alpha-1,3 and/or alpha-1,2 branches. In some aspects, a glycosidic linkage profile can be as measured using nuclear magnetic resonance (NMR) spectroscopy, such as $^{1}H$-NMR or $^{13}C$-NMR spectroscopy.

A backbone of a graft copolymer herein can be comprised entirely of a dextran as presently disclosed. However, in some aspects, a backbone can comprise other elements. For example, a graft copolymer backbone can comprise alpha-1,3-glucan originating from the non-reducing end of a dextran main chain (or non-reducing ends of main chains of a dendritic dextran, or branched but not dendritic dextran), by virtue of a main chain (at its non-reducing end) serving to prime alpha-1,3-glucan synthesis during synthesis of the graft copolymer.

The molecular weight (Mw [weight-average molecular weight]) of a dextran herein (i.e., the backbone portion of a graft copolymer herein, or the dextran used to synthesize a graft copolymer) can be about, at least about, or less than about, 1000, 2500, 5000, 7500, 10000, 25000, 50000, 75000, 100000, 150000, 200000, 250000, 500000, 750000, 1000000, 1000-10000, 1000-100000, 1000-1000000, 10000-100000, 10000-1000000, or 100000-1000000 Daltons, for example. In some aspects, the Mw is about, at least about, or less than about, 1, 2, 3, 4, 5, 6, 7, 8, 9, 10, 20, 30, 40, 50, 60, 70, 80, 90, 100, 110, 120, 130, 140, 150, 160, 170, 180, 190, 200, 10-50, 10-70, 10-80, 10-100, 10-120, 10-130, 10-150, 10-200, 25-50, 25-70, 25-80, 25-100, 25-120, 25-130, 25-150, 25-200, 50-70, 50-80, 50-100, 50-120, 50-130, 50-150, 50-200, 70-80, 70-100, 70-120, 70-130, 70-150, 70-200, 80-100, 80-120, 80-130, 80-150, 80-200, 100-120, 100-130, 100-150, 100-200, 120-130, 120-150, 120-200, 130-150, or 130-200 million Daltons, for example. Any dextran Mw herein can optionally be expressed as weight-average degree of polymerization (DPw), which is Mw divided by 162.14 (the calculated DPw can be rounded to the nearest whole number).

In some aspects, dextran can comprise (i) about 87-91.5 wt % glucose linked only at positions 1 and 6; (ii) about 0.1-1.2 wt % glucose linked only at positions 1 and 3; (iii) about 0.1-0.7 wt % glucose linked only at positions 1 and 4; (iv) about 7.7-8.6 wt % glucose linked only at positions 1, 3 and 6; and (v) about 0.4-1.7 wt % glucose linked only at: (a) positions 1, 2 and 6, or (b) positions 1, 4 and 6. In certain embodiments, a dextran can comprise (i) about 89.5-90.5 wt % glucose linked only at positions 1 and 6; (ii) about 0.4-0.9 wt % glucose linked only at positions 1 and 3; (iii) about 0.3-0.5 wt % glucose linked only at positions 1 and 4; (iv) about 8.0-8.3 wt % glucose linked only at positions 1, 3 and 6; and (v) about 0.7-1.4 wt % glucose linked only at: (a) positions 1, 2 and 6, or (b) positions 1, 4 and 6. Such a glycosidic linkage profile can be as measured using methylation analysis and/or gas chromatography (GC) coupled to mass spectrometry or flame ionization detection, for instance. In some aspects, such a glycosidic linkage profile can be determined using a protocol that is similar to, or the same as, the protocols disclosed in U.S. Appl. Publ. No. 2016/0122445 (e.g., para. 97 or Example 9 therein), which is incorporated herein by reference.

A dextran backbone in some aspects can be branched in structure (e.g., dendritic, or not dendritic), in which long chains (e.g., containing ≥90%, 91%, 92%, 93%, 94%, 95%, 96%, 97%, 98%, 99%, or 100% alpha-1,6-linkages) iteratively branch from each other (a long chain can be a branch from another long chain, which in turn can itself be a branch from another long chain, and so on). Branch points in a branching dextran can be as described above. For example, individual branch points can be of a single glucose unit that is alpha-1,2-, alpha-1,3, or alpha-1,4-branched from a long chain; another long chain can be linked via alpha-1,6 to such a branched glucose unit. About 5%, 10%, 15%, 20%, 25%, 30%, 35%, 40%, 45%, 50%, 60%, 65%, 70%, 80%, 85%, 90%, 95%, 96%, 97%, 98%, 99%, or 100% of all branch points of a branching dextran branch into (extend into) a long chain, for example, whereas the balance of these branch points are terminal (i.e., are pendant glucose units). For example, with a branching dextran having about 95% alpha-1,6 linkages and 5% branching linkages (e.g., alpha-1,3, -1,2, or -1,4), it can be said in some aspects that such a dextran has ~95% alpha-1,6 linkages, ~3% terminal branching linkages and ~2% extended branching linkages (or ~2% terminal branching linkages and ~3% extended branching linkages in another aspect). The long chains of a branching dextran can be similar in length in some aspects. By being similar in length, it is meant that the individual length (degree of polymerization [DP]) of at least 70%, 75%, 80%, 85%, or 90% of all the long chains in a branching dextran is within plus/minus 15% (or 10%, 5%) of the mean length of all the long chains of the branching dextran. In some aspects, the mean length (average length) of alpha-1,6-linked regions of long chains that do not have a branch point (distance between branch points) is about 10-75, 10-60, 10-55, 20-75, 20-60, 20-55, 30-75, 30-60, 30-55, 40-75, 40-60, 40-55, 45-75, 45-60, or 45-55 DP.

The z-average radius of gyration of a large dextran herein (e.g., any Mw disclosed herein ≥10 million Daltons) can be about 200-280 nm. For example, the z-average Rg can be about 200, 205, 210, 215, 220, 225, 230, 235, 240, 245, 250, 255, 260, 265, 270, 275, or 280 nm (or any integer between 200-280 nm). As other examples, the z-average Rg can be about 200-280, 200-270, 200-260, 200-250, 200-240, 200-230, 220-280, 220-270, 220-260, 220-250, 220-240, 220-230, 230-280, 230-270, 230-260, 230-250, 230-240, 240-280, 240-270, 240-260, 240-250, 250-280, 250-270, or 250-260 nm. The term "radius of gyration" (Rg) herein refers to the mean radius of dextran, and is calculated as the root-mean-square distance of a dextran molecule's components (atoms) from the molecule's center of gravity. Rg can be provided in Angstrom or nanometer (nm) units, for example. The "z-average radius of gyration" of dextran herein refers to the Rg of dextran as measured using light scattering (e.g., MALS). Methods for measuring z-average Rg are known and can be used herein, accordingly. For example, z-average Rg can be measured as disclosed in U.S. Pat. No. 7,531,073, U.S. Patent Appl. Publ. Nos. 2010/0003515 and 2009/0046274, Wyatt (*Anal. Chim. Acta* 272: 1-40), and Mori and Barth (Size Exclusion Chromatography, Springer-Verlag, Berlin, 1999), all of which are incorporated herein by reference.

The Mw and/or z-average Rg of a large dextran in some aspects can be measured following a protocol similar to, or the same as, the protocols disclosed in U.S. Appl. Publ. No. 2016/0122445 (e.g., para. 105 or Example 9 therein), which is incorporated herein by reference.

A large dextran in some aspects can be enzymatically synthesized according to the disclosure of U.S. Patent Appl. Publ. No. 2016/0122445, which is incorporated herein by reference. For example, as described in this reference, such a dextran can be produced in a suitable reaction comprising GTF 0768 (SEQ ID NO:1 or 2 of US2016/0122445), or a GTF comprising an amino acid sequence that is at least 90%, 91%, 92%, 93%, 94%, 95%, 96%, 97%, 98%, or 99% identical to the amino acid sequence of GTF 0768. Dextran in some aspects can be enzymatically synthesized according to the disclosures of U.S. Patent Appl. Publ. Nos. 2017/0218093 and 2018/0282385, which are all incorporated herein by reference. For example, the GTF identified as GTF 8117 (SEQ ID NO:30), GTF 6831 (SEQ ID NO:32), or GTF 5604 (SEQ ID NO: 33) in 2018/0282385 can be used, if desired, or a GTF comprising an amino acid sequence that is at least about 90%, 91%, 92%, 93%, 94%, 95%, 96%, 97%, 98%, or 99% identical to the amino acid sequence of any of these GTF enzymes.

Dextran in some aspects can be enzymatically branched to include alpha-1,2, alpha-1,3, and/or alpha-1,4 branches prior to adding alpha-glucan side chains herein to form a graft copolymer for chemical derivatization. For example, dextran can be alpha-1,2-branched in a suitable reaction using an alpha-1,2-branching enzyme such as GTF J18T1 (SEQ ID NO:27) or GTF 9905 (residues 36-1672 of SEQ ID NO:4) as disclosed in U.S. Patent Appl. Publ. No. 2018/0282385, which is incorporated herein by reference, or a GTF comprising an amino acid sequence that is at least 90%, 91%, 92%, 93%, 94%, 95%, 96%, 97%, 98%, or 99% identical to the amino acid sequence of any of these GTF enzymes. Also for example, dextran can be alpha-1,3-branched in a suitable reaction using an alpha-1,3-branching enzyme as disclosed in Int. Patent Appl. Publ. No. WO2021/007264 or U.S. Patent Appl. Publ. No. 2016/0136199, which are incorporated herein by reference, or a GTF comprising an amino acid sequence that is at least 90%, 91%, 92%, 93%, 94%, 95%, 96%, 97%, 98%, or 99% identical to the amino acid sequence of any such GTF enzyme.

A graft copolymer precursor of a derivative herein as presently disclosed comprises one or more alpha-glucan side chains comprising at least about 30% alpha-1,3 glycosidic linkages.

An alpha-glucan side chain in some aspects can comprise about, or at least about, 30%, 40%, 50%, 60%, 70%, 80%, 85%, 90%, 91%, 92%, 93%, 94%, 95%, 96%, 97%, 98%, 99%, or 100% alpha-1,3 glycosidic linkages. In some aspects, accordingly, an alpha-glucan side chain has about, or less than about, 70%, 60%, 50%, 40%, 30%, 20%, 15%, 10%, 9%, 8%, 7%, 6%, 5%, 4%, 3%, 2%, 1%, or 0% glycosidic linkages that are not alpha-1,3. Typically, the glycosidic linkages that are not alpha-1,3 are mostly or entirely alpha-1,6. It should be understood that the higher the percentage of alpha-1,3 linkages present in a side chain, the greater the probability that the side chain is linear, since there are lower occurrences of certain linkages that might be part of branch points in the side chain. In some aspects, an alpha-glucan side chain has no branch points or less than about 5%, 4%, 3%, 2%, or 1% branch points as a percent of the glycosidic linkages in the side chain.

Glucosyltransferases, reaction conditions, and/or processes contemplated to be useful for producing alpha-glucan side chains herein are disclosed in U.S. Pat. Nos. 7,000,000, 8,871,474, 10,301,604 and 10,260,053, U.S. Patent Appl. Publ. Nos. 2020/0165360, 2019/0112456, 2019/0078062, 2019/0078063, 2018/0340199, 2018/0021238, 2018/0273731, 2017/0002335, 2015/0232819 and 2015/0064748, and Int. Patent Appl. Publ. No. WO2017/079595, for example, all of which are incorporated herein by reference.

The DPw, DPn, or DP of one or more alpha-glucan side chains in some aspects can be about, or at least about, 11, 12, 15, 20, 25, 30, 35, 40, 45, 50, 55, 60, 65, 70, 75, 80, 85, 90, 95, 100, 150, 200, 300, 400, 500, 600, 700, 800, 900, 1000, 1100, 1200, 1300, 1400, 1500, 1600, or 1650. DPw, DPn, or DP can optionally be expressed as a range between any two of these values. Merely as examples, the DPw, DPn, or DP of one or more alpha-glucan side chains in some aspects can be about 100-1650, 200-1650, 300-1650, 400-1650, 500-1650, 600-1650, 700-1650, 100-1250, 200-1250, 300-1250, 400-1250, 500-1250, 600-1250, 700-1250, 100-1000, 200-1000, 300-1000, 400-1000, 500-1000, 600-1000, 700-1000, 100-900, 200-900, 300-900, 400-900, 500-900, 600-900, 700-900, 11-25, 12-25, 11-22, 12-22, 11-20, 12-20, 20-300, 20-200, 20-150, 20-100, 20-75, 30-300, 30-200, 30-150, 30-100, 30-75, 50-300, 50-200, 50-150, 50-100, 50-75, 75-300, 75-200, 75-150, 75-100, 100-300, 100-200, 100-150, 150-300, 150-200, or 200-300. In typical aspects in which a graft copolymer has a plurality of alpha-glucan side chains, the individual DP's of the side chains are similar to each other (e.g., the DP's vary by less than 2.5%, 5%, 10%, 15%, or 20%).

Alpha-glucan side chains from a dextran backbone can be linked to the dextran via alpha-1,2, -1,3, and/or -1,4 branches. Alpha-glucan side chains herein can be linked to about, at least about, or less than about, 0.5%, 1%, 2%, 3%, 4%, 5%, 6%, 7%, 8%, 9%, 10%, 15%, 20%, 25%, 30%, 35%, 40%, 45%, 50%, 0.5-10%, 0.5-7%, 0.5-5%, 0.5-3%, 1-10%, 1-7%, 1-5%, 1-3%, 2-10%, 2-7%, 2-5%, or 2-3% of the glucose units of a dextran backbone, for example, through one or more types of alpha-1,2, -1,3, and/or -1,4 branch points. In some aspects, alpha-glucan side chains are linked to dextran through only one of these branch point types (e.g., alpha-1,3).

The number of alpha-glucan side chains of a graft copolymer derivative precursor herein can be, can be at least, or can be less than, 2, 3, 4, 5, 6, 7, 8, 9, 10, 15, 20, 25, 30, 35, 40, 45, 50, 100, 500, 1000, 2500, 5000, 10000, 15000, or 20000 for example. In some aspects, a graft copolymer has about, at least about, or less than about, 5%, 10%, 20%, 30%, 40%, 50%, 60%, 70%, 80%, 90%, or 95% of its original dextran branches/pendant glucoses extended into an alpha-glucan side chain.

A graft copolymer precursor of a graft copolymer derivative herein can be produced using an enzymatic reaction as disclosed in U.S. Patent Appl. Publ. No. 2020/0165360 or Int. Patent Appl. Publ. No. WO2017/079595, which are incorporated herein by reference, for example. Such an enzymatic reaction typically comprises at least: (i) water, (ii) sucrose, (iii) one or more dextran compounds as disclosed herein, and (iv) a glucosyltransferase enzyme that synthesizes alpha-glucan (e.g., a GTF enzyme as disclosed herein for side chain synthesis). Alpha-glucan synthesis by a glucosyltransferase enzyme in this reaction can, in part at least, be via use of the dextran as a primer/acceptor for alpha-glucan synthesis. Following enzymatic production of dextran-alpha-glucan graft copolymer, it can be chemically derivatized to produce a dextran-alpha-glucan graft copolymer derivative (e.g., ether or ester) as presently disclosed.

In some aspects, a glucosyltransferase enzyme for producing an alpha-glucan side chain can comprise an amino acid sequence that is 100% identical to, or at least 90%, 91%, 92%, 93%, 94%, 95%, 96%, 97%, 98%, 99%, or 99.5% identical to, SEQ ID NO: 2, 4, 6, 8, 10, 12, 14, 16, 18, 20, 26, 28, 30, 34, or 59, or amino acid residues 55-960 of SEQ ID NO:4, residues 54-957 of SEQ ID NO:65, residues 55-960 of SEQ ID NO:30, residues 55-960 of SEQ ID NO:28, or residues 55-960 of SEQ ID NO:20, and have glucosyltransferase activity; these amino acid sequences are as disclosed in U.S. Patent Appl. Publ. No. 2019/0078063, which is incorporated herein by reference. It is noted that a glucosyltransferase enzyme comprising SEQ ID NO:2, 4, 8, 10, 14, 20, 26, 28, 30, 34, or amino acid residues 55-960 of SEQ ID NO:4, residues 54-957 of SEQ ID NO:65, residues 55-960 of SEQ ID NO:30, residues 55-960 of SEQ ID NO:28, or residues 55-960 of SEQ ID NO:20, can synthesize alpha-glucan comprising at least about 90% (~100%) alpha-1,3 linkages. Any of the foregoing glucosyltransferase enzyme amino acid sequences can be modified as described below to increase product yield.

A glucosyltransferase enzyme for producing alpha-glucan side chains herein can, in some aspects, synthesize insoluble alpha-1,3-glucan at a yield of at least about 40%, 45%, 50%, 55%, 60%, 65%, 70%, 75%, 80%, 85%, 90%, 91%, 92%, 93%, 94%, 95%, or 96%. Yield in some aspects can be measured based on the glucosyl component of the reaction, and/or as measured using HPLC or NIR spectroscopy. Yield can be achieved in a reaction conducted for about 16-24 hours (e.g., ~20 hours), for example. Examples of such a glucosyltransferase enzyme are those having an amino acid sequence modified such that the enzyme produces more products (alpha-1,3-glucan and fructose), and less by-products (e.g., glucose, oligosaccharides such as leucrose), from a given amount of sucrose substrate. For example, one, two, three, four, or more amino acid residues of the catalytic domain of a glucosyltransferase herein can be modified/substituted to obtain an enzyme that produces more products. Examples of a suitable modified glucosyltransferase enzyme are disclosed in Tables 3-7 of U.S. Patent Appl. Publ. No. 2019/0078063. A modified glucosyltransferase enzyme, for example, can comprise one or more amino acid substitutions corresponding with those in Tables 3-7 (ibid.) that is/are associated with an alpha-1,3-glucan yield of at least 40% (the position numbering of such at least one substitution corresponds with the position numbering of SEQ ID NO:62 as disclosed in U.S. Patent Appl. Publ. No. 2019/0078063). A set of amino acid modifications as listed in Tables 6 or 7 (ibid.) can be used, for example.

The amino acid sequence of a glucosyltransferase enzyme for alpha-glucan side chain synthesis in some aspects has been modified such that the enzyme produces alpha-1,3-glucan with a molecular weight (DPw) that is lower than the molecular weight of alpha-1,3-glucan produced by its corresponding parent glucosyltransferase. Examples of a suitable modified glucosyltransferase enzyme are disclosed in Tables 3 and 4 of U.S. Patent Appl. Publ. No. 2019/0276806, which is incorporated herein by reference. A modified glucosyltransferase enzyme, for example, can comprise one or more amino acid substitutions corresponding with those in Tables 3 and/or 4 (ibid.) that is/are associated with an alpha-1,3-glucan product molecular weight that is at least 5% less than the molecular weight of alpha-1,3-glucan produced by parent enzyme (the position numbering of such at least one substitution corresponds with the position numbering of SEQ ID NO:62). A set of amino acid modifications as listed in Table 4 (ibid.) can be used, for example.

The amino acid sequence of a glucosyltransferase enzyme for alpha-glucan side chain synthesis in some aspects has been modified such that the enzyme produces alpha-1,3-glucan with a molecular weight (DPw) that is higher than the molecular weight of alpha-1,3-glucan produced by its corresponding parent glucosyltransferase. Examples of a suitable modified glucosyltransferase enzyme are disclosed in Tables 3, 4 and 5 of U.S. Patent Appl. Publ. No. 2019/0078062, which is incorporated herein by reference. A modified glucosyltransferase enzyme, for example, can comprise one or more amino acid substitutions corresponding with those in Tables 3, 4 and/or 5 (ibid.) that is/are associated with an alpha-1,3-glucan product molecular weight that is at least 5% higher than the molecular weight of alpha-1,3-glucan produced by parent enzyme (the position numbering of such at least one substitution corresponds with the position numbering of SEQ ID NO:62). A set of amino acid modifications as listed in Table 5 (ibid.) can be used, for example.

In some aspects, a modified glucosyltransferase for alpha-glucan side chain synthesis (i) comprises at least one amino acid substitution or a set of amino acid substitutions (as described above regarding yield or molecular weight), and (ii) comprises or consists of a glucosyltransferase catalytic domain that is at least about 90%, 91%, 92%, 93%, 94%, 95%, 96%, 97%, 98%, 99%, or 99.5% identical to amino acid residues 55-960 of SEQ ID NO:4, residues 54-957 of SEQ ID NO:65, residues 55-960 of SEQ ID NO:30, residues 55-960 of SEQ ID NO:28, or residues 55-960 of SEQ ID NO: 20. Each of these subsequences are the approximate catalytic domains of each respective reference sequence, and are believed to be able to produce alpha-1,3-glucan comprising at least about 50% (e.g., ≥90% or ≥95%) alpha-1,3 linkages. In some aspects, a modified glucosyltransferase (i) comprises at least one amino acid substitution or a set of amino acid substitutions (as described above), and (ii) comprises or consists of an amino acid sequence that is at least about 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 69%, 70%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 99.5% identical to SEQ ID NO: 62 or a subsequence thereof such as SEQ ID NO:4 (without start methionine thereof) or positions 55-960 of SEQ ID NO:4 (approximate catalytic domain).

Additional examples of conditions and/or components suitable for synthesizing alpha-1,3-glucan side chains in graft copolymer production herein are disclosed in U.S. Patent Appl. Publ. Nos. 2014/0087431, 2017/0166938 and 2017/0002335, which are incorporated herein by reference.

The Mw of a graft copolymer precursor of a graft copolymer derivative herein (i.e., the combined Mw of the dextran backbone and the alpha-1,3-glucan side chains of a graft copolymer) can be about, at least about, or less than about, 2000, 2500, 5000, 7500, 10000, 25000, 50000, 75000, 100000, 150000, 200000, 250000, 500000, 750000, 1000000, 1000-10000, 1000-100000, 1000-1000000, 10000-100000, 10000-1000000, or 100000-1000000 Daltons, for example. In some aspects, the Mw is about, at least about, or less than about, 1, 2, 3, 4, 5, 6, 7, 8, 9, 10, 20, 30, 40, 50, 60, 70, 80, 90, 100, 110, 120, 130, 140, 150, 160, 170, 180, 190, 200, 250, 300, 400, 500, 600, 700, 800, 900, 1000, 10-50, 10-100, 10-200, 10-300, 10-400, 10-500, 10-750, 10-1000, 25-50, 25-100, 25-200, 25-300, 25-400, 25-500, 25-750, 25-1000, 50-100, 50-200, 50-300, 50-400, 50-500, 50-750, 50-1000, 75-100, 75-200, 75-300, 75-400, 75-500, 75-750, 75-1000, 100-200, 100-300, 100-400, 100-500, 100-750, 100-1000, 200-300, 200-400, 200-500, 200-750, 200-1000, 400-500, 400-750, or 400-1000 million Daltons, for example. In some aspects, the Mw is the weight as disclosed herein for a dextran backbone, but with the addition of about 0.5, 0.75, 1, 1.25, 1.5, 1.75 or 2 million Daltons. The polydispersity index (Mw/Mn) (PDI) of a graft copolymer precursor of a derivative herein can be about, at least about, or less than about, 5.0, 4.75, 4.5, 4.25, 4.0, 3.75, 3.5, 3.25, 3.0, 2.75, 2.5, 2.25, or 2.0, for example.

A graft copolymer precursor of a graft copolymer derivative herein can comprise about, or at least about, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 99.5 wt % of a dextran backbone as disclosed herein; the balance up to 100 wt % can be with alpha-glucan side chains as disclosed herein. For example, a graft copolymer precursor can comprise about 95 wt % dextran backbone and 5% alpha-glucan side chains. As another example, a graft copolymer precursor can comprise about 80 wt % dextran backbone and 20% alpha-glucan side chains.

A preparation of a graft copolymer herein for producing an ether- or ester-derivative (or other deriv. herein) can sometimes comprise alpha-glucan homopolymer, in addition to the graft copolymer. In some aspects, such a preparation can comprise polysaccharide components having about, or less than about, 1, 2, 5, 10, 15, 20, or 25 wt % alpha-glucan homopolymer; the balance up to 100 wt % of the polysaccharide components can be with the graft copolymer. An alpha-glucan homopolymer can have an alpha-1,3 linkage profile as disclosed herein for alpha-glucan side chains.

A graft copolymer precursor in some aspects is aqueous-insoluble, whereas it is aqueous-soluble in some other aspects.

The degree of substitution (DoS) of a dextran-alpha-glucan graft copolymer herein with one or more etherified organic groups/substituents or esterified acyl groups/substituents (or other deriv. groups herein) can be up to about 3.0, or about 0.001 to about 3.0, for example. The DoS in some aspects can be about, at least about, or up to about, 0.001, 0.0025, 0.005, 0.01, 0.025, 0.05, 0.075, 0.1, 0.2, 0.25, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 (DoS can optionally be expressed as a range between any two of these values). Some examples of DoS ranges herein include 0.05-1.5, 0.05-1.25, 0.05-1.0, 0.05-0.9, 0.05-0.8, 0.05-0.7, 0.05-0.6, 0.05-0.5, 0.1-1.5, 0.1-1.25, 0.1-1.0, 0.1-0.9, 0.1-0.8, 0.1-0.7, 0.1-0.6, 0.1-0.5, 0.15-1.5, 0.15-1.25, 0.15-1.0, 0.15-0.9, 0.15-0.8, 0.15-0.7, 0.15-0.6, 0.15-0.5, 0.2-1.5, 0.2-1.25, 0.2-1.0, 0.2-0.9, 0.2-0.8, 0.2-0.7, 0.2-0.6, 0.2-0.5, 0.25-1.5, 0.25-1.25, 0.25-1.0, 0.25-0.9, 0.25-0.8, 0.25-0.7, 0.25-0.6, 0.25-0.5, 0.3-1.5, 0.3-1.25, 0.3-1.0, 0.3-0.9, 0.3-0.8, 0.3-0.7, 0.3-0.6, 0.3-0.5, 0.4-1.5, 0.4-1.25, 0.4-1.0, 0.4-0.9, 0.4-0.8, 0.4-0.7, 0.4-0.6 and 0.4-0.5. A derivative group can be anionic, uncharged (nonionic), or cationic; the charge of a group can be as it exists when the graft copolymer derivative is in an aqueous composition herein, for example, further taking into account the pH of the aqueous composition (in some aspects, the pH can be 4-10 or 5-9).

Since there are at most three hydroxyl groups in a glucose monomeric unit of a dextran-alpha-glucan graft copolymer herein, the overall DoS of a graft copolymer derivative can be no higher than 3.0. It would be understood by those skilled in the art that, since a graft copolymer derivative as presently disclosed has a DoS with at least one type of group (e.g., ether or ester) (e.g., between about 0.001 to about 3.0), all the substituents of a graft copolymer derivative cannot only be hydroxyl. Any graft copolymer derivative (e.g. ether or ester) of the present disclosure can be derived from a dextran-alpha-glucan graft copolymer disclosed herein.

A dextran-alpha-glucan graft copolymer derivative is an ether derivative in some aspects. Such a derivative can be termed as a graft copolymer ether, for example.

An organic group that is in ether-linkage to a graft copolymer herein can be an alkyl group, for example. An alkyl group can be a linear, branched, or cyclic ("cycloalkyl" or "cycloaliphatic") in some aspects. In some aspects, an alkyl group is a $C_1$ to $C_{18}$ alkyl group, such as a $C_4$ to $C_{18}$ alkyl group, or a $C_1$ to $C_{10}$ alkyl group (in "$C_\#$", # refers to the number of carbon atoms in the alkyl group). An alkyl group can be, for example, a methyl, ethyl, propyl, butyl, pentyl, hexyl, heptyl, octyl, nonyl, decyl, undecyl, dodecyl, tridecanyl, tetradecanyl, pentadecanyl, hexadecanyl, heptadecanyl, or octadecanyl group; such alkyl groups typically are linear. One or more carbons of an alkyl group can be substituted with another alkyl group in some aspects, making the alkyl group branched. Suitable examples of branched chain isomers of linear alkyl groups include isopropyl, iso-butyl, tert-butyl, sec-butyl, isopentyl, neopentyl, isohexyl, neohexyl, 2-ethylhexyl, 2-propylheptyl, and isooctyl. In some aspects, an alkyl group is a cycloalkyl group such as a cyclopentyl, cyclohexyl, cycloheptyl, cyclooctyl, cyclononyl, or cyclodecyl group.

In some aspects, an organic group that is in ether-linkage to a graft copolymer herein can be a substituted alkyl group in which there is a substitution on one or more carbons of the alkyl group. The substitution(s) can be one or more hydroxyl, aldehyde, ketone, and/or carboxyl groups. For example, a substituted alkyl group may be a hydroxy alkyl group, dihydroxy alkyl group, or carboxy alkyl group. Examples of suitable hydroxy alkyl groups are hydroxymethyl ($—CH_2OH$), hydroxyethyl (e.g., $—CH_2CH_2OH$, $—CH(OH)CH_3$), hydroxypropyl (e.g., $—CH_2CH_2CH_2OH$, —$CH_2CH(OH)CH_3$, —$CH(OH)CH_2CH_3$), hydroxybutyl and hydroxypentyl groups. Other examples include dihydroxy alkyl groups (diols) such as dihydroxymethyl, dihydroxyethyl (e.g., —$CH(OH)CH_2OH$), dihydroxypropyl (e.g., —$CH_2CH(OH)CH_2OH$, —$CH(OH)CH(OH)CH_3$), dihydroxybutyl and dihydroxypentyl groups. Examples of suitable carboxy alkyl groups are carboxymethyl (—$CH_2COOH$), carboxyethyl (e.g., —$CH_2CH_2COOH$, —$CH(COOH)CH_3$), carboxypropyl (e.g., —$CH_2CH_2CH_2COOH$, —$CH_2CH(COOH)CH_3$, —$CH(COOH)CH_2CH_3$), carboxybutyl and carboxypentyl groups.

In some aspects, one or more carbons of an alkyl group that is in ether-linkage to a graft copolymer herein can have a substitution(s) with another alkyl group. Examples of such substituent alkyl groups are methyl, ethyl and propyl groups. To illustrate, an organic group can be —$CH(CH_3)CH_2CH_3$ or —$CH_2CH(CH_3)CH_3$, for example, which are both propyl groups having a methyl substitution.

As should be clear from the above examples of various substituted alkyl groups, a substitution (e.g., hydroxy or carboxy group) on an alkyl group in some aspects can be at the terminal carbon atom of the alkyl group, where the terminal carbon group is opposite the side of the alkyl group that is in ether linkage to a glucose monomeric unit of a graft copolymer ether compound. An example of this terminal substitution is the hydroxypropyl group —$CH_2CH_2CH_2OH$. Alternatively, a substitution can be on an internal carbon atom of an alkyl group. An example of an internal substitution is the hydroxypropyl group —$CH_2CH(OH)CH_3$. An alkyl group can have one or more substitutions, which may be the same (e.g., two hydroxyl groups [dihydroxy]) or different (e.g., a hydroxyl group and a carboxyl group).

Optionally, an etherified alkyl group herein can contain one or more heteroatoms such as oxygen, sulfur, and/or nitrogen within the hydrocarbon chain. Examples include alkyl groups containing an alkyl glycerol alkoxylate moiety (-alkylene-$OCH_2CH(OH)CH_2OH$), a moiety derived from ring-opening of 2-ethylhexl glycidyl ether, and a tetrahydropyranyl group (e.g., as derived from dihydropyran). Further examples include alkyl groups substituted at their termini with a cyano group (—C≡N); such a substituted alkyl group can optionally be referred to as a nitrile or cyanoalkyl group. Examples of a cyanoalkyl group herein include cyanomethyl, cyanoethyl, cyanopropyl and cyanobutyl groups.

In some aspects, an etherified organic group is a $C_2$ to $C_{18}$ (e.g., $C_4$ to $C_{18}$) alkenyl group, and the alkenyl group may be linear, branched, or cyclic. As used herein, the term "alkenyl group" refers to a hydrocarbon group containing at least one carbon-carbon double bond. Examples of alkenyl groups include ethenyl, propenyl, butenyl, pentenyl, hexenyl, cyclohexyl, and allyl groups. In some aspects, one or more carbons of an alkenyl group can have substitution(s) with an alkyl group, hydroxyalkyl group, or dihydroxy alkyl group such as disclosed herein. Examples of such a substituent alkyl group include methyl, ethyl, and propyl groups. Optionally, an alkenyl group herein can contain one or more heteroatoms such as oxygen, sulfur, and/or nitrogen within the hydrocarbon chain; for example, an alkenyl group can contain a moiety derived from ring-opening of an allyl glycidyl ether.

In some aspects, an etherified organic group is a $C_2$ to $C_{18}$ alkynyl group. As used herein, the term "alkynyl" refers to linear and branched hydrocarbon groups containing at least one carbon-carbon triple bond. An alkynyl group herein can be, for example, propynyl, butynyl, pentynyl, or hexynyl. An alkynyl group can optionally be substituted, such as with an alkyl, hydroxyalkyl, and/or dihydroxy alkyl group. Optionally, an alkynyl group can contain one or more heteroatoms such as oxygen, sulfur, and/or nitrogen within the hydrocarbon chain.

In some aspects, an etherified organic group is a polyether comprising repeat units of (—$CH_2CH_2O$—). (—$CH_2CH(CH_3)O$—), or a mixture thereof, wherein the total number of repeat units is in the range of 2 to 100. In some aspects, an organic group is a polyether group comprising (—$CH_2CH_2O$—)$_{3-100}$ or (—$CH_2CH_2O$—)$_{4-100}$. In some aspects, an organic group is a polyether group comprising (—$CH_2CH(CH_3)O$—)$_{3-100}$ or (—$CH_2CH(CH_3)O$—)$_{4-100}$. As used herein for a polyether group, the subscript designating a range of values designates the potential number of repeat units; for example, $(CH_2CH_2O)_{2-100}$ means a polyether group containing 2 to 100 repeat units. In some aspects, a polyether group herein can be capped such as with a methoxy, ethoxy, or propoxy group.

In some aspects, an etherified organic group is an aryl group. As used herein, the term "aryl" means an aromatic/carbocyclic group having a single ring (e.g., phenyl), multiple rings (e.g., biphenyl), or multiple condensed rings in which at least one is aromatic, (e.g., 1,2,3,4-tetrahydronaphthyl, naphthyl, anthryl, or phenanthryl), which is optionally mono-, di-, or trisubstituted with alkyl groups, such as a methyl, ethyl, or propyl group. In some aspects, an aryl group is a $C_6$ to $C_{20}$ aryl group. In some aspects, an aryl group is a methyl-substituted aryl group such as a tolyl (—$C_6H_4CH_3$) or xylyl [—$C_6H_3(CH_3)_2$] group. A tolyl group can be a p-tolyl group, for instance. In some aspects, an aryl group is a benzyl group (—$CH_2$-phenyl). A benzyl group herein can optionally be substituted (typically on its phenyl ring) with one or more of a halogen, cyano, ester, amide, ether, alkyl (e.g., $C_1$ to $C_6$), aryl (e.g., phenyl), alkenyl (e.g., $C_2$ to $C_6$), or alkynyl (e.g., $C_2$ to $C_6$) group.

An organic group that is in ether-linkage to a graft copolymer herein can be a positively charged (cationic) group, for example. A positively charged group can be, for example, any of those disclosed in U.S. Pat. Appl. Publ. No. 2016/0311935, which is incorporated herein by reference. A positively charged group can comprise a substituted ammonium group, for example. Examples of substituted ammonium groups are primary, secondary, tertiary and quaternary ammonium groups, such as can be represented by Structures I and II. An ammonium group can be substituted with alkyl group(s) and/or aryl group(s), for example. There can be one, two, or three alkyl and/or aryl groups in some aspects. An alkyl group of a substituted ammonium group herein can be a $C_1$-$C_{30}$ alkyl group, for example, such as a methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, $C_{25}$, $C_{26}$, $C_{27}$, $C_{28}$, $C_{29}$, or $C_{30}$ group; each alkyl group can be the same or different is aspects with two or three alkyl substitutions. An alkyl group can be $C_1$-$C_{24}$, $C_1$-$C_{18}$, $C_6$-$C_{20}$, $C_{10}$-$C_{16}$, or $C_1$-$C_4$ in some aspects. An aryl group of a substituted ammonium group herein can be as disclosed above, for example. In some additional aspects, an aryl group can be a $C_6$-$C_{24}$, $C_{12}$-$C_{24}$, or $C_6$-$C_{18}$ aryl group that is optionally substituted with alkyl substituents (e.g., any alkyl group disclosed herein).

A secondary ammonium graft copolymer ether compound herein can comprise a monoalkylammonium group in some aspects (e.g., based on Structure I). A secondary ammonium graft copolymer ether compound can be a monoalkylammonium graft copolymer ether in some aspects, such as a monomethyl-, monoethyl-, monopropyl-, monobutyl-, monopentyl-, monohexyl-, monoheptyl-, monooctyl-, monononyl-, monodecyl-, monoundecyl-, monododecyl-, monotridecyl-, monotetradecyl-, monopentadecyl-, monohexadecyl-, monoheptadecyl-, or monooctadecyl-ammonium graft copolymer ether. These graft copolymer ether compounds can also be referred to as methyl-, ethyl-, propyl-, butyl-, pentyl-, hexyl-, heptyl-, octyl-, nonyl-, decyl-, undecyl-, dodecyl-, tridecyl-, tetradecyl-, pentadecyl-, hexadecyl-, heptadecyl-, or octadecyl-ammonium graft copolymer ether compounds, respectively.

A tertiary ammonium graft copolymer ether compound herein can comprise a dialkylammonium group in some aspects (e.g., based on Structure I). A tertiary ammonium graft copolymer ether compound can be a dialkylammonium graft copolymer ether in some aspects, such as a dimethyl-, diethyl-, dipropyl-, dibutyl-, dipentyl-, dihexyl-, diheptyl-, dioctyl-, dinonyl-, didecyl-, diundecyl-, didodecyl-, ditridecyl-, ditetradecyl-, dipentadecyl-, dihexadecyl-, diheptadecyl-, or dioctadecyl-ammonium graft copolymer ether.

A quaternary ammonium graft copolymer ether compound herein can comprise a trialkylammonium group in some aspects (e.g., based on Structure I). A quaternary ammonium graft copolymer ether compound can a trialkylammonium graft copolymer ether in some aspects, such as trimethyl-, triethyl-, tripropyl-, tributyl-, tripentyl-, trihexyl-, triheptyl-, trioctyl-, trinonyl-, tridecyl-, triundecyl-, tridodecyl-, tritridecyl-, tritetradecyl-, tripentadecyl-, trihexadecyl-, triheptadecyl-, or trioctadecyl-ammonium graft copolymer ether.

One of the groups of a substituted ammonium group comprises one carbon, or a chain of carbons (e.g., up to 30), in ether linkage to a graft copolymer. A carbon chain in this context can be linear, for example. Such a carbon or carbon chain can be represented by $-CH_2-$, $-CH_2CH_2-$, $-CH_2CH_2CH_2-$, $-CH_2(CH_2)_2CH_2-$, $-CH_2(CH_2)_3CH_2-$, $-CH_2(CH_2)_4CH_2-$, $-CH_2(CH_2)_5CH_2-$, $-CH_2(CH_2)_6CH_2-$, $-CH_2(CH_2)_7CH_2-$, $-CH_2(CH_2)_8CH_2-$, $-CH_2(CH_2)_9CH_2-$, or $-CH_2(CH_2)_{10}CH_2-$, for example. In some aspects, a carbon chain in this context can be branched, such as by being substituted with one or more alkyl groups (e.g., any as disclosed above such as methyl, ethyl, propyl, or butyl). The point(s) of substitution can be anywhere along the carbon chain. Examples of branched carbon chains include $-CH(CH_3)CH_2-$, $-CH(CH_3)CH_2CH_2-$, $-CH_2CH(CH_3)CH_2-$, $-CH(CH_2CH_3)CH_2-$, $-CH(CH_2CH_3)CH_2CH_2-$, $-CH_2CH(CH_2CH_3)CH_2-$, $-CH(CH_2CH_2CH_3)CH_2-$, $-CH(CH_2CH_2CH_3)CH_2CH_2-$ and $-CH_2CH(CH_2CH_2CH_3)CH_2-$; longer branched carbon chains can also be used, if desired. In some aspects, a chain of one or more carbons (e.g., any of the above linear or branched chains) is further substituted with one or more hydroxyl groups. Examples of hydroxy- or dihydroxy (diol)-substituted chains include $-CH(OH)-$, $-CH(OH)CH_2-$, $-C(OH)_2CH_2-$, $-CH_2CH(OH)CH_2-$, $-CH(OH)CH_2CH_2-$, $-CH(OH)CH(OH)CH_2-$, $-CH_2CH_2CH(OH)CH_2-$, $-CH_2CH(OH)CH_2CH_2-$, $-CH(OH)CH_2CH_2CH_2-$, $-CH_2CH(OH)CH(OH)CH_2-$, $-CH(OH)CH(OH)CH_2CH_2-$ and $-CH(OH)CH_2CH(OH)CH_2-$. In each of the foregoing examples, the first carbon atom of the chain is ether-linked to a glucose monomer of the graft copolymer, and the last carbon atom of the chain is linked to a positively charged group (e.g., a substituted ammonium group as disclosed herein). One or more positively charged organic groups in some aspects can be trimethylammonium hydroxypropyl groups (Structure II, when each of $R_2$, $R_3$ and $R_4$ is a methyl group).

In aspects in which a carbon chain of a positively charged organic group has a substitution in addition to a substitution with a positively charged group, such additional substitution can be with one or more hydroxyl groups, oxygen atoms (thereby forming an aldehyde or ketone group), alkyl groups (e.g., methyl, ethyl, propyl, butyl), and/or additional positively charged groups, for example. A positively charged group is typically bonded to the terminal carbon atom of the carbon chain. A positively charged group can also comprise imidazoline ring-containing compounds in some aspects.

A counter ion for a positively charged organic group herein can be any suitable anion, such as an acetate, borate, bromate, bromide, carbonate, chlorate, chloride, chlorite, dihydrogen phosphate, fluoride, hydrogen carbonate, hydrogen phosphate, hydrogen sulfate, hydrogen sulfide, hydrogen sulfite, hydroxide, hypochlorite, iodate, iodide, nitrate, nitride, nitrite, oxalate, oxide, perchlorate, permanganate, phosphate, phosphide, phosphite, silicate, stannate, stannite, sulfate, sulfide, sulfite, tartrate, or thiocyanate anion.

Dextran-alpha-glucan graft copolymer ether compounds in some aspects can contain one type of etherified organic group. Examples of such compounds contain a carboxy alkyl group as the only etherified organic group. A specific non-limiting example of such a compound is carboxymethyl graft copolymer. Other examples include graft copolymer ether compounds containing an alkyl group as the only etherified organic group. A specific non-limiting example of such a compound is methyl graft copolymer. Other examples include graft copolymer ether compounds containing a dihydroxyalkyl as the only etherified organic group. A specific non-limiting example of such a compound is dihydroxypropyl graft copolymer.

Dextran-alpha-glucan graft copolymer ether compounds in some aspects can contain two or more different types of etherified organic groups (i.e., mixed ether of graft copolymer). Examples of such compounds contain (i) two different alkyl groups as etherified organic groups, (ii) an alkyl group and a hydroxy alkyl group as etherified organic groups (alkyl hydroxyalkyl graft copolymer), (iii) an alkyl group and a carboxy alkyl group as etherified organic groups (alkyl carboxyalkyl graft copolymer), (iv) a hydroxy alkyl group and a carboxy alkyl group as etherified organic groups (hydroxyalkyl carboxyalkyl graft copolymer), (v) two different hydroxy alkyl groups as etherified organic groups, (vi) two different carboxy alkyl groups as etherified organic groups, or (vii) a carboxy alkyl group and an aryl (e.g., benzyl) group. Non-limiting examples of such compounds include ethyl hydroxyethyl graft copolymer, hydroxyalkyl methyl graft copolymer, carboxymethyl hydroxyethyl graft copolymer, carboxymethyl hydroxypropyl, and carboxymethyl benzyl graft copolymer. A mixed graft copolymer ether can be, in some instances, as disclosed in U.S. Patent Appl. Publ. No. 2020/0002646, which is incorporated herein by reference.

Dextran-alpha-glucan graft copolymer ether compounds herein can comprise at least one type of etherified nonionic organic group and at least one type of etherified negatively charged (anionic) group, for example. As another example, graft copolymer ether compounds herein can comprise at least one type of etherified nonionic organic group and at least one type of etherified positively charged (cationic) organic group. As another example, graft copolymer ether compounds herein can comprise at least one type of etherified anionic organic group (e.g., carboxyalkyl such as carboxymethyl) and at least one type of etherified cationic organic group (e.g., substituted ammonium group such as trimethylammonium hydroxypropyl). Examples of the different groups in all these aspects are as presently disclosed.

An ether derivative of an alpha-glucan homopolymer herein, in the presence or absence of a graft copolymer ether as presently disclosed, can have any of the foregoing mono-ether or mixed ether profiles (e.g., comprise at least one type of etherified anionic organic group and at least one type of etherified cationic organic group). An alpha-glucan homopolymer mono- or mixed ether compound can be comprised in any composition/product/application as described herein, either with or without a dextran-alpha-glucan graft copolymer ether.

A dextran-alpha-glucan graft copolymer derivative is an ester derivative in some aspects of the present disclosure. Such a derivative can be termed as a graft copolymer ester, for example. An esterified acyl group (ester group) herein can be any as disclosed in, for example, U.S. Patent Appl. Publ. Nos. 2014/0187767, 2018/0155455, or 2020/0308371, or Int. Patent Appl. Publ. No. WO2018/098065, which are incorporated herein by reference.

At least one ester group of a graft copolymer in some aspects can comprise acyl group —CO—R', wherein R' comprises a chain of 1 to 26 carbon atoms. R' can be linear, branched, or cyclic, for example. Examples of acyl groups herein that are linear include ethanoyl, propanoyl, butanoyl, pentanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl, eicosanoyl, uneicosanoyl, docosanoyl, tricosanoyl, tetracosanoyl, pentacosanoyl, and hexacosanoyl. Common names for some of the above-listed acyl groups are acetyl (ethanoyl group), propionyl (propanoyl group), butyryl (butanoyl group), valeryl (pentanoyl group), caproyl (hexanoyl group); enanthyl (heptanoyl group), caprylyl (octanoyl group), pelargonyl (nonanoyl group), capryl (decanoyl group), lauroyl (dodecanoyl group), myristyl (tetradecanoyl group), palmityl (hexadecanoyl group), stearyl (octadecanoyl group), arachidyl (eicosanoyl group), behenyl (docosanoyl group), lignoceryl (tetracosanoyl group), and cerotyl (hexacosanoyl group).

In some aspects, a graft copolymer ester is an aryl ester; i.e., at least one ester group is an aryl ester group. An aryl ester group can comprise a benzoyl group (—CO—$C_6H_5$), for example, which can also be referred to as a benzoate group. An aryl ester group in some aspects can comprise a benzoyl group substituted with at least one halogen ("X"; e.g., Cl, F), alkyl, halogenated alkyl, ether, cyano, or aldehyde group, or combinations thereof, such as represented by the following Structures III(a) through III(r):

Structures III(a) - III(r)

III (a)

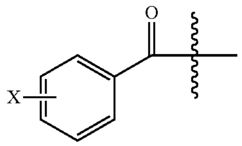

III (b)

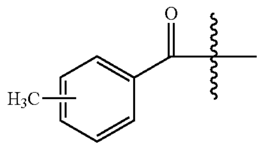

-continued

III (c)

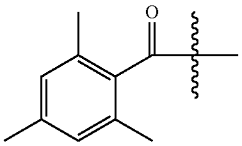

III (d)

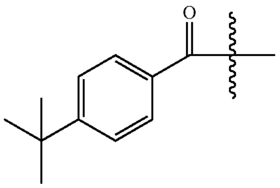

III (e)

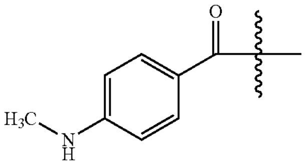

III (f)

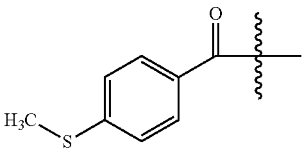

III (g)

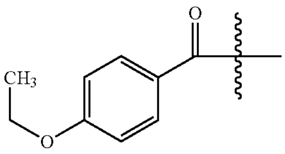

III (h)

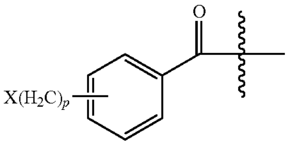

III (i)

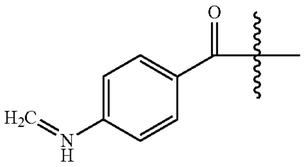

III (j)

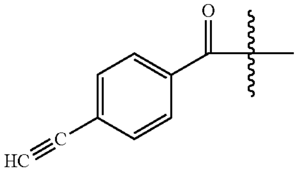

III (k)

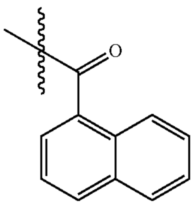

-continued

III (l)

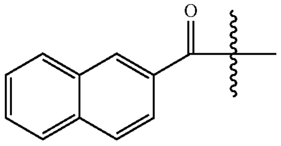

III (m)

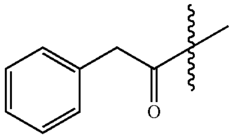

III (n)

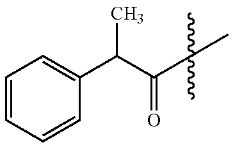

III (o)

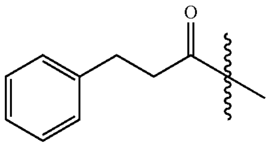

III (p)

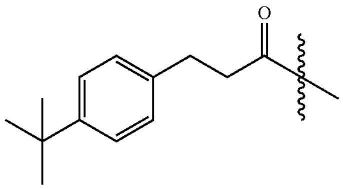

III (q)

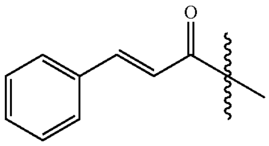

III (r)

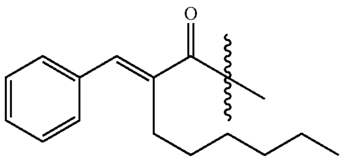

Dextran-alpha-glucan graft copolymer ester compounds in some aspects can contain one type of esterified acyl group. Examples of such compounds contain an acetyl group as the only esterified acyl group. Yet, in some aspects, graft copolymer ester compounds can contain two or more different types of esterified acyl groups (i.e., mixed ester of graft copolymer). Examples of such mixed esters include those with at least (i) acetyl and propionyl groups, (ii) acetyl and butyryl groups, and (iii) propionyl and butyryl groups. An ester derivative of an alpha-glucan homopolymer herein, in the presence or absence of a graft copolymer ester as presently disclosed, can have any of the foregoing mono-ester or mixed ester profiles. An alpha-glucan homopolymer mono- or mixed ester compound can be comprised in any composition/product/application as described herein, either with or without a dextran-alpha-glucan graft copolymer ether.

A dextran-alpha-glucan graft copolymer derivative is a carbamate, sulfonyl, or sulfonate derivative in some aspects (with any DoS feature as disclosed above for an ether or ester). For example, a graft copolymer derivative can comprise one or more organic groups of the present disclosure (e.g., any that can be ether- or ester-linked) in carbamate or sulfonyl linkage to the graft copolymer. Carbamate groups of a graft copolymer derivative herein can be as disclosed, for example, in Int. Pat. Appl. Publ. No. WO2020/131711 or U.S. Appl. No. 63/037,076, which are each incorporated herein by reference.

A dextran-alpha-glucan graft copolymer derivative in some aspects can be negatively charged by virtue of having carboxylate (carboxylic acid) groups. A carboxylic acid group can exist by itself (e.g., carbon 6 of glucose can be —COOH), or via an organic group that is (i) ether-, ester-, carbamate, or sulfonyl-linked to a graft copolymer and (ii) comprises a carboxylic acid group (e.g., a carboxy alkyl group such as carboxymethyl), for example. In some aspects, a carboxylic group can be introduced (e.g., at carbon 6 of glucose and/or at a carbon of a substituent group) by oxidizing a graft copolymer or graft copolymer derivative; oxidation can be performed via a process as disclosed, for example, in Canadian Patent Publ. Nos. 2028284 or 2038640, or U.S. Pat. Nos. 4,985,553, 2,894, 945, 5,747,658, or 7595392, or U.S. Pat. Appl. Publ. Nos. 2015/0259439, 2018/0022834, or 2018/0079832, all of which are incorporated herein by reference.

A dextran-alpha-glucan graft copolymer derivative herein can be aqueous-soluble or aqueous-insoluble. In some aspects, a graft copolymer derivative with a DoS of about, or over about, 0.25, 0.26, 0.27, 0.28, 0.29, 0.030, 0.31, 0.32, 0.33, 0.34, or 0.35 is aqueous-soluble, and aqueous-insoluble if below such a DoS. In general, it is contemplated that aqueous-insoluble graft copolymer derivatives as presently disclosed are useful, for example, in aqueous absorption applications, whereas aqueous-insoluble and aqueous-soluble graft copolymer derivatives are useful, for example, in flocculation applications.

Dextran-alpha-glucan graft copolymer derivatives herein are contemplated to be biodegradable. In some aspects, it is contemplated that a graft copolymer derivative has a biodegradability, such as determined by the Carbon Dioxide Evolution Test Method (OECD Guideline 301B), of about, at least about, or at most about, 5%, 10%, 15%, 20%, 25%, 30%, 35%, 40%, 45%, 50%, 55%, 60%, 65%, 70%, 75%, or 80% after 60 or 90 days. Biodegradability in some embodiments can be with respect to an incumbent material (e.g., an incumbent flocculation agent) such as an acrylamide/polyacrylamide. It is contemplated that the biodegradability of a graft copolymer derivative herein can be about, at least about, or at most about, 10%, 25%, 50%, 75%, 100%, 150%, 200%, 250%, 500%, 750, or 1000% higher than the biodegradability of an incumbent material; such biodegradability can be as determined above, for example.

The molecular weight of a dextran-alpha-glucan graft copolymer derivative herein can be based on the molecular weight of its pre-derivatized form taking into account the added derivative group(s) and its/their DoS in the derivative.

A composition can comprise one, two, three, four or more different dextran-alpha-glucan graft copolymer derivatives herein. For example, a composition can comprise at least one type of graft copolymer nonionic ether and at least one type of graft copolymer anionic ether. As another example, a composition can comprise at least one type of graft copolymer nonionic ether and at least one type of graft copolymer cationic ether. As another example, a composition can comprise at least one type of graft copolymer anionic ether (e.g., with carboxyalkyl such as carboxymethyl) and at least one type of graft copolymer cationic ether (e.g., with substituted ammonium group such as trimethylammonium hydroxypropyl). Further examples of the different ether derivatives in all these aspects are as presently disclosed. The graft copolymer derivatives in a composition herein can collectively be referred to as the composition's graft copolymer derivative component. In some aspects, a copolymer derivative component can comprise about 5, 10, 20, 25, 30, 35, 40, 45, 50, 55, 60, 65, 70, 75, 80, 85, 90, or 95 wt % of one type of graft copolymer derivative, and a balance (up to 100 wt %) of at least one other type of graft copolymer derivative. The foregoing embodiments can likewise characterize compositions comprising two or more different alpha-glucan homopolymer derivatives, for instance.

A dextran-alpha-glucan graft copolymer ether or ester derivative herein (or other deriv. herein) can be crosslinked. In typical aspects, one or more crosslinks of a crosslinked graft copolymer derivative are covalent (i.e., the graft copolymer derivatives are chemically crosslinked with each other). However, it is contemplated that one or more crosslinks can be non-covalent in some aspects. Crosslinks herein can be between at least two graft copolymer derivatives (i.e., intermolecular crosslinks). It is contemplated that crosslinks in some aspects can also be intramolecular, such as between separate alpha-glucan side chains of the same graft copolymer derivative, and/or between different sections of the dextran backbone of the same graft copolymer derivative. Yet, in some aspects, a dextran-alpha-glucan graft copolymer ether or ester derivative (or other deriv. herein) is not crosslinked (has not been crosslinked).

Suitable agents for crosslinking a graft copolymer derivative herein are contemplated to include phosphoryl chloride ($POCl_3$), polyphosphate, sodium trimetaphosphate (STMP), boron-containing compounds (e.g., boric acid, diborates, tetraborates such as tetraborate decahydrate, pentaborates, polymeric compounds such as Polybor®, alkali borates), polyvalent metals (e.g., titanium-containing compounds such as titanium ammonium lactate, titanium triethanolamine, titanium acetylacetonate, or polyhydroxy complexes of titanium; zirconium-containing compounds such as zirconium lactate, zirconium carbonate, zirconium acetylacetonate, zirconium triethanolamine, zirconium diisopropylamine lactate, or polyhydroxy complexes of zirconium), glyoxal, glutaraldehyde, divinyl sulfone, epichlorohydrin, polycarboxylic acids (e.g., citric acid, malic acid, tartaric acid, succinic acid, glutaric acid, adipic acid), dichloro acetic acid, polyamines, diethylene glycol dimethyl ether (diglyme), and diglycidyl ether (e.g., diglycidyl ether itself, ethylene glycol diglycidyl ether [EGDGE], 1,4-butanediol diglycidyl ether [BDDGE], polyethylene glycol diglycidyl ether [PEGDE, such as PEG2000DGE], bisphenol A diglycidyl ether [BADGE]). Still other examples of suitable crosslinking agents are described in U.S. Pat. Nos. 4,462,917, 4,464,270, 4,477,360 and 4,799,550, and U.S. Patent Appl. Publ. No. 2008/0112907, which are all incorporated herein by reference. A crosslinker in certain aspects can dissolve in an aqueous solvent herein. Yet, in some aspects, a crosslinking agent is not a boron-containing compound (e.g., as described above).

A crosslinked graft copolymer derivative herein can comprise a homogenous or heterogenous graft copolymer derivative component. A crosslinked graft copolymer derivative with a homogenous graft copolymer derivative component can be prepared using one form, lot, or preparation of graft copolymer derivative, for example, such as that made using a particular enzymatic reaction and/or derivatization. A crosslinked graft copolymer derivative with a heterogenous graft copolymer derivative component typically can be prepared using two or more different forms, lots, or preparations of graft copolymer derivatives, for example. For example, graft copolymer derivatives respectively comprising about 60 wt % dextran or 90 wt % dextran (wt % based on pre-derivatized graft copolymer) can be crosslinked to form a crosslinked graft copolymer derivative with a heterogenous graft copolymer derivative component.

A crosslinked graft copolymer derivative in some embodiments can further comprise alpha-glucan homopolymer derivative. Such free alpha-glucan homopolymer derivative can be chemically crosslinked within these embodiments (e.g., crosslinked with graft copolymer derivative).

A crosslinked graft copolymer derivative as presently disclosed can be insoluble under aqueous conditions (aqueous insoluble), per the above definitions. For example, a crosslinked graft copolymer derivative can be insoluble or not completely dissolved in water or other aqueous composition at a temperature up to about 50, 60, 70, 80, 90, 100, 110, or 120° C. However, a crosslinked graft copolymer derivative in some aspects can be aqueous soluble under any of the foregoing conditions.

A crosslinked graft copolymer derivative as presently disclosed can be produced, for example, by contacting a graft copolymer derivative herein with at least a crosslinking agent and a solvent. This process step can optionally be characterized as contacting a graft copolymer derivative with a crosslinking agent under aqueous conditions or non-aqueous conditions, depending on the solvent being used. Any crosslinking agent and/or graft copolymer derivative disclosed herein can be employed accordingly. Any process parameter disclosed below and in the Examples can likewise be applied in these product-by-process embodiments.

Further disclosed herein is a method/process of producing a crosslinked dextran-alpha-glucan graft copolymer derivative. This method can comprise: (a) contacting at least a solvent, a crosslinking agent, and a graft copolymer derivative as presently disclosed, whereby a crosslinked graft copolymer derivative is produced, and (b) optionally, isolating the crosslinked graft copolymer derivative produced in step (a). Method step (a) can optionally be characterized as contacting a graft copolymer derivative with a crosslinking agent under aqueous or non-aqueous conditions (depending on the solvent), and/or can optionally be characterized as a crosslinking reaction. Any crosslinking agent and/or graft copolymer derivative disclosed herein can be employed in this method accordingly. In the contacting step of the above process and product-by-process embodiments, it is generally desired that such is conducted under conditions suitable for allowing the crosslinking agent to make a crosslink. Examples of crosslinking reaction conditions and for isolating crosslinked products can be as disclosed in U.S. Patent Appl. Publ. Nos. 2019/0359734 or 2020/0370216, or Int. Patent Appl. Publ. No. WO2019/055397, which are incorporated herein by reference. Typically, a crosslinking reaction herein is conducted following derivatization of a graft copolymer, but in some aspects, crosslinking can be conducted in the same step as, or before, derivatization.

Some embodiments of the present disclosure concern a method of producing a dextran-alpha-glucan graft copolymer ether or ester compound. Such a method (derivatization method) can comprise: (a) contacting a graft copolymer in a reaction with at least one etherification agent or esterification agent comprising an organic group, wherein at least one organic group is etherified or esterified to the graft copolymer thereby producing a graft copolymer ether or ester compound, wherein the graft copolymer ether or ester compound has a degree of substitution (DoS) up to about 3.0, wherein the graft copolymer comprises: (i) a backbone comprising dextran, and (ii) alpha-glucan side chains comprising at least about 30% alpha-1,3 glycosidic linkages; and (b) optionally, isolating the graft copolymer ether or ester compound produced in step (a). Any graft copolymer as presently disclosed can be entered into a derivatization method, accordingly, to produce any ether or ester derivative herein.

Some aspects herein concern a method of producing a dextran-alpha-glucan graft copolymer ether compound; such can optionally be characterized as an ether derivatization method or etherification reaction. An ether derivatization method can comprise: contacting a graft copolymer herein in a reaction under alkaline conditions with at least one etherification agent comprising an organic group, wherein at least one organic group is etherified to the graft copolymer thereby producing a graft copolymer ether compound as disclosed herein.

An etherification reaction can be performed, for example, by first contacting a graft copolymer herein with a solvent (e.g., water or alcohol) and one or more alkali hydroxides to provide a preparation (e.g., a solution, in which graft copolymer is dissolved in an alkali hydroxide solution). The alkaline conditions of the etherification reaction can thus comprise an alkali hydroxide solution in some aspects. The pH of alkaline conditions can be at least about 11.0, 11.2, 11.4, 11.6, 11.8, 12.0, 12.2, 12.4, 12.6, 12.8, or 13.0, for example. Various alkali hydroxides can be used, such as sodium hydroxide, potassium hydroxide, calcium hydroxide, lithium hydroxide, and/or tetraethylammonium hydroxide. The concentration of alkali hydroxide in a preparation with a graft copolymer herein and a solvent can be about 1-54 wt %, 5-50 wt %, 5-10 wt %, 10-50 wt %, 10-40 wt %, or 10-30 wt % (or any integer between 1 and 54 wt %), or any concentration used in the below Examples (or within ±10% thereof).

Various organic solvents that can optionally be included in a solvent, or used as the main solvent, when preparing an etherification reaction include alcohol (e.g. isopropanol), acetone, dioxane, and toluene, for example. An organic solvent can be added before or after addition of alkali hydroxide. The concentration of an organic solvent in a preparation comprising graft copolymer and an alkali hydroxide can be about, or at least about, 10, 15, 20, 25, 30, 35, 40, 45, 50, 55, 60, 65, 70, 75, 80, 85, or 90 wt % (or any integer between 10 and 90 wt %), for example.

An etherification agent can be added to a composition under alkaline conditions comprising a graft copolymer, or it can be included when preparing the alkaline conditions (e.g., an etherification agent can be mixed with graft copolymer and solvent before dissolving/mixing with alkali agent). One or more etherification agents may be used in an etherification reaction.

In some aspects, an etherification reaction comprises little (about, or less than about, 1, 2, 3, 4, 5, 6, 7, 8, 9, or 10 wt %) or no solvent such as water. Such a process can optionally be referred to as high-solids etherification. High solids etherification can comprise any of the above ingredients, except that little or no solvent is used. This process can be performed according to *Cationic Modification of Glucan Polymer in a High Solids Process* (IP.com Disclosure No. IPCOM000256600D, Dec. 13, 2018), for example, which is incorporated herein by reference.

Etherification agents suitable for preparing an alkyl graft copolymer ether compound include, for example, dialkyl sulfates, dialkyl carbonates, alkyl halides (e.g., alkyl chloride), iodoalkanes, alkyl triflates (alkyl trifluoromethanesulfonates) and alkyl fluorosulfonates. Thus, examples of etherification agents for producing methyl graft copolymer ethers herein include dimethyl sulfate, dimethyl carbonate, methyl chloride, iodomethane, methyl triflate and methyl fluorosulfonate. Examples of etherification agents for producing ethyl graft copolymer ethers herein include diethyl sulfate, diethyl carbonate, ethyl chloride, iodoethane, ethyl triflate and ethyl fluorosulfonate. Examples of etherification agents for producing propyl graft copolymer ethers herein include dipropyl sulfate, dipropyl carbonate, propyl chloride, iodopropane, propyl triflate and propyl fluorosulfonate. Examples of etherification agents for producing butyl graft copolymer ethers herein include dibutyl sulfate, dibutyl carbonate, butyl chloride, iodobutane and butyl triflate.

Etherification agents suitable for preparing a hydroxyalkyl graft copolymer ether compounds include, for example, alkylene oxides such as ethylene oxide, propylene oxide (e.g., 1,2-propylene oxide), butylene oxide (e.g., 1,2-butylene oxide; 2,3-butylene oxide; 1,4-butylene oxide), or combinations thereof. As examples, propylene oxide can be used as an etherification agent for preparing hydroxypropyl graft copolymer ethers herein, and ethylene oxide can be used as an etherification agent for preparing hydroxyethyl graft copolymer ethers herein. In some aspects, hydroxyalkyl halides (e.g., hydroxyalkyl chloride) can be used as etherification agents for preparing hydroxyalkyl graft copolymer ethers herein. Examples of hydroxyalkyl halides include hydroxyethyl halide, hydroxypropyl halide (e.g., 2-hydroxypropyl chloride, 3-hydroxypropyl chloride) and hydroxybutyl halide. In some aspects, alkylene chlorohydrins can be used as etherification agents for preparing hydroxyalkyl graft copolymer ethers herein. Alkylene chlorohydrins that can be used include, but are not limited to, ethylene chlorohydrin, propylene chlorohydrin, and butylene chlorohydrin.

Etherification agents suitable for preparing a dihydroxyalkyl graft copolymer ether compound include dihydroxyalkyl halides (e.g., dihydroxyalkyl chloride) such as dihydroxyethyl halide, dihydroxypropyl halide (e.g., 2,3-dihydroxypropyl chloride [i.e., 3-chloro-1,2-propanediol]), and dihydroxybutyl halide, for example.

Etherification agents suitable for preparing a carboxyalkyl graft copolymer ether compound herein include haloalkylates (e.g., chloroalkylate). Examples of haloalkylates include haloacetate (e.g., chloroacetate), 3-halopropionate (e.g., 3-chloropropionate) and 4-halobutyrate (e.g., 4-chlorobutyrate). For example, chloroacetate (monochloroacetate) (e.g., sodium chloroacetate or chloroacetic acid) can be used as an etherification agent to prepare carboxymethyl graft copolymer ethers herein.

An etherification agent can be used to etherify a positively charged organic group to a graft copolymer in some aspects. Examples of such etherification agents include dialkyl sulfates, dialkyl carbonates, alkyl halides (e.g., alkyl chloride), iodoalkanes, alkyl triflates (alkyl trifluoromethanesulfonates) and alkyl fluorosulfonates, where the alkyl group(s) of each of these agents has one or more substitutions with a positively charged group. Other examples of such etherification agents include dimethyl sulfate, dimethyl carbonate, methyl chloride, iodomethane, methyl triflate and methyl fluorosulfonate, where the methyl group(s) of each of these agents has a substitution with a positively charged group. Other examples of such etherification agents include diethyl sulfate, diethyl carbonate, ethyl chloride, iodoethane, ethyl triflate and ethyl fluorosulfonate, where the ethyl group(s) of each of these agents has a substitution with a positively charged group. Other examples of such etherification agents include dipropyl sulfate, dipropyl carbonate, propyl chloride, iodopropane, propyl triflate and propyl fluorosulfonate, where the propyl group(s) of each of these agents has one or more substitutions with a positively charged group. Other examples of such etherification agents include dibutyl sulfate, dibutyl carbonate, butyl chloride, iodobutane and butyl triflate, where the butyl group(s) of each of these agents has one or more substitutions with a positively charged group.

An etherification agent may be one that can etherify a graft copolymer ether herein with a positively charged organic group, where the carbon chain of the positively charged organic group has a substitution (e.g., hydroxyl group) in addition to a substitution with a positively charged group. Examples of such etherification agents include hydroxyalkyl halides (e.g., hydroxyalkyl chloride) such as hydroxypropyl halide and hydroxybutyl halide, where a terminal carbon of each of these agents has a substitution with a positively charged group; an example is 3-chloro-2-hydroxypropyl-trimethylammonium. Other examples of such etherification agents include alkylene oxides such as propylene oxide (e.g., 1,2-propylene oxide) and butylene oxide (e.g., 1,2-butylene oxide; 2,3-butylene oxide), where a terminal carbon of each of these agents has a substitution with a positively charged group; an example is 2,3-epoxy-propyltrimethylammonium chloride (EPTAC).

A substituted ammonium group comprised in any of the foregoing etherification agent examples can be a primary, secondary, tertiary, or quaternary ammonium group. Examples of secondary, tertiary and quaternary ammonium groups are represented in structure I, where $R_2$, $R_3$ and $R_4$ each independently represent a hydrogen atom or an alkyl group such as a methyl, ethyl, propyl, or butyl group. An example of a substituted ammonium group is trimethylammonium.

Etherification agents herein typically can be provided as a fluoride, chloride, bromide, or iodide salt (where each of the foregoing halides serve as an anion).

When producing a graft copolymer ether compound with two or more different organic groups, two or more different etherification agents can be used, such as any of those disclosed herein. Such two or more etherification agents can be used in the reaction at the same time, or can be used sequentially in the reaction. One may choose sequential introduction of etherification agents in order to control the desired DoS with each organic group. In general, a particular etherification agent would be used first if the organic group it forms in the ether product is desired at a higher DoS compared to the DoS of another organic group to be added.

Some aspects herein concern a method of producing a dextran-alpha-glucan graft copolymer ester compound; such can optionally be characterized as an ester derivatization method or esterification reaction. An ester derivatization method can comprise: contacting a graft copolymer in a reaction that is substantially anhydrous with at least one acid catalyst, at least one acid anhydride, and at least one organic acid, wherein an acyl group derived from the acid anhydride is esterified to the graft copolymer. Conditions and/or reagents for esterifying a graft copolymer herein can be as disclosed in U.S. Patent Appl. Publ. Nos. 2014/0187767, 2018/0155455, or 2020/0308371, or Int. Patent Appl. Publ. No. WO2018/098065, which are incorporated herein by reference Herein, unless otherwise disclosed, a "graft copolymer derivative material" (and like terms) encompasses crosslinked and/or non-crosslinked forms of a dextran-alpha-glucan ether- or ester-derivative as presently disclosed.

A graft copolymer derivative material of the present disclosure can absorb aqueous liquid in some aspects. In some aspects, such an absorbent material comprises a cationic and/or anionic graft copolymer derivative. An aqueous liquid can be water for instance. An aqueous liquid in some aspects comprises an aqueous solution, such as a salt solution (saline solution). A salt solution can optionally comprise about, or at least about, 0.01, 0.025, 0.05, 0.075, 0.1, 0.25, 0.5, 0.75, 0.9, 1.0, 1.25, 1.5, 1.75, 2.0, 2.5, 3.0, 0.5-1.5, 0.5-1.25, 0.5-1.0, 0.75-1.5, 0.75-1.25, or 0.75-1.0 wt % of salt (such wt % values typically refer to the total concentration of one or more salts). Examples of a salt that can be used in an aqueous solution herein include one or more sodium salts (e.g., NaCl, $Na_2SO_4$). Other examples of salts include those having (i) an aluminum, ammonium, barium, calcium, chromium (II or III), copper (I or II), iron (II or III), hydrogen, lead (II), lithium, magnesium, manganese (II or III), mercury (I or II), potassium, silver, sodium strontium, tin (II or IV), or zinc cation, and (ii) an acetate, borate, bromate, bromide, carbonate, chlorate, chloride, chlorite, chromate, cyanamide, cyanide, dichromate, dihydrogen phosphate, ferricyanide, ferrocyanide, fluoride, hydrogen carbonate, hydrogen phosphate, hydrogen sulfate, hydrogen sulfide, hydrogen sulfite, hydride, hydroxide, hypochlorite, iodate, iodide, nitrate, nitride, nitrite, oxalate, oxide, perchlorate, permanganate, peroxide, phosphate, phosphide, phosphite, silicate, stannate, stannite, sulfate, sulfide, sulfite, tartrate, or thiocyanate anion. Thus, any salt having a cation from (i) above and an anion from (ii) above can be in an aqueous liquid as presently disclosed, for example.

Absorption of an aqueous liquid by a graft copolymer derivative material herein, crosslinked or not crosslinked, can be gauged by measuring the water retention value (WRV) of the material, for example. WRV herein can be measured by any means known in the art, such as via the methodology disclosed in U.S. Patent Appl. Publ. No. 2016/0175811 (e.g., Example 7 therein), which is incorporated herein by reference. Briefly, the WRV of a material herein can be calculated using the following formula: ((mass of wet material−mass of dry material)/mass of dry material)*100. WRV can be measured with respect to any aqueous liquid as presently disclosed, for example. Thus, while the term WRV contains the word "water", it would be understood that WRV can be measured with regard to any type of aqueous liquid disclosed herein, such as an aqueous solution.

A graft copolymer derivative material herein can have a WRV of about, or at least about, 400, 500, 600, 700, 800, 900, 1000, 1250, 1500, 1750, 2000, 2250, 2500, 2750, 3000, or 3300, for example.

Absorption of an aqueous liquid by a graft copolymer derivative herein can optionally be gauged by measuring centrifugal retention capacity (CRC) as disclosed in the below Examples or in U.S. Pat. No. 8,859,758 (incorporated herein by reference), for example. A CRC value herein can be provided in terms of grams of aqueous fluid per grams of graft copolymer derivative material ("g/g"). A graft copolymer derivative material can have a CRC of about, or at least about, 6, 7, 8, 9, 10, 11, 12, 13, 14, 15, 16, 17, 18, 19, 20, 21, 22, 23, 24, 25, 26, 27, 28, 29, 30, 31, 32, 33, 28-33, 28-32, 20-25, 21-24, or 22-24 g/g in some aspects. A corresponding WRV can be made by multiplying a CRC measurement by 100, if desired. Further yet, absorption herein can optionally be measured by determining absorption under load (AUL), such as via the methodology disclosed in U.S. Pat. No. 8,859,758 or EDANA (European Disposables and Non-woven Association) standard test WSP 242.2.R3 (12), which are both incorporated herein by reference. AUL measurements can be provided in terms of grams of aqueous fluid per grams of graft copolymer derivative material ("g/g"), and can be measured under a suitable pressure (e.g., psi of about 0.5-1.0, 0.75-1.0, 0.80-0.85, or 0.82).

The absorbency of a graft copolymer derivative material is contemplated to typically be greater than the absorbency of the material as it existed before being derivatized and/or crosslinked. For example, the absorbency of a graft copolymer derivative material can be about, or at least about 2, 3, 4, 5, 6, 7, or 8 times greater than the absorbency of the material as it existed before being derivatized and/or crosslinked.

Absorption herein can optionally be characterized in terms of the maximum amount of aqueous liquid that can be soaked into and retained by a certain amount of graft copolymer derivative material. A graft copolymer derivative material with an absorption capacity of at least 15, 20, or 15-20 g (gram) aqueous liquid/g graft copolymer derivative material can be characterized as being superabsorbent in some aspects.

A composition comprising a graft copolymer derivative material as presently disclosed can be in the form of, or comprised within, a personal care product, household product, medical product, ingestible product, or industrial product, for example. In this context, compositions/products in some aspects can be used as absorbent or superabsorbent materials, depending on the degree of absorption exhibited by the constituent graft copolymer derivative material. A personal care product, household product, medical product, ingestible product, or industrial product in some aspects is optionally designed, at least in part, for handling aqueous liquid absorption.

Examples of personal care products and/or uses thereof in aqueous liquid absorption include absorbent personal hygiene products such as baby diapers, potty training pants/liners, incontinence products (e.g., pads, adult diapers), and feminine hygiene products (e.g., sanitary napkins/pads, tampons, interlabial products, panty liners). Thus, a personal care product in some aspects can be characterized as a personal care absorbent article that can be placed against or near the skin to absorb and contain a fluid discharged or emitted from the body. Examples of personal care products that can be adapted accordingly to take advantage of the absorbency of a graft copolymer derivative material herein (e.g., replace or supplement originally used absorbent material in a product) are disclosed in WO1999/037261, U.S. Patent Appl. Publ. Nos. 2004/0167491, 2009/0204091, 2001/0014797, 2013/0281949, 2002/0087138, 2010/0241098, 2011/0137277 and 2007/0287971, and U.S. Pat. Nos. 4,623,339, 2,627,858, 3,585,998, 3,964,486, 6,579,273, 6,183,456, 5,820,619, 4,846,824, 4,397,644, 4,079,739, 8,987,543, 4,781,713, 5,462,539, 8,912,383, 3,749,094, 3,322,123, 4,762,521 and 5,342,343, all of which patent application and patent publications are incorporated herein by reference.

Examples of industrial products and/or uses thereof in aqueous liquid absorption include cable wrappings (e.g., wrappings for power or telecommunication cables); food pads; agricultural and forestry applications such as for retaining water in soil and/or to release water to plant roots; fire-fighting devices; and cleanup of acidic or basic aqueous solutions spills. Examples of industrial products that can be adapted accordingly to take advantage of the absorbency of a graft copolymer derivative material herein are disclosed in U.S. Patent Appl. Publ. Nos. 2002/0147483, 2006/0172048, 20050008737, 2008/0199577, 2012/0328723 and 2004/0074271, and U.S. Pat. Nos. 5,906,952, 7,567,739, 5,176,930, 6,695,138, 4,865,855, 7,459,501, 5,456,733, 9,089,730, 5,849,210, 7,670,513, 7,670,513, 5,683,813, 5,342,543, 4,840,734 and 4,894,179, all of which patent application and patent publications are incorporated herein by reference.

Examples of medical products and/or uses thereof in aqueous liquid absorption include wound healing dressings such as bandages and surgical pads; hospital bed sheets; sanitary towels/pads; controlled drug release devices; cell immobilization islets; three-dimensional cell culture substrates; bioactive scaffolds for regenerative medicine; stomach bulking devices; and disposal of controlled drugs. Examples of medical products that can be adapted accordingly to take advantage of the absorbency of a graft copolymer derivative material herein are disclosed in WO1998/046159, U.S. Patent Appl. Publ. Nos. 2005/0256486, 20030070232 and 20040128764, and U.S. Pat. Nos. 6,191,341, 7,732,657, 4,925,453, 9,161,860, 3,187,747 and 5,701,617, all of which patent application and patent publications are incorporated herein by reference.

Products in some aspects, such as some personal care products, household products, medical products, ingestible products, and/or industrial products, can absorb a bodily fluid such as urine, blood, blood serum, liquid fecal matter (e.g., diarrhea), bile, stomach acid/juice, vomit, amniotic fluid, breast milk, cerebrospinal fluid, exudate, lymph, mucus (e.g., nasal drainage, phlegm), peritoneal fluid, pleural fluid, pus, rheum, saliva, sputum, synovial fluid, sweat, and/or tears.

An absorption method is presently disclosed that comprises, at least, contacting a graft copolymer derivative material herein, or a product comprising such material, with an aqueous liquid-comprising composition, wherein the material/product absorbs aqueous liquid from the liquid-comprising composition. An aqueous liquid-comprising composition can be any as disclosed herein. For example, such a composition can be urine, blood, blood serum, liquid fecal matter, bile, stomach acid/juice, vomit, amniotic fluid, breast milk, cerebrospinal fluid, exudate, lymph, mucus, peritoneal fluid, pleural fluid, pus, rheum, saliva, sputum, synovial fluid, sweat, tears, water, or saline. In some aspects, an absorption method further comprises removing the material/product from the aqueous liquid-comprising composition after the material/product has absorbed aqueous liquid from the composition.

Some aspects of the present disclosure regard a flocculation or dewatering method that comprises: (a) mixing a graft copolymer ether or ester compound herein (or other deriv. herein) into an aqueous composition that comprises suspended solids/particles, whereby at least a portion of the suspended solids/particles becomes flocculated; and (b) optionally, separating the flocculated solids/particles of (a) from the aqueous composition. A graft copolymer derivative herein can therefore optionally be characterized as a flocculation agent, dewatering agent, clarification agent, and/or de-clouding agent. The flocculated particles of a treated composition typically settle (floc), or at least become more amenable to separation procedures (e.g., filtration). While a soluble graft copolymer ether can be used in the flocculation method, an insoluble graft copolymer ether can be used in some aspects. Typically, a graft copolymer derivative herein for flocculation applications is (i) biodegradable and/or (ii) not crosslinked.

One, two, three, or more different types of graft copolymer derivatives herein can be used in a flocculation method, for instance. In some aspects, a graft copolymer derivative is the only flocculation agent employed, whereas in other aspects, a graft copolymer derivative can be used in addition to another type of flocculation agent (e.g., a commercial incumbent flocculating agent such as acrylamide). In these latter aspects, a graft copolymer derivative can constitute about, or at least about 30, 40, 50, 60, 70, 80, or 90 wt %, for example, of all the flocculation agents added to an aqueous composition.

The amount of a graft copolymer derivative that is mixed in step (a) in an aqueous composition that comprises suspended solids/particles can be about, or at least about, 2, 4, 6, 8, 10, 12, 14, 2-14, 2-12, 2-10, 2-8, 4-14, 4-12, 4-10, 4-8, 6-14, 6-12, 6-10, 6-8, 8-14, 8-12, or 8-10 g per kg (dry solids basis) of suspended solids, for example. It would be understood that an aqueous-soluble graft copolymer derivative is typically dissolved in the aqueous composition after mixing step (a). Mixing can be performed by any standard means.

The temperature and pH of an aqueous composition with suspended solids that is treated with a graft copolymer derivative can be any temperature and pH as disclosed herein for an aqueous composition. In some aspects, the pH can be about 4, 5, 6, 7, 8, 9, 10, 4-10, 5-9, or 6-8, and/or the temperature can be about 1-80, 1-70, 1-60, 1-50, 1-40, 1-30, 5-80, 5-70, 5-60, 5-50, 5-40, 5-30, 15-80, 15-70, 15-60, 15-50, 15-40, or 15-30° C. Upon adding and mixing graft copolymer derivative with an aqueous composition, settling of suspended solids can be allowed to commence for about, or at least about, 0.5, 1, 2, 3, 4, 5, 6, 9, 12, 18, 24, 30, 36, 42, or 48 hours, for example.

In some aspects, the percentage of the initially suspended solids that settle (i.e., are no longer suspended) following treatment with a graft copolymer derivative is about, or at least about, 30, 40, 50, 60, 70, 80, 90, 95, 96, 97, 98, 99, or 100 wt %. Typically, a flocculation agent herein allows settled particles to occupy less space. For example, the total volume of settled particles following treatment of an aqueous composition (initially having suspended particles) with a graft copolymer derivative herein can be about, or less than about, 90%, 80%, 70%, 60% or 50% of the total volume of settled particles that settle in an aqueous composition without the aid of a flocculation agent (where all other conditions of each system are the same). Any suitable method can be used to determine settling volume, such as the method described in the below Examples.

In some aspects, the turbidity (i.e., the quality of a liquid being cloudy, opaque, and/or thick with suspended matter), color and/or opacity of an aqueous composition having suspended solids/particles can be reduced by about, or at least about, 5%, 10%, 15%, 20%, 25%, 30%, 35%, 40%, 45%, 50%, 55%, 60%, 65%, 70%, or 75% when treated with a graft copolymer derivative herein. Turbidity can be measured in nephelometric turbidity units (NTU), for example. Any suitable method can be used to measure turbidity, such as the methodology disclosed in *Progress in Filtration and Separation* (Edition: 1, Chapter 16. Turbidity: Measurement of Filtrate and Supernatant Quality?, Publisher: Academic Press, Editors: E. S. Tarleton, July 2015), which is incorporated herein by reference. Any suitable method can be used to measure the color of a liquid herein, such as spectral colorimetry or photoelectric colorimetry, for example.

In some aspects, the filterability of an aqueous composition having suspended solids/particles can be enhanced/increased when treated with a graft copolymer derivative herein. The filterability of a liquid composition can be measured using any suitable method, such as by measuring capillary suction time (e.g., as performed in the below Examples). In some aspects, the capillary suction time (e.g., as measured in seconds) of an aqueous composition having suspended solids/particles can be decreased by about, or at least about, 10%, 20%, 30%, 40%, 50%, 60%, 70%, 80%, or 85% when treated with a graft copolymer derivative herein. Any suitable method can be used to measure capillary suction time of a liquid, such as the method described in the below Examples.

Suspended particles that can be subjected to flocculation herein typically are colloidal particles (i.e., undissolved particles [solids] that are stably suspended). Thus, an aqueous composition that can be subjected to a flocculation method herein can be a colloid, for example. An aqueous composition comprising suspended solids/particles that can be treated with a flocculation agent as presently disclosed can be waste water (e.g., municipal, industrial, agricultural), sewage/sewage water, sludge (e.g., activated sludge), water from a body of water (e.g., river/stream, canal, moat, pond, marsh, lake, ocean), pool water, cooling water, water containing sediment (e.g. clay sediment) and/or soil, water to be processed for drinking, or water containing fiber and/or filler such as present in a paper-making process (e.g., pulp flocculation), for example. Examples of industrial waste water are from paper mill or drilling/mining operations. In some aspects, suspended solids can comprise microbial cells (live and/or dead) such as bacteria, yeast, and/or algae. It is contemplated that flocculation herein can be applied to an aqueous composition present during a food- or beverage-making process such as brewing (e.g., wort after its fermentation), cheese curd formation or soy curd (tofu) production. Systems/operations that can incorporate the disclosed flocculation method include waste water/sewage/sludge treatment, paper making, water purification, soil conditioning, and/or mining/drilling/downhole operations, for example, or any other system/operation that employs flocculation.

A flocculation method herein optionally further comprises a step of separating flocculated solids/particles of from the treated aqueous composition. Such a step can comprise settling/sedimentation, filtration, centrifugation, and/or decanting, for example.

A graft copolymer derivative material of the present disclosure can be present in a composition, such as an aqueous composition (e.g., dispersion such as colloidal dispersion) or dry composition, at about, at least about, or less than about, 0.01, 0.05, 0.1, 0.2, 0.25, 0.3, 0.4, 0.5, 0.6, 0.7, 0.75, 0.8, 0.9, 1.0, 1.2, 1.25, 1.4, 1.5, 1.6, 1.75, 1.8, 2.0, 2.25, 2.5, 3.0, 3.5, 4.0, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99 wt % or w/v %, for example, or a range between any two of these values. The liquid component of an aqueous composition can be an aqueous fluid such as water or aqueous solution, for instance. The solvent of an aqueous solution typically is water, or can comprise about, or at least about, 10, 20, 30, 40, 50, 60, 70, 80, 90, 95, 98, or 99 wt % water, for example.

An aqueous solution of an aqueous composition in some aspects has no (detectable) dissolved sugars, or about 0.1-1.5, 0.1-1.25, 0.1-1.0, 0.1-0.75, 0.1-0.5, 0.2-0.6, 0.3-0.5, 0.2, 0.3, 0.4, 0.5, or 0.6 wt % dissolved sugars. Such dissolved sugars can include sucrose, fructose, leucrose, and/or soluble gluco-oligosaccharides, for example. An aqueous solution of an aqueous composition in some aspects can have one or more salts/buffers (e.g., $Na^+$, $Cl^-$, NaCl, phosphate, tris, citrate) (e.g., ≤0.1, 0.5, 1.0, 2.0, or 3.0 wt %) and/or a pH of about, or less than about, 4.0, 4.5, 5.0, 5.5, 6.0, 6.5, 7.0, 7.5, 8.0, 8.5, 9.0, 4.0-9.0, 4.0-8.5, 4.0-8.0, 5.0-9.0, 5.0-8.5, 5.0-8.0, 6.0-9.0, 6.0-8.5, or 6.0-8.0, for example.

An aqueous composition comprising a graft copolymer derivative material herein can have a viscosity of about, or at least about, 5, 10, 100, 200, 300, 400, 500, 600, 700, 1000, 2000, 3000, 4000, 5000, 6000, 7000, 8000, 9000, 10000, or 15000 centipoise (cps), for example. Viscosity can be as measured with an aqueous composition at any temperature between about 3° C. to about 80° C., for example (e.g., 4-30° C., 15-30° C., 15-25° C.). Viscosity typically is as measured at atmospheric pressure (about 760 torr) or a pressure that is ±10% thereof. Viscosity can be measured using a viscometer or rheometer, for example, and can optionally be as measured at a shear rate (rotational shear rate) of about 0.1, 0.5, 1.0, 5, 10, 50, 100, 500, 1000, 0.1-500, 0.1-100, 1.0-500, 1.0-1000, or 1.0-100 $s^{-1}$ (1/s), for example.

The temperature of a composition comprising a graft copolymer derivative material herein (e.g., aqueous composition) can be about, or up to about, 0, 5, 10, 15, 20, 25, 30, 35, 40, 45, 50, 55, 60, 65, 70, 75, 80, 85, 90, 95, 100, 105, 110, 115, 120, 125, 130, 5-50, 20-25, 20-30, 20-40, 30-40, 40-130, 40-125, 40-120, 70-130, 70-125, 70-120, 80-130, 80-125, 80-120, 60-100, 60-90, 70-100, 70-90, 75-100, 75-90, or 75-85° C., for example.

A composition comprising a graft copolymer derivative material herein can, in some aspects, be non-aqueous (e.g., a dry composition). Examples of such embodiments include powders, granules, microcapsules, flakes, or any other form of particulate matter. Other examples include larger compositions such as pellets, bars, kernels, beads, tablets, sticks, or other agglomerates. A non-aqueous or dry composition typically has about, or no more than about, 12, 10, 8, 6, 5, 4, 3, 2, 1.5, 1.0, 0.5, 0.25, 0.10, 0.05, or 0.01 wt % water comprised therein. In some aspects (e.g., those directed to laundry or dish washing detergents), a dry composition herein can be provided in a sachet or pouch.

A composition comprising a graft copolymer derivative material herein can, in some aspects, comprise one or more salts such as a sodium salt (e.g., NaCl, $Na_2SO_4$). Other non-limiting examples of salts include those having (i) an aluminum, ammonium, barium, calcium, chromium (II or III), copper (I or II), iron (II or III), hydrogen, lead (II), lithium, magnesium, manganese (II or III), mercury (I or II), potassium, silver, sodium strontium, tin (II or IV), or zinc cation, and (ii) an acetate, borate, bromate, bromide, carbonate, chlorate, chloride, chlorite, chromate, cyanamide, cyanide, dichromate, dihydrogen phosphate, ferricyanide, ferrocyanide, fluoride, hydrogen carbonate, hydrogen phosphate, hydrogen sulfate, hydrogen sulfide, hydrogen sulfite, hydride, hydroxide, hypochlorite, iodate, iodide, nitrate, nitride, nitrite, oxalate, oxide, perchlorate, permanganate, peroxide, phosphate, phosphide, phosphite, silicate, stannate, stannite, sulfate, sulfide, sulfite, tartrate, or thiocyanate anion. Thus, any salt having a cation from (i) above and an anion from (ii) above can be in a composition, for example. A salt can be present in an aqueous composition herein at a wt % of about, or at least about, 0.01, 0.025, 0.05, 0.075, 0.1, 0.25, 0.5, 0.75, 1.0, 1.25, 1.5, 1.75, 2.0, 2.5, 3.0, 3.5, 0.01-3.5, 0.5-3.5, 0.5-2.5, or 0.5-1.5 wt % (such wt % values typically refer to the total concentration of one or more salts), for example.

A composition comprising a graft copolymer derivative material herein can optionally contain one or more active enzymes. Examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, nucleases, and amylases. If an enzyme(s) is included, it may be comprised in a composition herein at about 0.0001-0.1 wt % (e.g., 0.01-0.03 wt %) active enzyme (e.g., calculated as pure enzyme protein), for example. In fabric care applications, an enzyme (e.g., any of the above such as cellulase) can be present in an aqueous composition in which a fabric is treated (e.g., wash liquor) at a concentration that is minimally about 0.01-0.1 ppm total enzyme protein, or about 0.1-10 ppb total enzyme protein (e.g., less than 1 ppm), to maximally about 100, 200, 500, 1000, 2000, 3000, 4000, or 5000 ppm total enzyme protein, for example.

A composition comprising a graft copolymer derivative material herein, such as an aqueous composition or a non-aqueous composition (above), can be in the form of a household care product, personal care product, industrial product, ingestible product (e.g., food product), or pharmaceutical product, for example, such as described in any of U.S. Patent Appl. Publ. Nos. 2018/0022834, 2018/0237816, 2018/0230241, 20180079832, 2016/0311935, 2016/0304629, 2015/0232785, 2015/0368594, 2015/0368595, 2016/0122445, or 2019/0202942, or Int. Patent Appl. Publ. Nos. WO2016/133734 and WO2017/218391, which are all incorporated herein by reference. In some aspects, a composition comprising a graft copolymer derivative material can comprise at least one component/ingredient of a household care product, personal care product, industrial product, pharmaceutical product, or ingestible product (e.g., food product) as disclosed in any of the foregoing publications and/or as presently disclosed.

Graft copolymer derivative material disclosed herein is believed to be useful for providing one or more of the following physical properties to a personal care product, pharmaceutical product, household product, industrial product, or ingestible product (e.g., food product): thickening, freeze/thaw stability, lubricity, moisture retention and release, texture, consistency, shape retention, emulsification, binding, suspension, dispersion, gelation, reduced mineral hardness, for example. Examples of a concentration or amount of a graft copolymer derivative material in a product can be any of the weight percentages provided herein, for example.

Personal care products herein are not particularly limited and include, for example, skin care compositions, cosmetic compositions, antifungal compositions, and antibacterial compositions. Personal care products herein may be in the form of, for example, lotions, creams, pastes, balms, ointments, pomades, gels, liquids, combinations of these and the like. The personal care products disclosed herein can include at least one active ingredient, if desired. An active ingredient is generally recognized as an ingredient that causes an intended pharmacological effect.

In certain embodiments, a skin care product can be applied to skin for addressing skin damage related to a lack of moisture. A skin care product may also be used to address the visual appearance of skin (e.g., reduce the appearance of flaky, cracked, and/or red skin) and/or the tactile feel of the skin (e.g., reduce roughness and/or dryness of the skin while improved the softness and subtleness of the skin). A skin care product typically may include at least one active ingredient for the treatment or prevention of skin ailments, providing a cosmetic effect, or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, or colloidal oatmeal, and combinations of these. A skin care product may include one or more natural moisturizing factors such as ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, or sodium pyrrolidone carboxylate, for example. Other ingredients that may be included in a skin care product include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil. A skin care product can be an ointment, lotion, or sanitizer (e.g., hand sanitizer) in some aspects.

A personal care product herein can also be in the form of makeup, lipstick, mascara, rouge, foundation, blush, eyeliner, lip liner, lip gloss, other cosmetics, sunscreen, sun block, nail polish, nail conditioner, bath gel, shower gel, body wash, face wash, lip balm, skin conditioner, cold cream, moisturizer, body spray, soap, body scrub, exfoliant, astringent, scruffing lotion, depilatory, permanent waving solution, antidandruff formulation, antiperspirant composition, deodorant, shaving product, pre-shaving product, after-shaving product, cleanser, skin gel, rinse, dentifrice composition, toothpaste, or mouthwash, for example. An example of a personal care product (e.g., a cleanser, soap, scrub, cosmetic) comprises a carrier or exfoliation agent (e.g., jojoba beads [jojoba ester beads]) (e.g., about 1-10, 3-7, 4-6, or 5 wt %); such an agent may optionally be dispersed within the product.

A personal care product in some aspects can be a hair care product. Examples of hair care products herein include shampoo, hair conditioner (leave-in or rinse-out), cream rinse, hair dye, hair coloring product, hair shine product, hair serum, hair anti-frizz product, hair split-end repair product, mousse, hair spray (hair styling spray), and styling gel. A hair care product can be in the form of a liquid, paste, gel, solid, or powder in some embodiments. A hair care product as presently disclosed typically comprises one or more of the following ingredients, which are generally used to formulate hair care products: anionic surfactants such as polyoxyethylenelauryl ether sodium sulfate; cationic surfactants such as stearyltrimethylammonium chloride and/or distearyltrimethylammonium chloride; nonionic surfactants such as glyceryl monostearate, sorbitan monopalmitate and/or polyoxyethylenecetyl ether; wetting agents such as propylene glycol, 1,3-butylene glycol, glycerin, sorbitol, pyroglutamic acid salts, amino acids and/or trimethylglycine; hydrocarbons such as liquid paraffins, petrolatum, solid paraffins, squalane and/or olefin oligomers; higher alcohols such as stearyl alcohol and/or cetyl alcohol; superfatting agents; antidandruff agents; disinfectants; anti-inflammatory agents; crude drugs; water-soluble polymers such as methyl cellulose, hydroxycellulose and/or partially deacetylated chitin; antiseptics such as paraben; ultra-violet light absorbers; pearling agents; pH adjustors; perfumes; and pigments.

A pharmaceutical product herein can be in the form of an emulsion, liquid, elixir, gel, suspension, solution, cream, or ointment, for example. Also, a pharmaceutical product herein can be in the form of any of the personal care products disclosed herein, such as an antibacterial or antifungal composition. A pharmaceutical product can further comprise one or more pharmaceutically acceptable carriers, diluents, and/or pharmaceutically acceptable salts. Graft copolymer derivative material disclosed herein can also be used in capsules, encapsulants, tablets, tablet coatings, and as an excipients for medicaments and drugs.

A household and/or industrial product herein can be in the form of drywall tape-joint compounds; mortars; grouts; cement plasters; spray plasters; cement stucco; adhesives; pastes; wall/ceiling texturizers; binders and processing aids for tape casting, extrusion forming, injection molding and ceramics; spray adherents and suspending/dispersing aids for pesticides, herbicides, and fertilizers; fabric care products such as fabric softeners and laundry detergents; hard surface cleaners; air fresheners; polymer emulsions; latex; gels such as water-based gels; surfactant solutions; paints such as water-based paints; protective coatings; adhesives; sealants and caulks; inks such as water-based ink; metal-working fluids; films or coatings; or emulsion-based metal cleaning fluids used in electroplating, phosphatizing, galvanizing and/or general metal cleaning operations, for example. In some aspects, a graft copolymer derivative material is comprised in a fluid as a viscosity modifier and/or friction reducer; such uses include downhole operations/fluids (e.g., in hydraulic fracturing and enhanced oil recovery), for example.

Some aspects herein regard (i) salt water such as seawater, or (ii) an aqueous solution having about 2.0, 2.25, 2.5, 2.75, 3.0, 3.25. 3.5, 3.75, 4.0, 2.5-4.0, 2.75-4.0, 3.0-4.0, 2.5-3.5, 2.75-3.5, 3.0-3.5, 3.0-4.0, or 3.0-3.5 wt % of one or a combination of salts (e.g., including at least NaCl), having at least one aqueous-soluble graft copolymer derivative as presently disclosed. The concentration of graft copolymer derivative in such water of (i) or (ii) can be about, at least about, or below about, 0.1, 0.2, 0.3, 0.4, 0.5, 0.6, 0.7, 0.8, 0.9, 1.0, 0.1-0.6, 0.1-0.5, 0.1-0.4, 0.1-0.3, or 0.1-0.2 wt %, for example. Typically, despite the relatively high salt concentration in such aqueous compositions, a graft copolymer derivative herein can remain completely or mostly in solution and provide viscosity. Such a solution of (i) or (ii) as viscosity-modified by a graft copolymer ether herein can be as it is used within a system that utilizes such a solution (e.g., any herein, such as a downhole operation).

Graft copolymer derivative material disclosed herein can be comprised in a personal care product, pharmaceutical product, household product, industrial product, or ingestible product (e.g., food product) in an amount that provides a desired degree of thickening and/or dispersion, for example. Examples of a concentration or amount of a graft copolymer derivative material in a product are any of the weight percentages provided above.

Compositions disclosed herein can be in the form of a detergent composition such as a fabric care composition. A fabric care composition herein can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition as disclosed herein. In other aspects, a fabric care composition can be in a dry form such as a granular detergent or dryer-added fabric softener sheet. Other non-limiting examples of fabric care compositions herein include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists.

A detergent composition herein may be in any useful form, e.g., as powders, granules, pastes, bars, unit dose, or liquid. A liquid detergent may be aqueous, typically containing up to about 70 wt % of water and 0 wt % to about 30 wt % of organic solvent. It may also be in the form of a compact gel type containing only about 30 wt % water.

A detergent composition herein typically comprises one or more surfactants, wherein the surfactant is selected from nonionic surfactants, anionic surfactants, cationic surfactants, ampholytic surfactants, zwitterionic surfactants, semipolar nonionic surfactants and mixtures thereof. In some embodiments, the surfactant is present at a level of from about 0.1% to about 60%, while in alternative embodiments the level is from about 1% to about 50%, while in still further embodiments the level is from about 5% to about 40%, by weight of the detergent composition. A detergent will usually contain 0 wt % to about 50 wt % of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide (as described for example in WO92/06154, which is incorporated herein by reference).

A detergent composition herein typically comprises one or more detergent builders or builder systems. In some aspects, oxidized poly alpha-1,3-glucan can be included as a co-builder, in which it is used together with one or more additional builders such as any disclosed herein. Oxidized poly alpha-1,3-glucan compounds for use herein are disclosed in U.S. Patent Appl. Publ. No. 2015/0259439. In some embodiments incorporating at least one builder, the cleaning compositions comprise at least about 1%, from about 3% to about 60%, or even from about 5% to about 40%, builder by weight of the composition. Builders (in addition to oxidized poly alpha-1,3-glucan) include, but are not limited to, alkali metal, ammonium and alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Indeed, it is contemplated that any suitable builder will find use in various embodiments of the present disclosure. Additional examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst).

In some embodiments, builders form water-soluble hardness ion complexes (e.g., sequestering builders), such as citrates and polyphosphates (e.g., sodium tripolyphosphate and sodium tripolyphosphate hexahydrate, potassium tripolyphosphate, and mixed sodium and potassium tripolyphosphate, etc.). It is contemplated that any suitable builder will find use in the present disclosure, including those known in the art (See, e.g., EP2100949).

In some embodiments, suitable builders can include phosphate builders and non-phosphate builders. In some embodiments, a builder is a phosphate builder. In some embodiments, a builder is a non-phosphate builder. A builder can be used in a level of from 0.1% to 80%, or from 5% to 60%, or from 10% to 50%, by weight of the composition. In some embodiments, the product comprises a mixture of phosphate and non-phosphate builders. Suitable phosphate builders include mono-phosphates, di-phosphates, tri-polyphosphates or oligomeric-polyphosphates, including the alkali metal salts of these compounds, including the sodium salts. In some embodiments, a builder can be sodium tripolyphosphate (STPP). Additionally, the composition can comprise carbonate and/or citrate, preferably citrate that helps to achieve a neutral pH composition. Other suitable non-phosphate builders include homopolymers and copolymers of polycarboxylic acids and their partially or completely neutralized salts, monomeric polycarboxylic acids and hydroxycarboxylic acids and their salts. In some embodiments, salts of the above mentioned compounds include ammonium and/or alkali metal salts, i.e., lithium, sodium, and potassium salts, including sodium salts. Suitable polycarboxylic acids include acyclic, alicyclic, hetero-cyclic and aromatic carboxylic acids, wherein in some embodiments, they can contain at least two carboxyl groups which are in each case separated from one another by, in some instances, no more than two carbon atoms.

A detergent composition herein can comprise at least one chelating agent. Suitable chelating agents include, but are not limited to copper, iron and/or manganese chelating agents and mixtures thereof. In embodiments in which at least one chelating agent is used, the composition comprises from about 0.1% to about 15%, or even from about 3.0% to about 10%, chelating agent by weight of the composition.

A detergent composition herein can comprise at least one deposition aid. Suitable deposition aids include, but are not limited to, polyethylene glycol, polypropylene glycol, polycarboxylate, soil release polymers such as polytelephthalic acid, clays such as kaolinite, montmorillonite, attapulgite, illite, bentonite, halloysite, and mixtures thereof.

A detergent composition herein can comprise one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. Additional dye transfer inhibiting agents include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents examples of which include ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetraacetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethyl ethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP) and derivatives thereof, which can be used alone or in combination with any of the above. In embodiments in which at least one dye transfer inhibiting agent is used, a composition herein may comprise from about 0.0001% to about 10%, from about 0.01% to about 5%, or even from about 0.1% to about 3%, by weight of the composition.

A detergent composition herein can comprise silicates. In some of these embodiments, sodium silicates (e.g., sodium disilicate, sodium metasilicate, and/or crystalline phyllosilicates) find use. In some embodiments, silicates are present at a level of from about 1% to about 20% by weight of the composition. In some embodiments, silicates are present at a level of from about 5% to about 15% by weight of the composition.

A detergent composition herein can comprise dispersants. Suitable water-soluble organic materials include, but are not limited to the homo- or co-polymeric acids or their salts, in which the polycarboxylic acid comprises at least two carboxyl radicals separated from each other by not more than two carbon atoms.

A detergent composition herein may additionally comprise one or more enzymes as disclosed above, for example. In some aspects, a detergent composition can comprise one or more enzymes, each at a level from about 0.00001% to about 10% by weight of the composition and the balance of cleaning adjunct materials by weight of composition. In some other aspects, a detergent composition can also comprise each enzyme at a level of about 0.0001% to about 10%, about 0.001% to about 5%, about 0.001% to about 2%, or about 0.005% to about 0.5%, by weight of the composition. Enzymes comprised in a detergent composition herein may be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition in some aspects may comprise one or more other types of polymer in addition to a graft copolymer derivative material as disclosed herein. Examples of other types of polymers useful herein include carboxymethyl cellulose (CMC), dextran, poly(vinylpyrrolidone) (PVP), polyethylene glycol (PEG), poly(vinyl alcohol) (PVA), polycarboxylates such as polyacrylates, maleic/acrylic acid copolymers and lauryl methacrylate/acrylic acid copolymers.

A detergent composition herein may contain a bleaching system. For example, a bleaching system can comprise an $H_2O_2$ source such as perborate or percarbonate, which may be combined with a peracid-forming bleach activator such as tetraacetylethylenediamine (TAED) or nonanoyloxybenzenesulfonate (NOBS). Alternatively, a bleaching system may comprise peroxyacids (e.g., amide, imide, or sulfone type peroxyacids). Alternatively still, a bleaching system can be an enzymatic bleaching system comprising perhydrolase, for example, such as the system described in WO2005/056783.

A detergent composition herein may also contain conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) is usually neutral or alkaline (e.g., pH of about 7.0 to about 11.0).

It is believed that a graft copolymer derivative material herein can be included as an anti-redeposition agent and/or clay soil removal agent in a detergent composition such as a fabric care composition, if desired (such agents can optionally be characterized as whiteness maintenance agents in certain aspects). Examples of other suitable anti-redeposition and/or clay soil removal agents herein include polyethoxy zwitterionic surfactants, water-soluble copolymers of acrylic or methacrylic acid with acrylic or methacrylic acid-ethylene oxide condensates (e.g., U.S. Pat. No. 3,719,647), cellulose derivatives such as carboxymethylcellulose and hydroxypropylcellulose (e.g., U.S. Pat. Nos. 3,597,416 and 3,523,088), and mixtures comprising nonionic alkyl polyethoxy surfactant, polyethoxy alkyl quaternary cationic surfactant and fatty amide surfactant (e.g., U.S. Pat. No. 4,228,044). Non-limiting examples of other suitable anti-redeposition and clay soil removal agents are disclosed in U.S. Pat. Nos. 4,597,898 and 4,891,160, and Int. Patent Appl. Publ. No. WO95/32272, all of which are incorporated herein by reference.

Particular forms of detergent compositions that can be adapted for purposes disclosed herein are disclosed in, for example, US20090209445A1, US20100081598A1, U.S. Pat. No. 7,001,878B2, EP1504994B1, WO2001085888A2, WO2003089562A1, WO2009098659A1, WO2009098660A1, WO2009112992A1, WO2009124160A1, WO2009152031A1, WO2010059483A1, WO2010088112A1, WO2010090915A1, WO2010135238A1, WO2011094687A1, WO2011094690A1, WO2011127102A1, WO2011163428A1, WO2008000567A1, WO2006045391A1, WO2006007911A1, WO2012027404A1, EP1740690B1, WO2012059336A1, U.S. Pat. No. 6,730,646B1, WO2008087426A1, WO2010116139A1, and WO2012104613A1, all of which are incorporated herein by reference.

Laundry detergent compositions herein can optionally be heavy duty (all purpose) laundry detergent compositions. Exemplary heavy duty laundry detergent compositions comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., C8-C18 alkyl ethoxylated alcohols and/or C6-C12 alkyl phenol alkoxylates), where the weight ratio of anionic detersive surfactant (with a hydrophilic index (Hlc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof);

zwitterionic and/or amphoteric detersive surfactants (selected from a group of alkanolamine sulpho-betaines); ampholytic surfactants; semi-polar non-ionic surfactants and mixtures thereof.

A detergent herein such as a heavy duty laundry detergent composition may optionally include, a surfactancy boosting polymer consisting of amphiphilic alkoxylated grease cleaning polymers (selected from a group of alkoxylated polymers having branched hydrophilic and hydrophobic properties, such as alkoxylated polyalkylenimines in the range of 0.05 wt %-10 wt %) and/or random graft polymers (typically comprising of hydrophilic backbone comprising monomers selected from the group consisting of: unsaturated C1-C6 carboxylic acids, ethers, alcohols, aldehydes, ketones, esters, sugar units, alkoxy units, maleic anhydride, saturated polyalcohols such as glycerol, and mixtures thereof; and hydrophobic side chain(s) selected from the group consisting of: C4-C25 alkyl group, polypropylene, polybutylene, vinyl ester of a saturated C1-C6 monocarboxylic acid, C1-C6 alkyl ester of acrylic or methacrylic acid, and mixtures thereof.

A detergent herein such as a heavy duty laundry detergent composition may optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition agent(s) herein (0.1 wt % to 10 wt %), include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Da); and polymeric carboxylate (such as maleate/acrylate random copolymer or polyacrylate homopolymer).

A detergent herein such as a heavy duty laundry detergent composition may optionally further include saturated or unsaturated fatty acids, preferably saturated or unsaturated C12-C24 fatty acids (0 wt % to 10 wt %); deposition aids (examples for which include polysaccharides, cellulosic polymers, poly diallyl dimethyl ammonium halides (DADMAC), and co-polymers of DAD MAC with vinyl pyrrolidone, acrylamides, imidazoles, imidazolinium halides, and mixtures thereof, in random or block configuration, cationic guar gum, cationic starch, cationic polyacrylamides, and mixtures thereof.

A detergent herein such as a heavy duty laundry detergent composition may optionally further include dye transfer inhibiting agents, examples of which include manganese phthalocyanine, peroxidases, polyvinylpyrrolidone polymers, polyamine N-oxide polymers, copolymers of N-vinylpyrrolidone and N-vinylimidazole, polyvinyloxazolidones and polyvinylimidazoles and/or mixtures thereof; chelating agents, examples of which include ethylene-diamine-tetraacetic acid (EDTA), diethylene triamine penta methylene phosphonic acid (DTPMP), hydroxy-ethane diphosphonic acid (HEDP), ethylenediamine N,N'-disuccinic acid (EDDS), methyl glycine diacetic acid (MGDA), diethylene triamine penta acetic acid (DTPA), propylene diamine tetraacetic acid (PDTA), 2-hydroxypyridine-N-oxide (HPNO), or methyl glycine diacetic acid (MGDA), glutamic acid N,N-diacetic acid (N,N-dicarboxymethyl glutamic acid tetrasodium salt (GLDA), nitrilotriacetic acid (NTA), 4,5-dihydroxy-m-benzenedisulfonic acid, citric acid and any salts thereof, N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP), and derivatives thereof.

A detergent herein such as a heavy duty laundry detergent composition may optionally include silicone or fatty-acid based suds suppressors; hueing dyes, calcium and magnesium cations, visual signaling ingredients, anti-foam (0.001 wt % to about 4.0 wt %), and/or a structurant/thickener (0.01 wt % to 5 wt %) selected from the group consisting of diglycerides and triglycerides, ethylene glycol distearate, microcrystalline cellulose, microfiber cellulose, biopolymers, xanthan gum, gellan gum, and mixtures thereof). Such structurant/thickener would be, in some aspects, in addition to graft copolymer derivative material comprised in the detergent. A structurant can also be referred to as a structural agent.

A detergent herein can be in the form of a heavy duty dry/solid laundry detergent composition, for example. Such a detergent may include: (i) a detersive surfactant, such as any anionic detersive surfactant disclosed herein, any non-ionic detersive surfactant disclosed herein, any cationic detersive surfactant disclosed herein, any zwitterionic and/or amphoteric detersive surfactant disclosed herein, any ampholytic surfactant, any semi-polar non-ionic surfactant, and mixtures thereof; (ii) a builder, such as any phosphate-free builder (e.g., zeolite builders in the range of 0 wt % to less than 10 wt %), any phosphate builder (e.g., sodium tri-polyphosphate in the range of 0 wt % to less than 10 wt %), citric acid, citrate salts and nitrilotriacetic acid, any silicate salt (e.g., sodium or potassium silicate or sodium meta-silicate in the range of 0 wt % to less than 10 wt %); any carbonate salt (e.g., sodium carbonate and/or sodium bicarbonate in the range of 0 wt % to less than 80 wt %), and mixtures thereof; (iii) a bleaching agent, such as any photobleach (e.g., sulfonated zinc phthalocyanines, sulfonated aluminum phthalocyanines, xanthenes dyes, and mixtures thereof), any hydrophobic or hydrophilic bleach activator (e.g., dodecanoyl oxybenzene sulfonate, decanoyl oxybenzene sulfonate, decanoyl oxybenzoic acid or salts thereof, 3,5,5-trimethy hexanoyl oxybenzene sulfonate, tetraacetyl ethylene diamine-TAED, nonanoyloxybenzene sulfonate-NOBS, nitrile quats, and mixtures thereof), any source of hydrogen peroxide (e.g., inorganic perhydrate salts, examples of which include mono or tetra hydrate sodium salt of perborate, percarbonate, persulfate, perphosphate, or persilicate), any preformed hydrophilic and/or hydrophobic peracids (e.g., percarboxylic acids and salts, percarbonic acids and salts, perimidic acids and salts, peroxymonosulfuric acids and salts, and mixtures thereof); and/or (iv) any other components such as a bleach catalyst (e.g., imine bleach boosters examples of which include iminium cations and polyions, iminium zwitterions, modified amines, modified amine oxides, N-sulphonyl imines, N-phosphonyl imines, N-acyl imines, thiadiazole dioxides, perfluoroimines, cyclic sugar ketones, and mixtures thereof), and a metal-containing bleach catalyst (e.g., copper, iron, titanium, ruthenium, tungsten, molybdenum, or manganese cations along with an auxiliary metal cations such as zinc or aluminum and a sequestrate such as EDTA, ethylenediaminetetra(methylenephosphonic acid).

A detergent herein such as that for fabric care (e.g., laundry) can be comprised in a unit dose (e.g., sachet or pouch), for example. A unit dose form can comprise a water-soluble outer film that completely envelopes a liquid or solid detergent composition. A unit dose can comprise a single compartment, or at least two, three, or more (multiple) compartments. Multiple compartments can be arranged in a superposed orientation or a side-by-side orientation. A unit dose herein is typically a closed structure of any form/shape suitable for holding and protecting its contents without allowing contents release prior to contact with water.

Compositions disclosed herein can be in the form of a dishwashing detergent composition, for example. Examples of dishwashing detergents include automatic dishwashing detergents (typically used in dishwasher machines) and hand-washing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

Dishwashing detergents such as an automatic dishwasher detergent or liquid dishwashing detergent can comprise (i) a non-ionic surfactant, including any ethoxylated non-ionic surfactant, alcohol alkoxylated surfactant, epoxy-capped poly(oxyalkylated) alcohol, or amine oxide surfactant present in an amount from 0 to 10 wt %; (ii) a builder, in the range of about 5-60 wt %, including any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N, N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 wt % to 50 wt %, or sulfonated/carboxylated polymers in the range of about 0.1 wt % to about 50 wt %; (iii) a drying aid in the range of about 0.1 wt % to about 10 wt % (e.g., polyesters, especially anionic polyesters, optionally together with further monomers with 3 to 6 functionalities-typically acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1 wt % to about 20 wt % (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach (e.g., organic peroxyacids such as diacyl- and tetraacylperoxides, especially diperoxydodecanedioic acid, diperoxytetradecanedioic acid, and diperoxyhexadecanedioic acid); (vi) a bleach activator (e.g., organic peracid precursors in the range from about 0.1 wt % to about 10 wt %) and/or bleach catalyst (e.g., manganese triazacyclononane and related complexes; Co, Cu, Mn, and Fe bispyridylamine and related complexes; and pentamine acetate cobalt (III) and related complexes); (vii) a metal care agent in the range from about 0.1 wt % to 5 wt % (e.g., benzatriazoles, metal salts and complexes, and/or silicates); and/or (viii) any active enzyme disclosed herein in the range from about 0.01 to 5.0 mg of active enzyme per gram of automatic dishwashing detergent composition, and an enzyme stabilizer component (e.g., oligosaccharides, polysaccharides, and inorganic divalent metal salts).

A detergent herein such as that for dish care can be comprised in a unit dose (e.g., sachet or pouch), for example, and can be as described above for a fabric care detergent, but rather comprise a suitable dish detergent composition.

Compositions disclosed herein can be in the form of an oral care composition, for example. Examples of oral care compositions include dentifrices, toothpaste, mouth wash, mouth rinse, chewing gum, and edible strips that provide some form of oral care (e.g., treatment or prevention of cavities [dental caries], gingivitis, plaque, tartar, and/or periodontal disease). An oral care composition can also be for treating an "oral surface", which encompasses any soft or hard surface within the oral cavity including surfaces of the tongue, hard and soft palate, buccal mucosa, gums and dental surfaces. A "dental surface" herein is a surface of a natural tooth or a hard surface of artificial dentition including a crown, cap, filling, bridge, denture, or dental implant, for example.

An oral care composition herein can comprise about 0.01-15.0 wt % (e.g., ~0.1-10 wt % or ~0.1-5.0 wt %, ~0.1-2.0 wt %) of graft copolymer derivative material as disclosed herein, for example. Graft copolymer derivative material comprised in an oral care composition can sometimes be provided therein as a thickening agent and/or dispersion agent, which may be useful to impart a desired consistency and/or mouth feel to the composition. One or more other thickening or dispersion agents can also be provided in an oral care composition herein, such as a carboxyvinyl polymer, carrageenan (e.g., L-carrageenan), natural gum (e.g., karaya, xanthan, gum arabic, tragacanth), colloidal magnesium aluminum silicate, or colloidal silica, for example.

An oral care composition herein may be a toothpaste or other dentifrice, for example. Such compositions, as well as any other oral care composition herein, can additionally comprise, without limitation, one or more of an anticaries agent, antimicrobial or antibacterial agent, anticalculus or tartar control agent, surfactant, abrasive, pH-modifying agent, foam modulator, humectant, flavorant, sweetener, pigment/colorant, whitening agent, and/or other suitable components. Examples of oral care compositions to which graft copolymer derivative material herein can be added are disclosed in U.S. Patent Appl. Publ. Nos. 2006/0134025, 2002/0022006 and 2008/0057007, which are incorporated herein by reference.

An anticaries agent herein can be an orally acceptable source of fluoride ions. Suitable sources of fluoride ions include fluoride, monofluorophosphate and fluorosilicate salts as well as amine fluorides, including olaflur (N'-octadecyltrimethylendiamine-N, N,N'-tris(2-ethanol)-dihydrofluoride), for example. An anticaries agent can be present in an amount providing a total of about 100-20000 ppm, about 200-5000 ppm, or about 500-2500 ppm, fluoride ions to the composition, for example. In oral care compositions in which sodium fluoride is the sole source of fluoride ions, an amount of about 0.01-5.0 wt %, about 0.05-1.0 wt %, or about 0.1-0.5 wt %, sodium fluoride can be present in the composition, for example.

An antimicrobial or antibacterial agent suitable for use in an oral care composition herein includes, for example, phenolic compounds (e.g., 4-allylcatechol; p-hydroxybenzoic acid esters such as benzylparaben, butylparaben, ethylparaben, methylparaben and propylparaben; 2-benzylphenol; butylated hydroxyanisole; butylated hydroxytoluene; capsaicin; carvacrol; creosol; eugenol; guaiacol; halogenated bisphenolics such as hexachlorophene and bromochlorophene; 4-hexylresorcinol; 8-hydroxyquinoline and salts thereof; salicylic acid esters such as menthyl salicylate, methyl salicylate and phenyl salicylate; phenol; pyrocatechol; salicylanilide; thymol; halogenated diphenylether compounds such as triclosan and triclosan monophosphate), copper (II) compounds (e.g., copper (II) chloride, fluoride, sulfate and hydroxide), zinc ion sources (e.g., zinc acetate, citrate, gluconate, glycinate, oxide, and sulfate), phthalic acid and salts thereof (e.g., magnesium monopotassium phthalate), hexetidine, octenidine, sanguinarine, benzalkonium chloride, domiphen bromide, alkylpyridinium chlorides (e.g. cetylpyridinium chloride, tetradecylpyridinium chloride, N-tetradecyl-4-ethylpyridinium chloride), iodine, sulfonamides, bisbiguanides (e.g., alexidine, chlorhexidine, chlorhexidine digluconate), piperidino derivatives (e.g., delmopinol, octapinol), *magnolia* extract, grapeseed extract, rosemary extract, menthol, geraniol, citral, eucalyptol, antibiotics (e.g., augmentin, amoxicillin, tetracycline, doxycycline, minocycline, metronidazole, neomycin, kanamycin, clindamycin), and/or any antibacterial agents disclosed in U.S. Pat. No. 5,776,435, which is incorporated herein by reference. One or more antimicrobial agents can optionally be present at about 0.01-10 wt % (e.g., 0.1-3 wt %), for example, in the disclosed oral care composition.

An anticalculus or tartar control agent suitable for use in an oral care composition herein includes, for example, phosphates and polyphosphates (e.g., pyrophosphates), polyaminopropanesulfonic acid (AMPS), zinc citrate trihydrate, polypeptides (e.g., polyaspartic and polyglutamic acids), polyolefin sulfonates, polyolefin phosphates, diphosphonates (e.g., azacycloalkane-2,2-diphosphonates such as azacycloheptane-2,2-diphosphonic acid), N-methyl azacyclopentane-2,3-diphosphonic acid, ethane-1-hydroxy-1,1-diphosphonic acid (EHDP), ethane-1-amino-1,1-diphosphonate, and/or phosphonoalkane carboxylic acids and salts thereof (e.g., their alkali metal and ammonium salts). Useful inorganic phosphate and polyphosphate salts include, for example, monobasic, dibasic and tribasic sodium phosphates, sodium tripolyphosphate, tetrapolyphosphate, mono-, di-, tri- and tetra-sodium pyrophosphates, disodium dihydrogen pyrophosphate, sodium trimetaphosphate, sodium hexametaphosphate, or any of these in which sodium is replaced by potassium or ammonium. Other useful anticalculus agents in certain embodiments include anionic polycarboxylate polymers (e.g., polymers or copolymers of acrylic acid, methacrylic, and maleic anhydride such as polyvinyl methyl ether/maleic anhydride copolymers). Still other useful anticalculus agents include sequestering agents such as hydroxycarboxylic acids (e.g., citric, fumaric, malic, glutaric and oxalic acids and salts thereof) and aminopolycarboxylic acids (e.g., EDTA). One or more anticalculus or tartar control agents can optionally be present at about 0.01-50 wt % (e.g., about 0.05-25 wt % or about 0.1-15 wt %), for example, in the disclosed oral care composition.

A surfactant suitable for use in an oral care composition herein may be anionic, non-ionic, or amphoteric, for example. Suitable anionic surfactants include, without limitation, water-soluble salts of $C_{8-20}$ alkyl sulfates, sulfonated monoglycerides of $C_{8-20}$ fatty acids, sarcosinates, and taurates. Examples of anionic surfactants include sodium lauryl sulfate, sodium coconut monoglyceride sulfonate, sodium lauryl sarcosinate, sodium lauryl isoethionate, sodium laureth carboxylate and sodium dodecyl benzenesulfonate. Suitable non-ionic surfactants include, without limitation, poloxamers, polyoxyethylene sorbitan esters, fatty alcohol ethoxylates, alkylphenol ethoxylates, tertiary amine oxides, tertiary phosphine oxides, and dialkyl sulfoxides. Suitable amphoteric surfactants include, without limitation, derivatives of $C_{8-20}$ aliphatic secondary and tertiary amines having an anionic group such as a carboxylate, sulfate, sulfonate, phosphate or phosphonate. An example of a suitable amphoteric surfactant is cocoamidopropyl betaine. One or more surfactants are optionally present in a total amount of about 0.01-10 wt % (e.g., about 0.05-5.0 wt % or about 0.1-2.0 wt %), for example, in the disclosed oral care composition.

An abrasive suitable for use in an oral care composition herein may include, for example, silica (e.g., silica gel, hydrated silica, precipitated silica), alumina, insoluble phosphates, calcium carbonate, and resinous abrasives (e.g., a urea-formaldehyde condensation product). Examples of insoluble phosphates useful as abrasives herein are orthophosphates, polymetaphosphates and pyrophosphates, and include dicalcium orthophosphate dihydrate, calcium pyrophosphate, beta-calcium pyrophosphate, tricalcium phosphate, calcium polymetaphosphate and insoluble sodium polymetaphosphate. One or more abrasives are optionally present in a total amount of about 5-70 wt % (e.g., about 10-56 wt % or about 15-30 wt %), for example, in the disclosed oral care composition. The average particle size of an abrasive in certain embodiments is about 0.1-30 microns (e.g., about 1-20 microns or about 5-15 microns).

An oral care composition in certain embodiments may comprise at least one pH-modifying agent. Such agents may be selected to acidify, make more basic, or buffer the pH of a composition to a pH range of about 2-10 (e.g., pH ranging from about 2-8, 3-9, 4-8, 5-7, 6-10, or 7-9). Examples of pH-modifying agents useful herein include, without limitation, carboxylic, phosphoric and sulfonic acids; acid salts (e.g., monosodium citrate, disodium citrate, monosodium malate); alkali metal hydroxides (e.g. sodium hydroxide, carbonates such as sodium carbonate, bicarbonates, sesquicarbonates); borates; silicates; phosphates (e.g., monosodium phosphate, trisodium phosphate, pyrophosphate salts); and imidazole.

A foam modulator suitable for use in an oral care composition herein may be a polyethylene glycol (PEG), for example. High molecular weight PEGs are suitable, including those having an average molecular weight of about 200000-7000000 (e.g., about 500000-5000000 or about 1000000-2500000), for example. One or more PEGs are optionally present in a total amount of about 0.1-10 wt % (e.g. about 0.2-5.0 wt % or about 0.25-2.0 wt %), for example, in the disclosed oral care composition.

An oral care composition in certain embodiments may comprise at least one humectant. A humectant in certain embodiments may be a polyhydric alcohol such as glycerin, sorbitol, xylitol, or a low molecular weight PEG. Most suitable humectants also may function as a sweetener herein. One or more humectants are optionally present in a total amount of about 1.0-70 wt % (e.g., about 1.0-50 wt %, about 2-25 wt %, or about 5-15 wt %), for example, in the disclosed oral care composition.

A natural or artificial sweetener may optionally be comprised in an oral care composition herein. Examples of suitable sweeteners include dextrose, sucrose, maltose, dextrin, invert sugar, mannose, xylose, ribose, fructose, levulose, galactose, corn syrup (e.g., high fructose corn syrup or corn syrup solids), partially hydrolyzed starch, hydrogenated starch hydrolysate, sorbitol, mannitol, xylitol, maltitol, isomalt, aspartame, neotame, saccharin and salts thereof, dipeptide-based intense sweeteners, and cyclamates. One or more sweeteners are optionally present in a total amount of about 0.005-5.0 wt %, for example, in the disclosed oral care composition.

A natural or artificial flavorant may optionally be comprised in an oral care composition herein. Examples of suitable flavorants include vanillin; sage; marjoram; parsley oil; spearmint oil; cinnamon oil; oil of wintergreen (methylsalicylate); peppermint oil; clove oil; bay oil; anise oil; eucalyptus oil; citrus oils; fruit oils; essences such as those derived from lemon, orange, lime, grapefruit, apricot, banana, grape, apple, strawberry, cherry, or pineapple; bean- and nut-derived flavors such as coffee, cocoa, cola, peanut, or almond; and adsorbed and encapsulated flavorants. Also encompassed within flavorants herein are ingredients that provide fragrance and/or other sensory effect in the mouth, including cooling or warming effects. Such ingredients include, without limitation, menthol, menthyl acetate, menthyl lactate, camphor, eucalyptus oil, eucalyptol, anethole, eugenol, cassia, oxanone, Irisone®, propenyl guaiethol, thymol, linalool, benzaldehyde, cinnamaldehyde, N-ethyl-p-menthan-3-carboxamine, N,2,3-trimethyl-2-isopropylbutanamide, 3-(1-menthoxy)-propane-1,2-diol, cinnamaldehyde glycerol acetal (CGA), and menthone glycerol acetal (MGA). One or more flavorants are optionally present in a total amount of about 0.01-5.0 wt % (e.g., about 0.1-2.5 wt %), for example, in the disclosed oral care composition.

An oral care composition in certain embodiments may comprise at least one bicarbonate salt. Any orally acceptable bicarbonate can be used, including alkali metal bicarbonates such as sodium or potassium bicarbonate, and ammonium bicarbonate, for example. One or more bicarbonate salts are optionally present in a total amount of about 0.1-50 wt % (e.g., about 1-20 wt %), for example, in the disclosed oral care composition.

An oral care composition in certain embodiments may comprise at least one whitening agent and/or colorant. A suitable whitening agent is a peroxide compound such as any of those disclosed in U.S. Pat. No. 8,540,971, which is incorporated herein by reference. Suitable colorants herein include pigments, dyes, lakes and agents imparting a particular luster or reflectivity such as pearling agents, for example. Specific examples of colorants useful herein include talc; mica; magnesium carbonate; calcium carbonate; magnesium silicate; magnesium aluminum silicate; silica; titanium dioxide; zinc oxide; red, yellow, brown and black iron oxides; ferric ammonium ferrocyanide; manganese violet; ultramarine; titaniated mica; and bismuth oxychloride. One or more colorants are optionally present in a total amount of about 0.001-20 wt % (e.g., about 0.01-10 wt % or about 0.1-5.0 wt %), for example, in the disclosed oral care composition.

Additional components that can optionally be included in an oral composition herein include one or more enzymes (above), vitamins, and anti-adhesion agents, for example. Examples of vitamins useful herein include vitamin C, vitamin E, vitamin B5, and folic acid. Examples of suitable anti-adhesion agents include solbrol, ficin, and quorum-sensing inhibitors.

An alpha-glucan graft copolymer derivative in some aspects has builder activity. For example, an aqueous composition herein comprising a graft copolymer derivative can further comprise (e.g., is bound to) at least one cation. Such binding is typically via ionic bonding. Examples of a cation include one or more hard water cations such as $Ca^{2+}$ and/or $Mg^{2+}$. The binding of a composition herein to a cation in an aqueous composition/system can act to soften the water (act as a builder) of the aqueous composition/system. Typically, a composition herein having this applicability comprises a graft copolymer derivative having a negative charge (e.g., carboxymethyl graft copolymer or graft copolymer substituted with carboxylic groups).

An aqueous composition/system in which a composition herein can act as a builder can be wash liquor/grey water being used to wash dishware herein (e.g., in an automatic dishwashing machine) or fabric-containing articles herein (e.g., clothes, such as in a laundry machine), or any other aqueous composition/system to which a detergent has been added for washing and/or providing maintenance, for example; such an aqueous composition/system typically can benefit from the ability of a composition herein to prevent/reduce negative effects (e.g., scale deposition and/or scum formation) caused by the presence of one or more cations. In some aspects, an aqueous composition/system in which a composition herein can bind to at least one cation can be any system disclosed herein in which water or an aqueous solution is circulated, transited, and/or stored (a detergent does not necessarily need to be present); such a system typically can also benefit for the same reasons as disclosed above. Typically, a composition in some aspects can act as a builder/softener by sequestering/chelating and/or precipitating cations. The binding (or other interaction, whatever the case may be) between a composition herein with a cation can prevent/reduce formation (e.g., by about, or at least about 10%, 20%, 30%, 40%, 50%, 60%, 70%, or 80%, as compared to not using the composition) of undesired insoluble salts (e.g., carbonates such as $CaCO_3$ or $MgCO_3$, hydroxides such as $Mg(OH)_2$, sulfates such a $CaSO_4$) and/or other insoluble compounds (e.g., calcium and/or magnesium salts of fatty acids such as stearate), and/or their deposits (e.g., scale, scum such as soap scum) that can form in aqueous systems having hard water cations.

In addition to those mentioned above, some examples of aqueous systems herein that can be treated with a composition herein include those of an industrial setting. Examples of industrial settings herein include those of an energy (e.g., fossil fuel such as petroleum) (e.g., mining/drilling/downhole operation), water (e.g., water treatment and/or purification, industrial water, wastewater or sludge treatment, water desalination), agriculture (e.g., grain, fruits/vegetables, fishing, aquaculture, dairy, animal farming, timber, plants, soil conditioning), chemical (e.g., pharmaceutical, chemical processing), food processing/manufacturing, mining, paper making, or transportation (e.g., fresh water and/or maritime shipping, train or truck container) industry. Further examples of aqueous systems herein that can be treated with a composition herein include those for water treatment, water storage, and/or other water-bearing system (e.g., piping/conduits, heat exchangers, condensers, filters/filtration systems, storage tanks, water cooling towers, pasteurizers, boilers, sprayers, nozzles, ship hull, ballast water). Further examples of aqueous systems herein that can be treated with a composition herein include those of a medical/dental/ healthcare setting (e.g., hospital, clinic, examination room, nursing home), food service setting (e.g., restaurant, commissary kitchen, cafeteria), retail setting (e.g., grocery, soft drink machine/dispenser), hospitality/travel setting (e.g., hotel/motel), sports/recreational setting (e.g., aquatics/tubs, spa), or office/home setting (e.g., bathroom, tub/shower, kitchen, appliances [e.g., laundry machine, automatic dishwashing machine, fridge, freezer], sprinkler system, home/building water piping, water storage tank, water heater). Further examples of aqueous systems herein that can be treated with a composition herein include those as disclosed in any of U.S. Patent Appl. Publ. Nos. 2013/0029884, 2005/0238729, 2010/0298275, 2016/0152495, 2013/0052250, 2015/009891, 2016/0152495, 2017/0044468, 2012/0207699, or 2020/0308592, or U.S. Pat. Nos. 4,552,591, 4,925,582, 6,478,972, 6,514,458, 6,395,189, 7,927,496, or 8784659, which are all incorporated herein by reference.

The present disclosure also concerns a method of treating a material. This method comprises contacting a material with an aqueous composition comprising a graft copolymer derivative material as disclosed herein.

A material contacted with an aqueous composition in a contacting method herein can comprise a fabric in some aspects. A fabric herein can comprise natural fibers, synthetic fibers, semi-synthetic fibers, or any combination thereof. A semi-synthetic fiber herein is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and Tencel®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) include those with both a cotton fiber and polyester, for example. Materials/articles containing one or more fabrics herein include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams.

An aqueous composition that is contacted with a fabric can be, for example, a fabric care composition (e.g., laundry detergent, fabric softener). Thus, a treatment method in certain embodiments can be considered a fabric care method or laundry method if employing a fabric care composition therein. A fabric care composition herein is contemplated to effect one or more of the following fabric care benefits (i.e., surface substantive effects): wrinkle removal, wrinkle reduction, wrinkle resistance, fabric wear reduction, fabric wear resistance, fabric pilling reduction, extended fabric life, fabric color maintenance, fabric color fading reduction, reduced dye transfer, fabric color restoration, fabric soiling reduction, fabric soil release, fabric shape retention, fabric smoothness enhancement, anti-redeposition of soil on fabric, anti-greying of laundry, improved fabric hand/handle, and/or fabric shrinkage reduction.

Examples of conditions (e.g., time, temperature, wash/rinse volumes) for conducting a fabric care method or laundry method herein are disclosed in WO1997/003161 and U.S. Pat. Nos. 4,794,661, 4,580,421 and 5,945,394, which are incorporated herein by reference. In other examples, a material comprising fabric can be contacted with an aqueous composition herein: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0 wt %; or any combination of (i)-(iv).

The contacting step in a fabric care method or laundry method can comprise any of washing, soaking, and/or rinsing steps, for example. Contacting a material or fabric in still further embodiments can be performed by any means known in the art, such as dissolving, mixing, shaking, spraying, treating, immersing, flushing, pouring on or in, combining, painting, coating, applying, affixing to, and/or communicating an effective amount of a graft copolymer derivative material herein with the fabric or material. In still further embodiments, contacting may be used to treat a fabric to provide a surface substantive effect. As used herein, the term "fabric hand" or "handle" refers to a person's tactile sensory response towards fabric which may be physical, physiological, psychological, social or any combination thereof. In one embodiment, the fabric hand may be measured using a PhabrOmeter® System for measuring relative hand value (available from Nu Cybertek, Inc. Davis, CA) (American Association of Textile Chemists and Colorists [AATCC test method "202-2012, Relative Hand Value of Textiles: Instrumental Method"]).

In some aspects of treating a material comprising fabric, graft copolymer derivative material components of the aqueous composition adsorb to the fabric. This feature is believed to render a graft copolymer derivative material herein useful as anti-redeposition agents and/or anti-greying agents in fabric care compositions disclosed (in addition to their viscosity-modifying effect). An anti-redeposition agent or anti-greying agent herein helps keep soil from redepositing onto clothing in wash water after the soil has been removed. It is further contemplated that adsorption of a graft copolymer derivative material herein to a fabric enhances mechanical properties of the fabric.

Adsorption of a graft copolymer derivative material to a fabric herein can be measured using a colorimetric technique (e.g., Dubois et al., 1956, *Anal. Chem.* 28:350-356; Zemljič et al., 2006, *Lenzinger Berichte* 85:68-76; both incorporated herein by reference), for example, or any other method known in the art.

Other materials that can be contacted in the above treatment method include surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, polystyrene, etc.) and wood (collectively referred to herein as "tableware"). Thus, the treatment method in certain embodiments can be considered a dishwashing method or tableware washing method, for example. Examples of conditions (e.g., time, temperature, wash volume) for conducting a dishwashing or tableware washing method herein are disclosed in U.S. U.S. Pat. No. 8,575,083, which is incorporated herein by reference. In other examples, a tableware article can be contacted with an aqueous composition herein under a suitable set of conditions such as any of those disclosed above with regard to contacting a fabric-comprising material.

Other materials that can be contacted in the above treatment method include oral surfaces such as any soft or hard surface within the oral cavity including surfaces of the tongue, hard and soft palate, buccal mucosa, gums and dental surfaces (e.g., natural tooth or a hard surface of artificial dentition such as a crown, cap, filling, bridge, denture, or dental implant). Thus, a treatment method in certain embodiments can be considered an oral care method or dental care method, for example. Conditions (e.g., time, temperature) for contacting an oral surface with an aqueous composition herein should be suitable for the intended purpose of making such contact. Other surfaces that can be contacted in a treatment method also include a surface of the integumentary system such as skin, hair or nails.

Thus, certain embodiments of the present disclosure concern material (e.g., fabric) that comprises a graft copolymer derivative material herein. Such material can be produced following a material treatment method as disclosed herein, for example. A material may comprise a graft copolymer derivative material in some aspects if the graft copolymer derivative material is adsorbed to, or otherwise in contact with, the surface of the material.

Some aspects of a method of treating a material herein further comprise a drying step, in which a material is dried after being contacted with the aqueous composition. A drying step can be performed directly after the contacting step, or following one or more additional steps that might follow the contacting step (e.g., drying of a fabric after being rinsed, in water for example, following a wash in an aqueous composition herein). Drying can be performed by any of several means known in the art, such as air drying (e.g., ~20-25° C.), or at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein. Fabric is a preferred material for conducting an optional drying step.

An aqueous composition used in a treatment method herein can be any aqueous composition disclosed herein. Examples of aqueous compositions include detergents (e.g., laundry detergent or dish detergent), fabric softeners, and water-containing dentifrices such as toothpaste.

A composition comprising a graft copolymer derivative material herein can be a film or coating, for example. A film or coating can be a dried film or coating in some aspects, comprising less than about 3, 2, 1, 0.5, or 0.1 wt % water, for example. In some aspects, a film or coating can comprise about 20-40, 20-35, 20-30, 25-40, 25-35, or 25-30 wt % a graft copolymer derivative material, where the balance of material in the film or coating optionally is water, an aqueous solution, and/or a plasticizer. The amount of a graft copolymer derivative material comprised in a film or coating herein can be about, or at least about, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, or 99.9 wt %, for example.

A film or coating herein can have a thickness of about, at least about, or up to about, 0.5, 0.6, 0.7, 0.8, 0.9, 1.0, 1.1, 1.2, 1.3, 1.4, 1.5, 2, 2.5, 5, 7.5, 10, 15.5, 15, 17.5, 20, 22.5, 25, 30, 35, 40, 45, 50, 75, 100, 150, 200, 0.5-1.5, 0.8-1.5, 1.0-1.5, 0.5-1.4, 0.8-1.4, or 1.0-1.4 mil (1 mil=0.001 inch), for instance. In some aspects, such thickness is uniform, which can be characterized by having a contiguous area that (i) is at least 20%, 30%, 40%, or 50% of the total film/coating area, and (ii) has a standard deviation of thickness of less than about 0.06, 0.05, or 0.04 mil. A film or coating herein can be characterized as thin (e.g., <2 mil) in some aspects. A film herein is typically a cast film.

A film or coating herein can exhibit various degrees of transparency as desired. For example, a film/coating can be highly transparent (e.g., high light transmission, and/or low haze). Optical transparency as used herein can, for example, refer to a film or coating allowing at least about 10-99% light transmission, or at least about 50%, 60%, 70%, 80%, 90%, 95%, 96%, 97%, 98%, or 99% light transmission, and/or less than 30%, 25%, 20%, 15%, 10%, 5%, 2.5%, 2%, or 1% haze. High optical transparency can optionally refer to a film/coating having at least about 90% light transmittance and/or a haziness of less than 10%. Light transmittance of a film/coating herein can be measured following test ASTM D1746 (2009, *Standard Test Method for Transparency of Plastic Sheeting*, ASTM International, West Conshohocken, PA), for example, which is incorporated herein by reference. Haze of a film/coating herein can be measured following test ASTM D1003-13 (2013, *Standard Test Method for Haze and Luminous Transmittance of Transparent Plastics*, ASTM International, West Conshohocken, PA), for example, which is incorporated herein by reference.

A film or coating herein can optionally further comprise a plasticizer such as glycerol, propylene glycol, ethylene glycol, and/or polyethylene glycol. In some aspects, other film components (in addition to graft copolymer derivative material herein) can be as disclosed in U.S. Patent. Appl. Publ. No. 2011/0151224, 2015/0191550, 20190153674, or 20210095155, U.S. Pat. No. 9,688,035 or 3,345,200, or Int. Patent Appl. Publ. No. WO2018/200437, all of which are incorporated herein by reference.

Also disclosed are articles comprising an adhesive, film, coating, or binder comprising a graft copolymer derivative material herein in a dry form. Such articles (optionally, "coated articles") comprise a substrate having at least one surface on which is disposed/deposited the coating, adhesive, film, or binder, in a substantially continuous or discontinuous manner. In some aspects, an article comprises paper, leather, wood, metal, polymer, fibrous material, masonry, drywall, plaster, and/or an architectural surface. An "architectural surface" herein is an external or internal surface of a building or other man-made structure. In some aspects, an article comprises a porous substrate such as in paper, cardboard, paperboard, corrugated board, a cellulosic substrate, a textile, or leather. Yet, in some aspects, an article can comprise a polymer such as polyamide, polyolefin, polylactic acid, polyethylene terephthalate (PET), poly(trimethylene terephthalate) (PTT), aramid, polyethylene sulfide (PES), polyphenylene sulfide (PPS), polyimide (PI), polyethylene imine (PEI), polyethylene naphthalate (PEN), polysulfone (PS), polyether ether ketone (PEEK), polyethylene, polypropylene, poly(cyclic olefins), poly(cyclohexylene dimethylene terephthalate), poly(trimethylene furandicarboxylate) (PTF), or cellophane. In some aspects, an article comprising a fibrous substrate is a fiber, yarn, fabric, fabric blend, textile, nonwoven, paper, or carpet. A fibrous substrate can contain natural and/or synthetic fibers, such as cotton, cellulose, wool, silk, rayon, nylon, aramid, acetate, polyurethane urea, acrylic, jute, sisal, sea grass, coir, polyamide, polyester, polyolefin, polyacrylonitrile, polypropylene, polyaramid, or blends thereof.

A film or coating herein can have grease/oil and/or oxygen barrier properties in some aspects. Such a film or coating can comprise, along with graft copolymer derivative material herein, one or more components as disclosed in U.S. Patent. Appl. Publ. Nos. 20190153674 or 2021/0095155, or Int. Patent Appl. Publ. No. WO2018/200437, which are each incorporated herein by reference. For example, a film or coating herein can comprise, optionally as a binder, one or more of polyvinyl alcohol, polyvinyl acetate, partially saponified polyvinyl acetate, silanol-modified polyvinyl alcohol, polyurethane, starch, corn dextrin, carboxymethyl cellulose, cellulose ethers, hydroxyethyl cellulose, hydroxypropyl cellulose, ethyl hydroxyethyl cellulose, methyl cellulose, alginates, sodium alginate, xanthan, carrageenan, casein, soy protein, guar gums, synthetic polymers, styrene butadiene latex, and/or styrene acrylate latex. A composition for preparing a film or coating in some aspects can comprise about 65, 70, 75, 80, 85, 65-85, 65-80, 70-85, or 70-80 wt % of a binder such as polyvinyl alcohol, and about 35, 30, 25, 20, 15, 15-35, 20-35, 15-30, or 20-30 wt % a graft copolymer derivative material as presently disclosed. In some aspects, a film or coating does not comprise starch, while in other aspects such as an oxygen barrier, starch can be included (e.g., as disclosed in U.S. Patent Appl. Publ. No. 2011/0135912 or U.S. Pat. No. 5,621,026 or 6,692,801, which are incorporated herein by reference). Grease/oil barrier properties of a coating composition herein can be evaluated using a standard "KIT" type test following Technical Association of the Pulp and Paper Industry (TAPPI) Test Method T-559 cm-02 (*Grease resistance test for paper and paperboard*, TAPPI Press, Atlanta, GA, USA; incorporated herein by reference), for example. Good grease/oil barrier/resistance function is indicated in this test by values closer to 12 on a scale of 1 to 12. Oxygen barrier properties of a coating composition herein can be evaluated by measuring the oxygen transmission rate (OTR) of the coating; OTR can be determined, for example, according to ASTM F-1927-07 (2007, *Standard Test Method for Determination of Oxygen Gas Transmission Rate, Permeability and Permeance at Controlled Relative Humidity Through Barrier Materials Using a Coulometric Detector*, ASTM International, West Conshohocken, PA), which is incorporated herein by reference. OTR can be determined under relative humidity conditions of about 50%-80%, for example. Examples of substrates herein that can take advantage of a grease/oil and/or oxygen barrier coating include any of the forgoing substrates/surfaces, including a substrate comprising cellulose (e.g., paper, paperboard, cardboard, corrugated board, textile), polyethylene, polypropylene, poly lactic acid, poly(ethylene terephthalate) (e.g., MYLAR), poly(trimethylene terephthalate), polyamide, or poly(trimethylene furandicarboxylate). Grease/oil and/or oxygen barrier activity of a coated material herein can be increased by about, or at least about 5%, 10%, 15%, or 20%, for example, compared to the grease/oil and/or oxygen barrier activity of the material that (i) is uncoated or (ii) contains a coating that differs from the foregoing coating by lacking a graft copolymer derivative material component.

A film or coating in some aspects can be in the form of an edible film or coating. Such a material can, in some aspects, comprise graft copolymer derivative material herein and one or more components as described in U.S. Pat. Nos. 4,710,228, 4,543,370, 4,820,533, 4,981,707, 5,470,581, 5,997,918, 8,206,765, or 8999413, or U.S. Patent Appl. Publ. No. 2005/0214414, which are incorporated herein by reference. In some aspects, a graft copolymer derivative material replaces starch and/or starch derivatives in an edible film or coating, optionally as disclosed in any of the foregoing references. An edible film or coating can be on potato products (e.g., potato strips such as French fries), other vegetable products (e.g., zucchini, sweet potatoes, onions, okra, peppers, string beans), and mushrooms, for example. These and other food products having an edible film or coating herein can be fried or baked in some aspects, and/or the film or coating provides tenderness, moisture retention, crispness, and/or dietary fiber (in place of digestible starch).

A coating composition in some aspects, which can be used to prepare a coating herein, can comprise any of the foregoing components/ingredients/formulations. In some aspects, a coating composition is a latex composition, such as described below.

A composition comprising a graft copolymer derivative material herein can be a latex composition. Examples of latex compositions herein include paint (e.g., primer, finishing/decorative), adhesives, films, coatings, and binders. Formulations and/or components (in addition to a graft copolymer derivative material herein) of a latex composition herein can be as described in, for example, U.S. Pat. Nos. 6,881,782, 3,440,199, 3,294,709, 5,312,863, 4,069,186, or 6297296, or U.S. Patent Appl. Publ. No. 2020/0263026, or Int. Patent Appl. Publ. No. WO2019046123, which are all incorporated herein by reference.

A graft copolymer derivative material as presently disclosed can be present in a latex composition in any useful amount, such as at about, or at least about, 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 40%, 45%, 50%, 55%, 60%, 65%, 70%, 75%, 0.01%-75% 0.01%-5%, 5%-20%, 20%-50%, or 50%-75% based on the weight of all the dispersed polymer solids of the latex.

A latex composition in some aspects can comprise a polymer polymerized from at least one ethylenically unsaturated monomer (e.g., monoethylenically unsaturated monomer); polyurethane; epoxy, and/or a rubber elastomer. Examples of monoethylenically unsaturated monomers herein include vinyl monomers, acrylic monomers, allylic monomers, acrylamide monomers, monocarboxylic unsaturated acids and dicarboxylic unsaturated acids.

Examples of suitable vinyl monomers of a polymer in a latex composition herein include any compounds having vinyl functionality (i.e., ethylenic unsaturation) such as vinyl esters (e.g., vinyl acetate, vinyl propionate, vinyl laurate, vinyl pivalate, vinyl nonanoate, vinyl decanoate, vinyl neodecanoate, vinyl butyrates, vinyl benzoates, vinyl isopropyl acetates), vinyl aromatic hydrocarbons (e.g., styrene, methyl styrenes and similar lower alkyl styrenes, chlorostyrene, vinyl toluene, vinyl naphthalene, divinyl benzene), vinyl aliphatic hydrocarbons (e.g., vinyl chloride; vinylidene chloride; alpha olefins such as ethylene, propylene and isobutylene; conjugated dienes such as 1,3-butadiene, methyl-2-butadiene, 1,3-piperylene, 2,3-dimethyl butadiene, isoprene, cyclohexene, cyclopentadiene, and dicyclopentadiene) and vinyl alkyl ethers (e.g., methyl vinyl ether, isopropyl vinyl ether, n-butyl vinyl ether, isobutyl vinyl ether), but excluding compounds having acrylic functionality (e.g., acrylic acid, methacrylic acid, esters of such acids, acrylonitrile, acrylamides). In some aspects, a latex composition herein comprises a vinyl acetate-ethylene copolymer, carboxylated vinyl acetate-ethylene copolymer, and/or or polyvinyl acetate.

Examples of suitable acrylic monomers of a polymer in a latex composition herein include alkyl acrylates, alkyl methacrylates, acrylate acids, methacrylate acids, aromatic derivatives of acrylic and methacrylic acid, acrylamides, and acrylonitrile. Typically, alkyl acrylate and methacrylic monomers (also referred to as alkyl esters of acrylic or methacrylic acid) have an alkyl ester portion containing from 1 to about 18 carbon atoms per molecule, or from 1 to about 8 carbon atoms per molecule. Suitable acrylic monomers include, for example, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecyl acrylate and methacrylate, benzyl acrylate and methacrylate, isobornyl acrylate and methacrylate, neopentyl acrylate and methacrylate, and 1-adamantyl methacrylate. If acid functionality is desired, acids such as acrylic acid or methacrylic acid can also be used.

A latex composition in some aspects comprises a polyurethane polymer. Examples of suitable polyurethane polymers are those comprising polysaccharides as disclosed in U.S. Patent Appl. Publ. No. 2019/0225737 or Int. Patent Appl. Publ. No. WO2018/017789, which is incorporated herein by reference. A latex comprising a polyurethane can be prepared, for example, as disclosed in U.S. Patent Appl. Publ. No. 2016/0347978, which is incorporated herein by reference, and/or comprise the reaction product of one or more polyisocyanates with one or more polyols. Useful polyols include polycarbonate polyols, polyester polyols and polyether polyols, for example. Polycarbonate polyurethane herein can be formed as the reaction product of a polyol such as 1,3-propanediol, 1,4-butanediol, 1,6-hexanediol, diethylene glycol, or tetraethylene glycol, with a diaryl carbonate such as diphenyl carbonate or phosgene. At least one polyisocyanate herein can be an aliphatic polyisocyanate, aromatic polyisocyanate, or polyisocyanate that has both aromatic and aliphatic groups. Examples of polyisocyanates include 1,6-hexamethylene diisocyanate, isophorone diisocyanate, 2,4-toluene diisocyanate, 2,6-toluene diisocyanate, mixtures of 2,4- and 2,6-toluene diisocyanate, bis(4-isocyanatocyclohexyl) methane, 1,3-bis(1-isocyanato-1-methylethyl)benzene, bis(4-isocyanatophenyl) methane, 2,4'-diphenylmethane diisocyanate, 2,2'-diphenylmethane diisocyanate, 2,4-diisocyanatotoluene, bis(3-isocyanatophenyl)methane, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, hexahydrotoluene diisocyanate, 1,5-naphthalene diisocyanate, 1-methoxy-2,4-phenylene diisocyanate, 4,4'-biphenylmethane diisocyanate, 4,4'-biphenylene diisocyanate, 3,3'-dimethyl-4,4'-diphenylmethane, diisocyanate, 3,3'-4,4'-diphenylmethane diisocyanate, and 3,3'-dimethyldiphenylmethane-4,4'-diisocyanate. Also useful herein are polyisocyanate homopolymers comprising allophanate, biuret, isocyanurate, iminooxadiazinedione, or carbodiimide groups, for example. A polyol herein can be any polyol comprising two or more hydroxyl groups, for example, a C2 to C12 alkane diol, ethylene glycol, 1,2-propylene glycol, 1,3-propylene glycol, isomers of butane diol, pentane diol, hexane diol, heptane diol, octane diol, nonane diol, decane diol, undecane diol, dodecane diol, 2-methyl-1,3-propane diol, 2,2-dimethyl-1,3-propane diol (neopentyl glycol), 1,4-bis(hydroxymethyl)cyclohexane, 1,2,3-propane triol (glycerol), 2-hydroxymethyl-2-methyl-1,3-propanol (trimethylolethane), 2-ethyl-2-hydroxymethyl-1,3-propanediol (trimethylolpropane), 2,2-bis(hydroxymethyl)-1,3-propane diol (pentaerythritol); 1,4,6-octanetriol; chloropentanediol; glycerol monoalkyl ether; glycerol monoethyl ether; diethylene glycol; 1,3,6-hexanetriol; 2-methylpropanediol; 2,2,4-trimethyl-1,3-pentanediol, cyclohexanedimethanol, polymeric polyols, for example, polyether polyols or polyester polyols. In some aspects, a polyol herein can be poly(oxytetramethylene) glycol, polyethylene glycol, or poly 1,3-propane diol. A polyol in some aspects can be polyester polyol, such as one produced by transesterification of aliphatic diacids with aliphatic diols. Suitable aliphatic diacids include, for example, C3 to C10 diacids, malonic acid, succinic acid, glutaric acid, adipic acid, pimelic acid, suberic acid, azelic acid, sebacic acid. In some aspects, aromatic and/or unsaturated diacids can be used to form a polyester polyol.

A latex composition in some aspects comprises an epoxy polymer/resin (polyepoxide), such as bisphenol A epoxy resin, bisphenol F epoxy resin, Novolac epoxy resin, aliphatic epoxy resin, or glycidylamine epoxy resin.

A latex composition in some aspects comprises a rubber elastomer. In some aspects, a rubber elastomer can include one or more diene-based sulfur-vulcanizable elastomers having a glass transition temperature (Tg) below −30° C., as determined, for example, by dynamic mechanical analysis. In further examples, a rubber elastomer herein includes natural rubber, synthetic polyisoprene, polybutadiene rubber, styrene/butadiene copolymer rubber, ethylene propylene diene monomer rubber, hydrogenated nitrile butadiene rubber, neoprene, styrene/isoprene/butadiene terpolymer rubber, butadiene/acrylonitrile rubber, polyisoprene rubber, isoprene/butadiene copolymer rubber, nitrile rubber, ethylene-acrylic rubber, butyl and halobutyl rubber, chlorosulfonated polyethylene, fluoroelastomer, hydrocarbon rubber, polybutadiene, and silicone rubber.

A latex composition in some aspects comprises an insoluble graft copolymer derivative material dispersed in a dispersion (other polymers such as above can optionally be dispersed along with the graft copolymer derivative material) or emulsion, where the liquid component of the latex can be water or an aqueous solution. An aqueous solution of a latex in some aspects can comprise an organic solvent that is either miscible or immiscible with water. Suitable organic solvents herein include acetone, methyl ethyl ketone, butyl acetate, tetrahydrofuran, methanol, ethanol, isopropanol, diethyl ether, glycerol ethers, hexane, toluene, dimethyl acetamide, dimethylformamide, and dimethyl sulfoxide.

A latex composition herein can further comprise one or more additives in some aspects. Examples of additives herein include dispersants, rheological aids, antifoams, foaming agents, adhesion promoters, flame retardants, bactericides, fungicides, preservatives, optical brighteners, fillers, anti-settling agents, coalescing agents, humectants, buffers, pigments/colorants (e.g., metallic oxides, synthetic organic pigments, carbon black), viscosity modifiers, antifreeze, surfactants, binders, crosslinking agents, anticorrosion agents, hardeners, pH regulators, salts, thickeners, plasticizers, stabilizers, extenders, and matting agents. Examples of pigments herein include titanium dioxide ($TiO_2$), calcium carbonate, diatomaceous earth, mica, hydrated aluminum oxide, barium sulfate, calcium silicate, clay, silica, talc, zinc oxide, aluminum silicate, nepheline syenite, and mixtures thereof. In some aspects, a latex composition is essentially free from (e.g., less than 1, 0.5, 0.1, or 0.01 wt % of component) starch, starch derivative (e.g., hydroxyalkyl starch), cellulose, and/or cellulose derivative (e.g., carboxymethyl cellulose).

A latex composition in the form of a paint or other coloring agent herein can have a pigment volume concentration (PVC) of about 3% to about 80% in some aspects. As examples, a flat paint can have a PVC in the range of about 55-80%, a primer or undercoat can have a PVC in the range of about 30-50%, and/or a gloss colored paint can have a PVC in the range of about 3-20%. A paint or other coloring agent in some aspects can have a PVC of about 55%, 60%, 65%, 70%, 75%, 80%, 55-80%, 55-75%, 55-70%, 60-80%, 60-75%, 60-70%, 63-67%, 64-66%, 65-80%, 65-75%, or 65-70%. A PVC value herein can be that of a particular pigment (or mix of pigments) such as those disclosed above (e.g., titanium dioxide), for instance. A graft copolymer derivative material herein is believed to provide one or more other physical properties to a latex composition (e.g., for use as a paint or other coloring agent): increased hardness, reduced tackiness, decreased gloss (i.e., providing a matte effect), increased shear strength, better abrasion resistance, improved dry time, improved fade resistance, lower blistering, improved hand (a less tacky feel), increased opacity, and/or pigment extension, for example, as compared to a latex composition that only differs by not comprising the graft copolymer derivative material.

A latex composition herein can be applied to the substrate of an article (above) using any method known in the art. Typically, after application of the latex composition, at least a portion of the aqueous solution is removed, for example by drying, to provide an adhesive, film, coating, or binder comprising the latex composition in a dry or semi-dry form. Suitable application methods include air knife coating, rod coating, bar coating, wire bar coating, spray coating, brush coating, cast coating, flexible blade coating, gravure coating, jet applicator coating, short dwell coating, slide hopper coating, curtain coating, flexographic coating, size-press coating, reverse roll coating, and transfer roll coating. A latex composition can be applied on at least a portion of a substrate, and can be in one or more coats/applications, for example.

In some aspects, a composition comprising a graft copolymer derivative material can be in the form of a composite (e.g., rubber composite or polyurethane composite) such as disclosed in U.S. Patent Appl. Publ. Nos. 2020/0181370 or 2019/0225737, or Int. Patent Appl. Publ. Nos. WO2018/081263 or WO2018/017789. One or more of the above components of a latex composition can optionally be in such a composite.

A composition comprising a graft copolymer derivative material herein can be a paper/packaging composition or cellulose fiber-containing composition. Examples of such compositions can be any type of paper/packaging or cellulose fiber-containing composition disclosed herein, such as paper (e.g., writing paper, office paper, copying paper, crafting paper), cardboard, paperboard, corrugated board, tissue paper, napkin/paper towel, wipe, or a non-woven fabric. Formulations and/or components (in addition to a graft copolymer derivative material herein) of a paper/packaging composition or cellulose fiber-containing composition herein, and well as forms of these compositions, can be as described in, for example, U.S. Patent Appl. Publ. Nos. 2018/0119357, 2019/0330802, 2020/0062929, 2020/0308371, or 2020/0370216, or Int. Patent Appl. Publ. Nos. WO2018/098065 or WO2019/055397, which are all incorporated herein by reference. In some aspects, a graft copolymer derivative material functions as a strengthening aid in paper or other cellulose fiber-containing composition. The ability of a graft copolymer derivative material to flocculate fiber and/or other insoluble material in a papermaking process (e.g., pulp flocculation) is a means in which graft copolymer derivative material herein can be incorporated into paper or other product that involves flocculation in its production. In some aspects, though, a graft copolymer derivative material can be added as a component in any of the forgoing compositions in a manner independent from its possible addition as a flocculation aid.

Alternatively, any composition/product herein can comprise a non-derivatized/non-crosslinked dextran-alpha-glucan graft copolymer (i.e., precursor of a graft copolymer derivative) as presently disclosed, instead of, or in addition to, a graft copolymer derivative material. Also, any composition/product herein can comprise an alpha-glucan homopolymer as presently disclosed or derivative thereof, instead of, or in addition to, a graft copolymer derivative material. Thus, for example, insofar as would be considered suitable by a skilled artisan, the terms "dextran-alpha-glucan graft copolymer derivative", "graft copolymer derivative material" and the like as used in the present disclosure can optionally be replaced with the term "non-derivatized/non-crosslinked dextran-alpha-glucan graft copolymer", "alpha-glucan homopolymer", or "alpha-glucan homopolymer derivative". An alpha-glucan homopolymer in some aspects can have a high molecular weight as reflected by high intrinsic viscosity (IV); e.g., IV can be about, or at least about, 6, 7, 8, 9, 10, 11, 12, 13, 14, 15, 16, 17, 18, 19, 20, 21, 22, 6-8, 6-7, 6-22, 6-20, 6-17, 6-15, 6-12, 10-22, 10-20, 10-17, 10-15, 10-12, 12-22, 12-20, 12-17, or 12-15 dL/g. For comparison purposes, note that the IV of alpha-glucan with at least 90% (e.g., about 99% or 100%) alpha-1,3 linkages and a DPw of about 800 has an IV of about 2-2.5 dL/g. IV herein can be as measured with alpha-glucan polymer dissolved in DMSO with about 0.9 to 2.5 wt % (e.g., 1, 2, 1-2 wt %) LiCl, for example.

Non-limiting examples of compositions and methods disclosed herein include:

1. A composition comprising at least one graft copolymer ether or ester compound having a degree of substitution (DoS) up to about 3.0, wherein the graft copolymer comprises: (i) a backbone comprising dextran, and (ii) alpha-glucan side chains comprising at least about 30% alpha-1,3 glycosidic linkages.
2. The composition of embodiment 1, wherein the graft copolymer comprises about 20 wt % to about 80 wt % of the backbone, and about 20 wt % to about 80 wt % of the alpha-glucan side chains.
3. The composition of embodiment 1 or 2, wherein the alpha-glucan side chains comprise at least about 90% alpha-1,3 glycosidic linkages.
4. The composition of embodiment 1, 2, or 3, wherein the weight-average degree of polymerization (DPw) of the alpha-glucan side chains is at least about 15.
5. The composition of embodiment 1, 2, 3, or 4, wherein the dextran comprises at least about 90% alpha-1,6 glycosidic linkages.
6. The composition of embodiment 1, 2, 3, 4, or 5, wherein the weight-average molecular weight (Mw) of the dextran is at least about 5000 Daltons.
7. The composition of embodiment 1, 2, 3, 4, 5, or 6, wherein the Mw of the dextran is at least about 10 million Daltons.
8. The composition of embodiment 1, 2, 3, 4, 5, 6, or 7, wherein the graft copolymer ether or ester compound is aqueous-soluble.
9. The composition of embodiment 1, 2, 3, 4, 5, 6, 7, or 8, wherein the DoS of the graft copolymer ether or ester compound is about 0.05 to about 0.9.
10. The composition of embodiment 1, 2, 3, 4, 5, 6, 7, 8, or 9, wherein the DoS of the graft copolymer ether or ester compound is greater than 0.3.

11. The composition of embodiment 1, 2, 3, 4, 5, 6, 7, 8, 9, or 10, comprising at least one graft copolymer ether compound.
12. The composition of embodiment 11, wherein the graft copolymer ether compound is an anionic ether compound.
13. The composition of embodiment 12, wherein the anionic ether compound comprises carboxymethyl groups.
14. The composition of embodiment 11, wherein the graft copolymer ether compound is a cationic ether compound.
15. The composition of embodiment 14, wherein the cationic ether compound comprises quaternary ammonium groups.
16. The composition of embodiment 11, 12, 13, 14, or 15, wherein: (i) the graft copolymer ether compound comprises anionic ether groups and cationic ether groups, or (ii) the composition comprises at least one anionic graft copolymer ether compound and at least one cationic graft copolymer ether compound.
17. The composition of embodiment 1, 2, 3, 4, 5, 6, 7, 8, 9, 10, 11, 12, 13, 14, 15, or 16, wherein the graft copolymer ether or ester compound is crosslinked.
18. The composition of embodiment 1, 2, 3, 4, 5, 6, 7, 8, 9, 10, 11, 12, 13, 14, 15, 16, or 17, wherein the composition is a household care product, personal care product, industrial product, pharmaceutical product, or ingestible product (e.g., food product).
19. The composition of embodiment 1, 2, 3, 4, 5, 6, 7, 8, 9, 10, 11, 12, 13, 14, 15, 16, 17, or 18, wherein the composition is a: (a) flocculation agent, (b) absorbent, (c) viscosity modifier, (d) paper, (e) emulsion, (f) builder agent, or (g) sanitizing agent such as a skin sanitizer.
20. A method of producing a graft copolymer ether or ester compound, the method comprising: (a) contacting a graft copolymer in a reaction with at least one etherification agent or esterification agent comprising an organic group, wherein at least one organic group is etherified or esterified to the graft copolymer thereby producing a graft copolymer ether or ester compound (e.g., according to embodiment 1, 2, 3, 4, 5, 6, 7, 8, 9, 10, 11, 12, 13, 14, 15, 16, or 17), wherein the graft copolymer ether or ester compound has a degree of substitution (DoS) up to about 3.0, wherein the graft copolymer comprises: (i) a backbone comprising dextran, and (ii) alpha-glucan side chains comprising at least about 30% alpha-1,3 glycosidic linkages; and (b) optionally, isolating the graft copolymer ether or ester compound produced in step (a).
21. A flocculation method comprising: (a) mixing a graft copolymer ether or ester compound according to embodiment 1, 2, 3, 4, 5, 6, 7, 8, 9, 10, 11, 12, 13, 14, 15, 16, or 17 into an aqueous composition that comprises suspended solids/particles, whereby at least a portion of the suspended solids/particles becomes flocculated; and (b) optionally, separating the flocculated solids/particles of (a) from the aqueous composition.
22. An absorption method comprising: contacting a graft copolymer ether or ester compound according to embodiment 1, 2, 3, 4, 5, 6, 7, 8, 9, 10, 11, 12, 13, 14, 15, 16, or 17 with an aqueous liquid-comprising composition, wherein the compound absorbs aqueous liquid from the liquid-comprising composition.
23. A composition of embodiment 1, 2, 3, 4, 5, 6, 7, 8, 9, 10, 11, 12, 13, 14, 15, 16, 17, 18, or 19, or a method of embodiment 20, 21, or 22, but wherein the graft copolymer ether or ester compound is replaced with, or supplemented with, (i) a graft copolymer precursor herein (i.e., non-derivatized/non-crosslinked graft copolymer), (ii) an alpha-glucan homopolymer herein (e.g., very high molecular weight alpha-glucan homopolymer), or (iii) a derivative (e.g., ether or ester herein) of the alpha-glucan homopolymer.
24. A composition of embodiment 1, 2, 3, 4, 5, 6, 7, 8, 9, 10, 11, 12, 13, 14, 15, 16, 17, 18, or 19, or a method of embodiment 20, 21, or 22, but wherein the graft copolymer ether or ester compound is replaced with, or supplemented with, another graft copolymer derivative herein (e.g., carbamate, sulfonyl, sulfonate).

EXAMPLES

The present disclosure is further exemplified in the following Examples. It should be understood that these Examples, while indicating certain aspects herein, are given by way of illustration only. From the above discussion and these Examples, one skilled in the art can ascertain the essential characteristics of the disclosed embodiments, and without departing from the spirit and scope thereof, can make various changes and modifications to adapt the disclosed embodiments to various uses and conditions.

Materials and Methods

Dextran-alpha-1,3-glucan graft copolymers were prepared generally following procedures as disclosed in Int. Patent. Appl. Publ. No. WO2017/079595, which is incorporated herein by reference. In general, graft copolymers were prepared by first synthesizing dextran in reactions comprising water, sucrose and a glucosyltransferase enzyme (GTF 0768, disclosed as SEQ ID NOs: 1 and 2 in U.S. Pat. No. 10,059,779, which is incorporated herein by reference). Using the dextran as a primer/acceptor, alpha-1,3-glucan was then synthesized in a manner similar to what is described in Int. Patent. Appl. Publ. No. WO2017/079595 (above) and U.S. Patent Appl. Publ. No. 2019/0078063, which is incorporated herein by reference; thus, alpha-1,3-glucan side chains were synthesized off of a dextran backbone to form a dextran-alpha-1,3-glucan graft copolymer. In general, alpha-1,3-glucan side chain synthesis was performed in a reaction comprising water, sucrose (56 wt % solution, fed into reaction), buffer, dextran primer (e.g., as above) and an amino acid-modified, high product-yielding *S. salivarius*-based glucosyltransferase enzyme that synthesizes alpha-1,3-glucan with all or nearly all alpha-1,3 linkages. Graft copolymer products typically were washed by water displacement to remove most or all solutes (e.g., buffer, sugars, soluble oligomers) remaining after enzymatic synthesis, and then filtered to provide a wet cake; the polymer was not dried ("never-dried") prior to entering it into a chemical derivatization process herein. Various graft copolymer products were made, such as a product comprising about 50 wt % of dextran backbone component and 50 wt % alpha-1,3-glucan side chains component; other graft copolymer products respectively comprised about 51, 43, or 33 wt % of dextran backbone component and 49, 57, or 67 wt % alpha-1,3-glucan side chains component. The foregoing procedure and graft copolymer product thereof merely represent examples of those that can be used in the present disclosure to provide dextran-alpha-1,3-glucan graft copolymers for chemical derivatization.

Water retention measurements were performed by loading 0.2 g of dry polymer (derivatized or non-derivatized dextran-alpha-1,3-glucan graft copolymer) into a 55×70-mm tea bag. The tea bag was sealed and then soaked in an aqueous saline solution (0.9 wt % NaCl in water) for 30 minutes. The tea bag was then hung for 10 minutes after which it was weighed to determine the free swelling capacity (FSC) value of the polymer (described below). The tea bag was then put into a centrifuge tube having a porous bottom and spun in a centrifuge for 5 minutes at a moderate speed (e.g., 1500-2000 rpm). It was then weighed to determine a centrifugal retention capacity (CRC) value (described below). Finally, the tea bag was dried overnight under vacuum at 65° C., and then weighed to determine % Loss (described below).

Free Swelling Capacity (FSC): Weight of water/fluid absorbed by polymer, divided by the dry weight (as measured pre-test) of the polymer. This is a static measurement in which no forces beyond gravity are allowed to remove water from wetted polymer.

Centrifugal Retention Capacity (CRC): Weight of water/fluid absorbed and retained by polymer after having centrifuged wetted polymer (e.g., at about 1500-2000 rpm for about 5 minutes), divided by the dry weight (as measured pre-test) of the polymer. Water/fluid and aqueous-soluble polymer escape the tea bag during centrifugation.

% Loss: The wt % percentage of polymer that is lost from the tea bag during the above wetting processes/measurements. % Loss is typically due to loss of aqueous-soluble polymer.

Example 1

Producing a Cationic Ether Derivative of Dextran-Alpha-1,3-Glucan Graft Copolymer with a DoS <0.5

This Example describes preparing cationic ether-derivatized dextran-alpha-1,3-glucan graft copolymers in which the DoS (degree of substitution) with cationic ether groups was less than 0.5. This derivative exhibited enhanced aqueous liquid absorption capacity, for example.

Dextran-alpha-1,3-glucan graft copolymer was enzymatically synthesized according to the above Materials and Methods section, and provided in the form of a never-dried wet cake with 12.9 wt % solids (~87.1 wt % water). Unless otherwise noted, the graft copolymer used for derivatization in this and the below Examples contained about 50 wt % of dextran backbone component and 50 wt % alpha-1,3-glucan side chains component.

To an agitated and jacketed 1-liter resin kettle were added 124 g of isopropanol and 179 grams of the dextran-alpha-1,3-glucan graft copolymer wet cake; a slurry was formed. After heating the slurry to 48° C., 10.2 g of 50 wt % sodium hydroxide was added. After 9 minutes and with the preparation contents at 46° C., 34 mL of 2,3-epoxypropyl trimethyl ammonium chloride (EPTAC) was charged into the kettle at a rate of 15 mL/min to provide an etherification reaction. The reaction was held at 50° C. for 70 minutes, after which reaction contents (329 g) were removed and adjusted to a pH of 6.5 by the addition of 41 mL of 10% HCl. The pH-adjusted material was filtered to form a wet cake, which was then slurried into a 45/45/10 (v/v/v) isopropanol/methanol/water solution. This slurrying and filtration process was repeated two more times, resulting in a clear filtrate and slightly yellow polymer product. The polymer product was dried overnight under vacuum at 65° C. Overall, there was mass balance loss of 6.4% during the reaction.

NMR analysis of the final powder product indicated an amine end group content of 0.19 out of a possible 3.0. Thus, the above etherification reaction successfully produced a cationic ether derivative, trimethylammonium hydroxypropyl dextran-alpha-1,3-glucan graft copolymer, with a DoS of 0.19. The dry powder product was shown to have a reduced viscosity value of 3.07 dL/g as measured in DMSO/LiCl; the ether product was aqueous-insoluble (e.g., 0.5 wt % of this product in water forms a gel).

Aqueous liquid absorption analyses were performed with the cationic ether graft copolymer product according to the above Materials and Methods section. It was found that the dry powder product had a free swelling capacity (FSC) value of 14.6 g/g, a centrifugal retention capacity (CRC) value of 6.5 g/g, and a % Loss of 18.5. It is noteworthy that the absorbency of the cationic ether product was significantly higher than that of non-derivatized dextran-alpha-1,3-glucan graft copolymer counterparts (produced following above Materials and Methods section). In particular, non-derivatized dextran-alpha-1,3-glucan graft copolymer with about 50 wt % of dextran backbone component and 50 wt % alpha-1,3-glucan side chains component, which is the parent graft copolymer of the derivative made in this Example, had FSC and CRC values of 8.3 g/g and 4.0 g/g, respectively (and % Loss of 9.3%). It is further noted that non-derivatized dextran-alpha-1,3-glucan graft copolymers with about 51, 43, or 33 wt % of the dextran backbone component had FSC values of about 7.0, 6.5 and 5.3 g/g, respectively.

Example 2

Producing a Cationic Ether Derivative of Dextran-Alpha-1,3-Glucan Graft Copolymer with a DoS >0.5

This Example describes preparing cationic ether-derivatized dextran-alpha-1,3-glucan graft copolymers in which the DoS with cationic ether groups was greater than 0.5. This derivative exhibited enhanced aqueous liquid absorption capacity, for example.

Dextran-alpha-1,3-glucan graft copolymer used in this Example was the same as in Example 1, but was provided in the form of a never-dried wet cake with 20.7 wt % solids (~79.3 wt % water).

To an agitated and jacketed 1-liter resin kettle were added 126 g of isopropanol and 112 grams of the dextran-alpha-1,3-glucan graft copolymer wet cake; a slurry was formed. After heating the slurry to 52° C., 12.1 g of 50 wt % sodium hydroxide was added over 1 minute. After 17 minutes, and with the preparation contents at 50° C., 108 mL of EPTAC was charged into the kettle at a rate of 3 mL/min to provide an etherification reaction. The reaction was held at 50° C. for 106 minutes, after which reaction contents (351 g) were removed and filtered under vacuum. The resulting filter cake was slurried into 1 L a 45/45/10 (v/v/v) isopropanol/methanol/water solution, and then adjusted to pH 7 by adding 38 mL of 10% HCl. The pH-adjusted material was then filtered and slurried into the same solution. Two filtration and slurrying steps were then taken using a 50/50 (v/v) isopropanol/methanol solution. A final filtration resulted in a wet cake that could form a granular powder. This material was dried overnight under vacuum at 65° C. Overall, there was mass balance loss of 5.6% during the reaction.

NMR analysis of the final powder product indicated an amine end group content of 0.78 out of a possible 3.0. Thus, the above etherification reaction successfully produced a cationic ether derivative, trimethylammonium hydroxypropyl dextran-alpha-1,3-glucan graft copolymer, with a DoS of 0.78. The dry powder product was shown to have a reduced viscosity value of 245 dL/g as measured in water; the ether product was aqueous-soluble.

Aqueous liquid absorption analyses were performed with the cationic ether graft copolymer product according to the above Materials and Methods section. It was found that the dry powder product had an FSC value of 49.33 g/g, a CRC value of 2.2 g/g, and a % Loss of 58.2. Similar to Example 1, it is noteworthy that the FSC of the cationic ether product was significantly higher than FSC values of non-derivatized dextran-alpha-1,3-glucan graft copolymer. It is noted that the % Loss is higher for the cationic ether graft copolymer product in this Example compared to that of Example 1, and is probably related to its higher DoS rendering it as aqueous-soluble.

Example 3

Producing a Cationic Ether Derivative of Dextran-Alpha-1,3-Glucan Graft Copolymer with a DoS >0.5 (22-L Scale)

This Example describes using a large volume (22-L) etherification reaction to prepare cationic ether-derivatized dextran-alpha-1,3-glucan graft copolymers. The DoS of the derivatized product with cationic ether groups was greater than 0.5. This derivative exhibited enhanced aqueous liquid absorption capacity.

Dextran-alpha-1,3-glucan graft copolymer used in this Example was the same as in Example 1, but was provided in the form of a never-dried wet cake with 21.4 wt % solids (~78.6 wt % water).

To an agitated and jacketed 22-liter round bottom reactor were added 5221 g of isopropanol and 4500 grams of the dextran-alpha-1,3-glucan graft copolymer wet cake; a slurry was formed. After heating the slurry to 43° C., 434 g of 50 wt % sodium hydroxide was added over 5 minutes. After 11 minutes, and with the preparation contents at 48° C., 2271 mL of EPTAC was charged into the reactor at a rate of 50 mL/min to provide an etherification reaction. The reaction was held at 51-54° C. for 120 minutes, after which reaction contents (12607 g) were removed and adjusted to a pH of 7.0 by the addition of 10% HCl. The pH-adjusted material was slurried in, and filtered from, methanol several times until the resulting filtrate was clear. The filtered material was dried overnight under vacuum at 65° C. Overall, there was mass balance loss of 0.9% during the reaction.

NMR analysis of the final powder product indicated an amine end group content of 0.58 out of a possible 3.0. Thus, the above etherification reaction successfully produced a cationic ether derivative, trimethylammonium hydroxypropyl dextran-alpha-1,3-glucan graft copolymer, with a DoS of 0.58. The dry powder product was shown to have a reduced viscosity value of 123.4 dL/g as measured in water; the ether product was aqueous-soluble.

Aqueous liquid absorption analyses were performed with the cationic ether graft copolymer product according to the above Materials and Methods section. It was found that the dry powder product had an FSC value of 48.7 g/g, a CRC value of 3.9 g/g, and a % Loss of 53.2. Similar to Examples 1 and 2, it is noteworthy that the FSC of the cationic ether product was significantly higher than FSC values of non-derivatized dextran-alpha-1,3-glucan graft copolymer. It is noted that the % Loss is higher for the cationic ether graft copolymer product in this Example compared to that of Example 1, and is probably related to its higher DoS rendering as aqueous-soluble.

Example 4

Producing a Crosslinked Cationic Ether Derivative of Dextran-Alpha-1,3-Glucan Graft Copolymer This Example describes preparing cationic ether-derivatized dextran-alpha-1,3-glucan graft copolymers that are crosslinked. This crosslinked derivative exhibited enhanced aqueous liquid absorption capacity, for example.

Dextran-alpha-1,3-glucan graft copolymer used in this Example was the same as in Example 1, but was provided in the form of a never-dried wet cake with 21.0 wt % solids (~79.0 wt % water).

To an agitated and jacketed 1-liter resin kettle were added 354 g of isopropanol and 276 grams of the dextran-alpha-1,3-glucan graft copolymer wet cake; a slurry was formed. After heating the slurry to 34.5° C., 30.3 g of 50 wt % sodium hydroxide was added over 1 minute. After 10 minutes, and with the preparation contents at 45° C., 270 mL of EPTAC was charged into the kettle at a rate of 6 mL/min to provide an etherification reaction. During this addition (after having added about 80% of the EPTAC to the reaction), 5 mL of a crosslinking agent, diethylene glycol dimethyl ether (MW 134.2, CAS Registry No. 111-96-6), was added. Upon addition of all the EPTAC, the reaction was held at 50° C. for 101 minutes, after which reaction contents (932 g) were removed and filtered under vacuum. The resulting filter cake was slurried into a mixture of 0.9 L of 50/50 (v/v) isopropanol/methanol and 0.2 L of water, and then adjusted to pH 8.3 by adding 100 mL of 10% HCl. The pH-adjusted material was then filtered, and the wet cake was slurried into 1.4 L of isopropanol and then filtered again. The wet cake was then slurried into a mixture of 800 mL isopropanol and 100 mL methanol, at which time the solids became granular. After filtering the solids, they were dried overnight under vacuum at 65° C. The dried solids were ground to pass through a 20-mesh screen and then slurried in a mixture of 400 mL isopropanol and 100 ml methanol. The solids were then filtered and dried. Overall, there was mass balance loss of 3.4% during the reaction. The product was aqueous-insoluble, for example.

Due to the addition of crosslinking agent (above), the graft copolymer was crosslinked at the same time as its etherification. The crosslinked product was not soluble in solvents used to measure amine content (DoS) by NMR or reduced viscosity.

Aqueous liquid absorption analyses were performed on the crosslinked etherified graft copolymer product according to the above Materials and Methods section. It was found that the dry product (powder) had an FSC value of 23.1 g/g, a CRC value of 12.4 g/g, and a % Loss of 11.5.

Example 5

Producing an Anionic Ether Derivative of Dextran-Alpha-1,3-Glucan Graft Copolymer with a DoS <0.5

This Example describes preparing anionic ether-derivatized dextran-alpha-1,3-glucan graft copolymers in which the DoS with anionic ether groups was less than 0.5. This derivative exhibited enhanced aqueous liquid absorption capacity, for example.

Dextran-alpha-1,3-glucan graft copolymer used in this Example was the same as in Example 1, but was provided in the form of a never-dried wet cake with 21.0 wt % solids (~79.0 wt % water).

To an agitated and jacketed 1-liter resin kettle were added 302 g of isopropanol and 253 grams of the dextran-alpha-1,3-glucan graft copolymer wet cake; a slurry was formed. After heating the slurry to 44° C., 273 g of 50 wt % sodium hydroxide was added. With the preparation contents at 50° C., 129 g of chloroacetic acid dissolved in 250 g of isopropanol was charged into the kettle over 17 minutes to provide an etherification reaction. The reaction was heated to and held at 79° C. for 3 hours, after which reaction contents (1187 g) were removed and filtered. The filtrate had a pH of 9.9. The filter cake was slurried into a mixture of 0.8 L of methanol and 0.2 L of water, and the pH of the slurry was adjusted to 6.75 by adding 233 mL of 10% HCl. The slurry was then filtered, and the filter cake was then slurried in a mixture of 0.8 L of ethanol and 0.2 L of water. The solids were then washed by filtering and slurrying two times in 800 mL of methanol. Wet cake obtained by a final filtration was dried overnight under vacuum at 65° C. Overall, there was mass balance loss of 2.0% during the reaction.

NMR analysis of the final powder product indicated a carboxymethyl end group content of 0.45 out of a possible 3.0. Thus, the above etherification reaction successfully produced an anionic ether derivative, carboxymethyl dextran-alpha-1,3-glucan graft copolymer, with a DoS of 0.45. The dry powder product was shown to have a reduced viscosity value of 88.2 dL/g as measured in water; the ether product was aqueous-soluble.

Aqueous liquid absorption analyses were performed with the anionic ether graft copolymer product according to the above Materials and Methods section. It was found that the dry powder product had an FSC value of 35.2 g/g, a CRC value of 15.8 g/g, and a % Loss of 9.6. It is noteworthy that the FSC of the anionic ether product was significantly higher than FSC values of non-derivatized dextran-alpha-1,3-glucan graft copolymer (refer to Example 1).

Example 6

Producing an Anionic Ether Derivative of Dextran-Alpha-1,3-Glucan Graft Copolymer with a DoS >0.5

This Example describes preparing anionic ether-derivatized dextran-alpha-1,3-glucan graft copolymers in which the DoS with anionic ether groups was greater than 0.5. This derivative exhibited enhanced aqueous liquid absorption capacity, for example.

Dextran-alpha-1,3-glucan graft copolymer used in this Example was the same as in Example 1, but was provided in the form of a never-dried wet cake with 21.0 wt % solids (~79.0 wt % water).

To an agitated and jacketed 1-liter resin kettle were added 252 g of isopropanol and 211 grams of the dextran-alpha-1,3-glucan graft copolymer wet cake; a slurry was formed. After heating the slurry to 74° C., 54 g of 50 wt % sodium hydroxide was added over 14 minutes. Additional isopropanol (50 mL) was added to improve mixing. Chloroacetic acid (58.2 g) dissolved in 148 g of isopropanol was charged into the kettle over 18 minutes. This step was followed by the addition of 30.3 g of 50 wt % sodium hydroxide. The reaction was heated to 78° C. and held for 92 minutes, after which reaction contents (582 g) were removed and filtered. The filtrate had a pH of 6.5. The filter cake was slurried into a mixture of 0.35 L of methanol and 0.15 L of water. The slurry was then filtered, and the filter cake was then slurried in a mixture of 0.35 L of ethanol and 0.15 L of water. The solids were then washed by filtering and slurrying two times in 500 mL of methanol. Wet cake obtained by a final filtration was dried overnight under vacuum at 65° C. Overall, there was mass balance loss of 1.6% during the reaction.

NMR analysis of the final powder product indicated a carboxymethyl end group content of 0.58 out of a possible 3.0. Thus, the above etherification reaction successfully produced an anionic ether derivative, carboxymethyl dextran-alpha-1,3-glucan graft copolymer, with a DoS of 0.58. The dry powder product was shown to have a reduced viscosity value of 158.5 dL/g as measured in water; the ether product was aqueous-soluble.

Aqueous liquid absorption analyses were performed with the anionic ether graft copolymer product according to the above Materials and Methods section. It was found that the dry powder product had an FSC value of 47.1 g/g, a CRC value of 6.4 g/g, and a % Loss of 52.1. It is noteworthy that the FSC of the anionic ether product was significantly higher than FSC values of non-derivatized dextran-alpha-1,3-glucan graft copolymer (refer to Example 1). It is noted that the % Loss is higher for the anionic ether graft copolymer product in this Example compared to that of Example 5, and is probably related to its higher DoS rendering it as aqueous-soluble.

Example 7

Producing an Anionic Ether Derivative of Dextran-Alpha-1,3-Glucan Graft Copolymer with a DoS of ~0.5 (22-L Scale)

This Example describes using a large volume (22-L) etherification reaction to prepare anionic ether-derivatized dextran-alpha-1,3-glucan graft copolymers. The DoS of the derivatized product with cationic ether groups was about 0.5. This derivative exhibited enhanced aqueous liquid absorption capacity.

Dextran-alpha-1,3-glucan graft copolymer used in this Example was the same as in Example 1, but was provided in the form of a never-dried wet cake with 20.7 wt % solids (~79.3 wt % water).

To an agitated and jacketed 22-liter resin kettle were added 5171 g of isopropanol and 4400 grams of the dextran-alpha-1,3-glucan graft copolymer wet cake; a slurry was formed. After heating the slurry to 46° C., 1838 g of 50 wt % sodium hydroxide was added over 5 minutes. After heating the kettle contents to 75° C., 1110 g of chloroacetic acid dissolved in 2144 g of isopropanol was charged into the kettle over 60 minutes to provide an etherification reaction. The reaction was held at 79° C. for 5 hours, after which reaction contents (14381 g) were removed and filtered. The filter cake was slurried into a mixture of 5 L of methanol and 0.5 L of water. The slurry was then filtered, and the filter cake was then slurried in a mixture of 5 L of ethanol and 0.5 L of water. The solids were then washed by filtering and slurrying two times in 3 L of methanol. Wet cake obtained by a final filtration was dried overnight under vacuum at 40° C. The dried solids were ground to pass through a 20-mesh screen and then slurried into 4 L of methanol. The solids were then filtered and dried overnight under vacuum at 40° C. Overall, there was mass balance loss of 1.9% during the reaction.

NMR analysis of the final powder product indicated a carboxymethyl end group content of 0.47 out of a possible 3.0. Thus, the above etherification reaction successfully produced an anionic ether derivative, carboxymethyl dextran-alpha-1,3-glucan graft copolymer, with a DoS of 0.47. The dry powder product was shown to have a reduced viscosity value of 154.5 dL/g as measured in water; the ether product was aqueous-soluble.

Aqueous liquid absorption analyses were performed with the anionic ether graft copolymer product according to the above Materials and Methods section. It was found that the dry powder product had an FSC value of 58.6 g/g, a CRC value of 4.1 g/g, and a % Loss of 55.2. It is noteworthy that the FSC of the anionic ether product was significantly higher than FSC values of non-derivatized dextran-alpha-1,3-glucan graft copolymer (refer to Example 1).

Example 8

Producing a Crosslinked Anionic Ether Derivative of Dextran-Alpha-1,3-Glucan Graft Copolymer This Example describes preparing anionic ether-derivatized dextran-alpha-1,3-glucan graft copolymers that are crosslinked. This crosslinked derivative exhibited enhanced aqueous liquid absorption capacity, for example. Aside from using anionic ether, this Example differs from Example 4 (producing crosslinked cationic ether) in that crosslinking was conducted after preparing the anionic ether; Example 4 disclosed conducting crosslinking and cationic etherification in the same reaction vessel.

The carboxymethyl dextran-alpha-1,3-glucan graft copolymer used in this Example was produced using the same graft copolymer as used in the above Examples, following a procedure similar to Example 7. This derivative had a DoS of 0.46 and a reduced viscosity (as measured in water) of 176.1 dL/g. Its absorbency profile was as follows: FSC value of 62.3 g/g, a CRC of 5.4 g/g, a % Loss of 52.1.

To a 100-mL round bottom flask were added and mixed 20 g of acetone, 4 g of water, and 1.5 g of the above carboxymethyl dextran-alpha-1,3-glucan graft copolymer; the acetone served to suspend the copolymer in a slurry. Then, 0.6 mL of diethylene glycol dimethyl ether (above) was mixed into the slurry. The flask was lowered into a hot oil bath held at 80° C. and, after about a minute, a vacuum was applied to remove the acetone. The flask was then placed into an oven held at 150° C. under vacuum for 1 hour; it is believed that most or all of the crosslinking occurred during this step. The dry contents (crosslinked carboxymethyl dextran-alpha-1,3-glucan graft copolymer) were removed from the flask and made into a powder.

Aqueous liquid absorption analyses were performed on the crosslinked etherified graft copolymer product according to the above Materials and Methods section. It was found that the dry product (powder) had an FSC value of 42.1 g/g, a CRC value of 28.4 g/g, and a % Loss of 9.7; the crosslinked product was aqueous-insoluble (e.g., forms a gel in 0.9 wt % NaCl in water). In addition, crosslinked etherified graft copolymer product that had been dried for 2 hours at 150° C. (instead of 1 hour) had an FSC value of 33.9 g/g, a CRC value of 17.2 g/g, and a % Loss of 4.4.

Table 1 below summarizes the absorbency tests conducted in this and the above Examples.

TABLE 1

Absorbency of Aqueous Liquid (Saline - 0.9 wt % NaCl) by Ether-Derivatized Dextran-Alpha-1,3-Glucan Graft Copolymers

| Material[a] | | | Absorbency Measure | | |
|---|---|---|---|---|---|
| Ether Type | DoS | Example | FSC | CRC | % Loss |
| Cationic | 0.19 | 1 | 14.6 | 6.5 | 18.5 |
| Cationic | 0.78 | 2 | 49.3 | 2.2 | 58.2 |
| Cationic | 0.58 | 3 | 48.7 | 3.9 | 53.2 |
| Cationic, Crosslinked | ND[d] | 4 | 23.1 | 12.4 | 11.5 |
| Anionic | 0.45 | 5 | 35.2 | 15.8 | 9.6 |
| Anionic | 0.58 | 6 | 47.1 | 6.4 | 52.1 |
| Anionic | 0.47 | 7 | 58.6 | 4.1 | 55.2 |
| Anionic | 0.46 | 8[c] | 62.3 | 5.4 | 52.1 |
| Anionic, Crosslinked | 0.46[b] | 8 | 42.1 | 28.4 | 9.7 |
| Not Ether-Derivatized | NA[d] | 1 | 8.3 | 4 | 9.3 |

[a]All listed dextran-alpha-1,3-glucan graft copolymers contain ~50 wt % dextran backbone component and ~50 wt % alpha-1,3-glucan side chains component.
[b]DoS as measured before crosslinking.
[c]Anionic ether prepared following process similar to that disclosed in Example 7.
[d]Abbreviations: ND, not determined. NA, not applicable.

The absorbency profiles of the crosslinked dextran-alpha-1,3-glucan graft copolymer ether derivatives in this Example (crosslinked anionic ether) and Example 4 (crosslinked cationic ether) are notable. For example, the CRC value of crosslinked anionic ether (this Example) was more than 5 times greater than the CRC value (5.4 g/g) of its non-crosslinked parent ether compound, and was also greater than the CRC values of the non-crosslinked anionic graft copolymers produced in Examples 5-7. Similarly, the crosslinked cationic ether produced in Example 4 had a CRC value that was greater than the CRC values of the non-crosslinked cationic graft copolymers produced in Examples 1-3. All these CRC values were as measured with saline (0.9 wt % NaCl). These results contrast with those as disclosed in Example 8 of U.S. Patent Appl. Publ. No. 2019/0359734 (incorporated herein by reference), which shows that crosslinking non-ether-derivatized dextran-alpha-1,3-glucan graft copolymer (produced in manner similar to the present disclosure) mostly resulted in a crosslinked graft copolymer with little increase in CRC value when measured with saline. Despite this low CRC in saline, non-ether-derivatized graft copolymers, when crosslinked, exhibited strikingly higher increases in CRC as measured in DI water. Thus, the provision of ether-derivatized graft copolymers as presently disclosed enables production of crosslinked products having enhanced absorbency activity (CRC) in saline, which is generally more representative of aqueous fluids targeted by absorbent products.

Example 8

Using Ether Derivatives of Dextran-Alpha-1,3-Glucan Graft Copolymer for Flocculation This Example describes using dextran-alpha-1,3-glucan graft copolymer ethers to flocculate sludge from a public sewage system. In particular, soluble cationic graft copolymer ethers were able to flocculate sludge solids and refine sludge water. Thus, graft copolymer ethers herein can serve as dewatering agents in waste water treatment operations and in other processes that employ flocculation. These materials offer the advantage of being more sustainable and biodegradable compared to existing compounds used in flocculation applications.

A dextran-alpha-1,3-glucan graft copolymer with a dextran backbone content of 58 wt % and an alpha-1,3-glucan side chains content of 42 wt % was cationized in a manner similar to Example 1 above to yield an aqueous-insoluble trimethylammonium hydroxypropyl graft copolymer ether with a DoS of 0.19, a reduced viscosity of 3.81 dL/g (as measured in DMSO/LiCl), and an FSC value of 24.7 g/g. This cationic ether is herein referred to as Sample 442. Another graft copolymer with a dextran backbone content of 45 wt % and an alpha-1,3-glucan side chains content of 55 wt % was similarly cationized to yield an aqueous-soluble trimethylammonium hydroxypropyl graft copolymer ether with a DoS of 0.43, a reduced viscosity of 2.65 dL/g (as measured in water), and an FSC value of 44.9 g/g. This cationic ether is herein referred to as Sample 443. Samples 442 and 443 were provided in powder form and tested for waste water sludge flocculation activity. This activity was compared to the activity of an incumbent flocculation agent, BASF Zetag® 8127, which is a copolymer of acrylamide and quaternized cationic monomer.

The above three ether polymers were employed in standard flocculation assays to determine if they could enhance sludge flocculation. A series of three tests were performed with digested (i.e., microbiologically decomposed) waste water sludge from sewage from two different population centers.

In a sludge settling test, sludge (diluted 1:10 [v:v] in water) was mixed with 4, 8, or 10 g of either candidate polymer (Sample 442 or 443), or the incumbent flocculation agent (above), per kg (dry solids basis) of sludge. These slurries (~1 L) were poured into individual 1-L cylinders and allowed to settle for 30 minutes, after which time the volume of the sludge layer was recorded; each sludge layer was formed in the bottom of the cylinder. Average 30-minute volumes are provided in Table 2 below.

In a second test, the efficiency of each added polymer at scavenging suspended solids from its slurry (above) was evaluated by centrifuging the slurries and then measuring the turbidities of the supernatants according to *Progress in Filtration and Separation* (Edition: 1, Chapter 16. Turbidity: Measurement of Filtrate and Supernatant Quality?, Publisher: Academic Press, Editors: E. S. Tarleton, July 2015; incorporated herein by reference). Average turbidities are provided in nephelometric turbidity units (NTU) in Table 2 below.

A capillary suction time (CST) test was applied to measure the filterability and ease of removing moisture from slurry and sludge. CST is measured by recording the time in seconds for water draining from sludge poured into a central funnel to travel a set distance. A full description of CST testing is available in *Progress in Filtration and Separation* (Edition: 1, Chapter 17. Capillary Suction Time (CST), Publisher: Academic Press, Editors: E. S. Tarleton, July 2015; incorporated herein by reference). Average CST measurements are provided in Table 2 below.

The average values of the results of each of the above tests for a control (no polymer added) and the three above polymers are listed in Table 2 below. The goal for a flocculation agent in the above tests is to minimize both the settlement volume for sludge solids and the turbidity and capillary suction time for sludge water. Based on Table 2, the Zetag® 8127 agent yielded the lowest settlement volumes relative to control. Sample 442, which had a low cationic ether group DoS (0.19), exhibited minimal improvement in sludge settling as compared to control. Sample 443, which had a higher DoS with cationic ether groups (0.43), showed better performance, particularly at an 8 g/kg concentration. Similar trends were observed with the turbidity assay. Zetag® 8127 yielded the lowest turbidities, while Sample 443 showed best performance at 8 and 10 g/kg concentrations. For the capillary suction time test, values of less than 30 s indicate good dewatering properties while values above 150 s indicate poor dewatering properties. Zetag® 8127 performed well at concentrations of 8 and 10 g/kg, while treatment at the same concentrations with Sample 443 resulted in CST values between 30 and 150 s. In comparing Samples 442 and 443, it is clear that with respect to graft copolymers herein derivatized with cationic ether groups, a higher DoS is desirable for conferring for flocculation and water-treating function. Overall, Sample 443 and similar ether-derivatized dextran-alpha-1,3-glucan graft copolymers can be applied to treat waste water, and offer the advantages of being sustainable and biodegradable.

TABLE 2

Treating Sludge with Ether-Derivatized Dextran-Alpha-1,3-Glucan Graft Copolymers

| Material | Concentration (g/kg) | Settlement Solids Volume (mL), 30 min | Turbidity (NTU) | Capillary Suction Time (s) |
|---|---|---|---|---|
| control (none) | 0 | 160.2 | 509.6 | 278.1 |
| Zetag ® 8127 | 4 | 130.7 | 230.8 | 120.6 |
| Sample 442 | 4 | 160.2 | 455.8 | 175.9 |
| Sample 443 | 4 | 158.0 | 276.9 | 106.3 |
| control (none) | 0 | 179.6 | 476.4 | 237.2 |
| Zetag ® 8127 | 8 | 119.3 | 103.9 | 9.0 |
| Sample 442 | 8 | 158.0 | 371.2 | 117.4 |
| Sample 443 | 8 | 145.5 | 153.8 | 48.3 |
| control (none) | 0 | 161.4 | 515.4 | 239.4 |
| Zetag ® 8127 | 10 | 137.5 | 128.8 | 8.2 |
| Sample 442 | 10 | 179.6 | 363.5 | 128.8 |
| Sample 443 | 10 | 154.6 | 153.8 | 38.9 |

Example 9

Using Ether Derivatives of Dextran-Alpha-1,3-Glucan Graft Copolymer in a Personal Care Application The cationic dextran-alpha-glucan graft copolymer ether derivative prepared in Example 2 above was used as a viscosity adjustment agent in a skin/hand sanitizer formulation. The composition of this formulation was: 70 wt % ethanol, 0.5 wt % cationic graft polymer ether, 29.5 wt % water. The formulation was made by first dissolving the cationic graft polymer ether in the water, and then adding the ethanol with agitation at room temperature. The appearance and consistency of the formulation were the same or very similar to the appearance and consistency of skin/hand sanitizer formulations currently available in the market. The ability of the graft copolymer at a relatively low concentration (below 2 wt %) to provide ample viscosity to this high alcohol concentration composition is quite advantageous.

Example 10

Using Ether Derivatives of Dextran-Alpha-1,3-Glucan Graft Copolymer and Alpha-1,3-Glucan Homopolymer for Viscosity Modification of Saline This Example has application to the petroleum (extraction), water treatment, and personal care fields, for example, which typically employ thickening as an important parameter. Also, this Example demonstrates that ethers herein are compatible with various brine systems (e.g., saltwater containing high levels of $Ca^{2+}$ and $Mg^{2+}$).

A set of alpha-glucan ethers of the present disclosure was tested for thickening efficiency in water and compatibility with saline brine. Samples of artificial seawater (formulation shown in Table 3 below) containing either 1350 ppm (0.135 wt %) or 5400 ppm (0.540 wt %) of a dextran-alpha-1,3-glucan graft copolymer ether or alpha-1,3-glucan homopolymer ether (features of these derivatives listed in Table 4 below) were prepared and tested. To prepare each sample of artificial seawater with ether derivative, a 5× stock solution of the seawater was prepared, which was then added at a ratio of 1 part to 4 parts of ether derivative solution to create the final concentration of each component.

TABLE 3

Artificial Seawater Formulation (1X)

| Component | Grams added to 1 L of water |
|---|---|
| NaCl | 23.926 |
| $Na_2SO_4$ | 4.008 |
| KCl | 0.677 |
| $NaHCO_3$ | 0.196 |
| $MgCl_2 \cdot 6H_2O$ | 0.05327 |
| $CaCl_2 \cdot 2H_2O$ | 0.01033 |

TABLE 4

Alpha-Glucan Derivatives and Properties Thereof

| Alpha-Glucan Derivative | RV[a] | IV[b] | % Alpha-1,6 Linkages | Deriv. Type | DOS |
|---|---|---|---|---|---|
| High DPw Alpha-1,3-Glucan Carboxymethyl Ether | 9.8 | 6.83 | 0 | anionic | 0.50 |
| High DPw Alpha-1,3-Glucan Hydroxypropyl Trimethylammonium Ether | 9.8 | 6.83 | 0 | cationic | 0.29 |
| Dextran-Alpha-1,3-Glucan Graft Copolymer Carboxymethyl Ether | 8.74 | | 37 | anionic | 0.9 |

[a] RV, reduced viscosity as measured for each alpha-glucan prior to ether-derivatization.
[b] IV, intrinsic viscosity as measured for each alpha-glucan prior to ether-derivatization.

It was found that each alpha-glucan derivative (Table 4) was compatible in seawater at 1350 ppm. For example, no gelling (precipitation) of any of the derivatives was observed despite the high salt concentration of the artificial seawater.

The viscosity of each alpha-glucan derivative as dissolved in demineralized (demi) water or seawater was assessed. Viscosity measurement setup was as follows:

1. Viscosity was measured using a Brookfield viscosimeter.
2. Spindle LV-01 was utilized, which is designed for watery solutions.
3. A revolutions per minute (rpm) value was chosen based on the torque force, which was preferably between 5 and 80%. The selected rpm typically was 50.
5. Upon later measurements with increased concentrations, other spindles and rpm values were chosen to place the torque force in the right spectrum.

The viscosity of each alpha-glucan derivative in demi water and/or seawater is provided in Tables 5 and 6.

TABLE 5

Viscosity of Alpha-Glucan Derivatives at 1350 ppm in Demi Water

| Alpha-Glucan Derivative | Viscosity (mPa · s) |
|---|---|
| High DPw Alpha-1,3-Glucan Carboxymethyl Ether | 15 |
| High DPw Alpha-1,3-Glucan Hydroxypropyl Trimethylammonium Ether | 17.28 |
| Dextran-Alpha-1,3-Glucan Graft Copolymer Carboxymethyl Ether | 41.46 |

TABLE 6

Viscosity Retention of 5400 ppm Alpha-Glucan Derivatives in Seawater vs. Demi Water

| | ppm | rpm | torque % | mPa · s | |
|---|---|---|---|---|---|
| High DPw Alpha-1,3-Glucan Carboxymethyl Ether | | | | | |
| demi | 5400 | 50 | 48.3 | 57.96 | remaining viscosity in % |
| seawater | 5400 | 50 | 15.3 | 18.48 | 31.9 |
| High DPw Alpha-1,3-Glucan Hydroxypropyl Trimethylammonium Ether | | | | | |
| demi | 5400 | 10 | 68.6 | 415.8 | remaining viscosity in % |
| seawater | 5400 | 50 | 3.9 | 4.8 | 1.15 |
| Dextran-Alpha-1,3-Glucan Graft Copolymer Carboxymethy l Ether | | | | | |
| demi | 5400 | 20 | 68.1 | 204.3 | remaining viscosity in % |
| seawater | 5400 | 15 | 18 | 50 | 24.5 |

Conclusions:

1. All polymers showed significant thickening of water at very low addition level (below 1 wt %), which serves multiple purposes in many industries.
2. All polymers showed partial viscosity retention in sea water despite the ion strength.
3. Both chemical (ether) functionalities (anionic and cationic) showed comparable thickening effects, highlighting the impact of the underlying polymer Mw (measured through reduced viscosity [RV]).

Example 11

Using Ether Derivatives of Dextran-Alpha-1,3-Glucan Graft Copolymer in Emulsions Dextran-alpha-glucan graft copolymer ether derivatives herein were used in preparing various emulsions.

TABLE 7

| Emulsion Components | | | | | |
|---|---|---|---|---|---|
| Phase | wt % | g | Trade Name | Component | Function |
| A | 67.5% | 135 | | Water | solvent |
| B | 10% | 20 | ZEMEA | Propanediol | humectant |
| B | 0.5%* | 1 | | Graft copolymer deriv. (Table 8) | stabilizer |
| B | 1% | 2 | SENSIVA PA 30 | Propanediol, Phenethyl alcohol, Undecyl alcohol, Tocopherol | preservative |
| C | 15% | 30 | Fractionated Coconut Oil | Caprylic/Capric Triglyceride | emollient |
| C | 3% | 6 | | Sorbitan Oleate | span |
| C | 3% | 3 | TWEEN 60 | Polysorbate 60 | surfactant |
| D | q.s.[a] | q.s.[a] | | Triethanolamine | base |

[a] q.s., as much as needed.

Procedure (Using Phases A-D of Table 7):

1. Premixed B, then added to A, then blended using a WARING blender (max rpm, 3 min).
2. Premixed C, then added to A/B, then blended using a WARING blender (low rpm, 1 min).
3. Added D until a pH of 7 was reached.

TABLE 8

| Screening for Emulsion Stabilization | | | |
|---|---|---|---|
| Alpha-Glucan Graft Copolymer[a] | Ether Modification[b] | Loading Level in Emulsion | Stabilization Result |
| GT50 | QA, DOS 0.21/0.19 | 0.50 wt % | Fail |
| GT50 | QA, DOS 0.43 | 0.50 wt % | Pass[c] |
| GT50 | QA, DOS 0.71 | 0.50 wt % | Fail |
| GT50 | CM, DOS 0.27 | 0.50 wt % | Fail |
| GT50 | CM, DOS 0.47 | 0.50 wt % | Fail |
| GT50 | CM, DOS 0.71 | 0.50 wt % | Fail |
| GT30 | CM, DOS 0.57 | 1.50 wt % | Pass |
| GT30 | CM, DOS 0.38 | 1.50 wt % | Pass |

[a]GT50, dextran-alpha-1,3-glucan graft copolymer with a dextran backbone content of about 50 wt % and an alpha-1,3-glucan side chains content of about 50 wt % produced in a manner similarly as shown in Example 1 above. GT30, dextran-alpha-1,3-glucan graft copolymer with a dextran backbone content of 30 wt % and a alpha-1,3-glucan side chains content of 70 wt % proftuced in a manner similarly as show in Example 1 above.
[b]QA, Graft copolymer ether-derivatized with hydroxypropyl trimethylammonium. CM, Graft copolymer ether-derivatized wtih carboxymethyl.
[c]Emulsion creaming observed.

[a] GT50, dextran-alpha-1,3-glucan graft copolymer with a dextran backbone content of about 50 wt % and an alpha-1,3-glucan side chains content of about 50 wt % produced in a manner similarly as shown in Example 1 above. GT30, dextran-alpha-1,3-glucan graft copolymer with a dextran backbone content of 30 wt % and an alpha-1,3-glucan side chains content of 70 wt % produced in a manner similarly as shown in Example 1 above.
[b] QA, Graft copolymer ether-derivatized with hydroxypropyl trimethylammonium. CM, Graft copolymer ether-derivatized with carboxymethyl.
[c] Emulsion creaming observed.

The results in Table 8 indicate that ethers of alpha-glucan graft copolymers herein can be useful in emulsions (e.g., providing stability thereto). Such could be used to replace incumbent acrylate ingredients, for example.

Further testing was conducted to analyze the haptics of these emulsions. In particular, appearance (glossiness, firmness), rub-out (stringiness, stickiness, spreadability, sliminess, absorbency), and after-feel (glossiness, stickiness) haptics features were analyzed. Each feature was rated 1 (low) to 5 (high). It was found that emulsions having either the cationic (hydroxypropyl trimethylammonium) or anionic (carboxymethyl) ether-derivatized dextran-alpha-1,3-glucan graft copolymer had the following haptics features (rating provided parenthetically): appearance glossiness (3), appearance firmness (3), stringiness (4), stickiness (4), spreadability (5), sliminess (3), absorbency (3), after-feel glossiness (3), stickiness (2). It is noted that an emulsion with an incumbent acrylate ingredient (CARBOPOL ULTREZ) instead of an ether-derivatized dextran-alpha-1,3-glucan graft copolymer had the following haptics features: appearance glossiness (5), appearance firmness (5), stringiness (3), stickiness (4), spreadability (4), sliminess (2), absorbency (4), after-feel glossiness (5), stickiness (3). Thus, emulsions with an alpha-glucan graft copolymer ether derivative herein can have haptics comparable with those of an emulsion with an incumbent acrylate ingredient, for example.

What is claimed is:

1. A composition comprising at least one graft copolymer ether compound having a degree of substitution (DoS) up to about 3.0, wherein the graft copolymer comprises:

(i) a backbone comprising dextran, and (ii) one or more alpha-glucan side chains comprising at least about 30% alpha-1,3 glycosidic linkages;

wherein the graft copolymer ether compound is (i) an anionic graft copolymer ether compound, or (ii) a cationic graft copolymer ether compound, and wherein the graft copolymer ether compound is crosslinked.

2. The composition of claim 1, wherein the graft copolymer comprises about 20 wt % to about 80 wt % of said backbone, and about 20 wt % to about 80 wt % of said one or more alpha-glucan side chains.

3. The composition of claim 1, wherein the one or more alpha-glucan side chains comprise at least about 90% alpha-1,3 glycosidic linkages.

4. The composition of claim 3, wherein the weight-average degree of polymerization (DPw) of the one or more alpha-glucan side chains is at least about 15.

5. The composition of claim 3, wherein the one or more alpha-glucan side chains comprise about 100% alpha-1,3 glycosidic linkages.

6. The composition of claim 1, wherein the weight-average degree of polymerization (DPw) of the one or more alpha-glucan side chains is at least about 15.

7. The composition of claim 1, wherein the dextran comprises at least about 90% alpha-1,6 glycosidic linkages.

8. The composition of claim 1, wherein the weight-average molecular weight (Mw) of the dextran is at least about 5000 Daltons.

9. The composition of claim 1, wherein the graft copolymer ether compound is water-soluble.

10. The composition of claim 1, wherein the DoS of the graft copolymer ether compound is about 0.05 to about 0.9.

11. The composition of claim 1, wherein the DoS of the graft copolymer ether compound is 0.3 to 1.25.

12. The composition of claim 1, wherein the graft copolymer ether compound is the anionic graft copolymer ether compound.

13. The composition of claim 12, wherein the anionic graft copolymer ether compound comprises carboxymethyl groups.

14. The composition of claim 1, wherein the graft copolymer ether compound is the cationic graft copolymer ether compound.

15. The composition of claim 14, wherein the cationic graft copolymer ether compound comprises quaternary ammonium groups.

16. The composition of claim 1, wherein the composition is a:

(a) flocculation agent,
(b) absorbent,
(c) viscosity modifier,
(d) paper,
(e) emulsion, or
(f) builder agent.

17. The composition of claim 1, wherein the graft copolymer ether compound is crosslinked using a diglycidyl ether.

18. The composition of claim 17, wherein the diglycidyl ether is ethylene glycol diglycidyl ether.

19. A flocculation method comprising:

(a) mixing a graft copolymer ether compound according to claim 1 into an aqueous composition that comprises suspended solids, whereby at least a portion of the suspended solids becomes flocculated; and
(b) optionally, separating the flocculated solids of (a) from the aqueous composition.

20. An absorption method comprising: contacting a graft copolymer ether compound according to claim 1 with an aqueous liquid-comprising composition, wherein the compound absorbs aqueous liquid from the liquid-comprising composition.

* * * * *